US010121388B2

(12) United States Patent
Seim et al.

(10) Patent No.: US 10,121,388 B2
(45) Date of Patent: Nov. 6, 2018

(54) METHODS, SYSTEMS, AND APPARATUSES TO CONVEY CHORDED INPUT

(71) Applicant: GEORGIA TECH RESEARCH CORPORATION, Atlanta, GA (US)

(72) Inventors: Caitlyn Seim, Atlanta, GA (US); Thad Eugene Starner, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 161 days.

(21) Appl. No.: 14/700,102

(22) Filed: Apr. 29, 2015

(65) Prior Publication Data

US 2015/0310762 A1 Oct. 29, 2015

Related U.S. Application Data

(60) Provisional application No. 61/985,519, filed on Apr. 29, 2014.

(51) Int. Cl.
*G09B 19/00* (2006.01)
*G09B 21/00* (2006.01)
*G09B 15/00* (2006.01)

(52) U.S. Cl.
CPC .............. *G09B 19/00* (2013.01); *G09B 15/00* (2013.01); *G09B 21/00* (2013.01); *G09B 21/001* (2013.01); *G09B 21/003* (2013.01)

(58) Field of Classification Search
CPC ..... G09B 21/00; G09B 21/001; G09B 21/003
USPC ........................................................ 434/113
See application file for complete search history.

(56) References Cited

U.S. PATENT DOCUMENTS

| 3,978,757 | A | * | 9/1976 | Johnson, Jr. ........... | G09B 15/06 84/314 R |
|---|---|---|---|---|---|
| 5,486,112 | A | | 1/1996 | Troudet et al. | |
| 5,571,020 | A | * | 11/1996 | Troudet ................. | G09B 5/065 2/160 |
| 7,378,585 | B2 | | 5/2008 | McGregor | |
| 8,008,563 | B1 | * | 8/2011 | Hastings .............. | G09B 15/023 84/470 R |
| 8,475,172 | B2 | | 7/2013 | Lieberman et al. | |
| 9,390,630 | B2 | * | 7/2016 | Daniels | |
| 2003/0025595 | A1 | * | 2/2003 | Langberg ................ | G06F 3/011 340/407.1 |

(Continued)

FOREIGN PATENT DOCUMENTS

| DE | 102011113560 | 3/2012 |
|---|---|---|
| JP | 10307530 | 11/1998 |

(Continued)

OTHER PUBLICATIONS

Pianote; Building Piano Chords—Piano Lessons; Sep. 4, 2009; Youtube; https://www.youtube.com/watch?v=swJxjSi6ELI.*

(Continued)

*Primary Examiner* — Sam Yao
*Assistant Examiner* — Joshua Luo
(74) *Attorney, Agent, or Firm* — Troutman Sanders LLP; Ryan A. Schneider

(57) ABSTRACT

Disclosed herein are methods, systems, computer readable media, and apparatuses for conveying chorded input to a user. Chorded input can be conveyed by one or more sequences of stimulation events, wherein each sequence represents a particular chorded input.

19 Claims, 43 Drawing Sheets

(56) References Cited

U.S. PATENT DOCUMENTS

| | | | | |
|---|---|---|---|---|
| 2006/0137511 | A1* | 6/2006 | McGregor | G09B 15/023 84/478 |
| 2010/0134327 | A1 | 6/2010 | Dinh et al. | |
| 2010/0162878 | A1* | 7/2010 | Lengeling | G09B 15/009 84/483.2 |
| 2010/0184497 | A1* | 7/2010 | Cichowlas | A63F 13/00 463/7 |
| 2012/0092146 | A1* | 4/2012 | Ryu | G06F 3/016 340/407.1 |
| 2012/0188192 | A1* | 7/2012 | Sano | G06F 3/011 345/173 |
| 2013/0018289 | A1* | 1/2013 | Nussbaum | A61H 23/02 601/46 |
| 2013/0157761 | A1* | 6/2013 | Cichowlas | G09B 15/003 463/31 |
| 2013/0303951 | A1* | 11/2013 | Liu | A61H 23/00 601/46 |
| 2014/0134575 | A1 | 5/2014 | Kim et al. | |
| 2014/0145961 | A1* | 5/2014 | Szent-Miklosy | G06F 3/0219 345/168 |
| 2014/0242554 | A1* | 8/2014 | Mostafa | G06F 3/014 434/113 |
| 2014/0313022 | A1* | 10/2014 | Moeller | G06F 3/014 340/407.1 |
| 2014/0377722 | A1* | 12/2014 | Reid | G09B 21/005 434/114 |
| 2015/0314195 | A1* | 11/2015 | Bekri | A63F 13/285 463/30 |
| 2015/0341068 | A1* | 11/2015 | Singhal | H04B 1/385 455/575.6 |
| 2016/0313801 | A1* | 10/2016 | Wagner | G06F 3/017 |

FOREIGN PATENT DOCUMENTS

| | | |
|---|---|---|
| KR | 20070059239 | 6/2007 |
| KR | 101360828 | 2/2014 |

OTHER PUBLICATIONS

PianoFramework; Piano Chords: C Chords; Dec. 28, 2011; Youtube; https://www.youtube.com/watch?v=Mh2diUQ8qeE.*
Seim et al., "Passive Haptic Learning of Braille Typing," ISWC '14, pp. 111-118 (Sep. 13-17, 2014).
Seim et al., "Passive Haptic Learning of Typing Skills Facilitated by Wearable Computers," CHI 2014 (Apr. 26-May 1, 2014).
Ghomi, "Arpege: Learning Multitouch Chord Gestures Vocabularies," Oct. 2013, ACM.
Abstract of DE102011113560 from Espacenet (accessed Apr. 22, 2016).
Abstract of JPH10307530 from Espacenet (accessed Apr. 22, 2016).
Abstract of KR101360828 from Espacenet (accessed Apr. 22, 2016).
Abstract of KR20070059239 from Espacenet (accessed Apr. 22, 2016).
Adams et al., "Virtual training for a manual assembly task." Haptics-e, 2001, 2(2).
Bluteau et al., "Haptic guidance improves visuo-manual tracking of trajectories." PLoS ONE, 2001, 3(3), p. 1.
Bouzit et al., "The Rutgers Master II—new design force-feedback glove Transactions on Mechatronics," IEEE/ASME, 2002 7(2), pp. 256-263, IEEE.
Brill, "Hand in Glove," Tennessee Alumnus, Jan. 3, 2014.
Broeren et al., "Virtual reality and haptics as a training device for movement rehabilitation after stroke: a single-case study," Archives of physical medicine and rehabilitation, 2004, 85(8), 1247-1250, ResearchGate.
Chellali et al., "A haptic communication paradigm for collaborative motor skills learning," Web Virtual Reality and Three-Dimensional Worlds, 2010, HAL.

Cholewiak et al., "Vibrotactile pattern recognition and discrimination at several body sites," Perception & Psychophysics, 1984, 35(6), pp. 503-514, Psychonomic Society, Inc.
Dinse & Tegenthoff, "Stimulation Glove for Stroke Patients," Product Design & Development, Ruhr-Universitat Bochum, Feb. 24, 201.
Eid et al., "A haptic multimedia handwriting learning system," Proc. EMME, 2007, pp. 103-108, ACM.
Feygin et al., "Haptic guidance: Experimental evaluation of a haptic training," IEEE Haptics Symposium, 2002, pp. 40-47.
Gallace et al., "Can tactile stimuli be subitized? An unresolved controversy within the literature on numerosity judgments," Perception, 2008, vol. 37, pp. 782-800.
Gollner et al., "Mobile Lorm Glove: introducing a communication device for deaf-blind people," Proc Tangible, Embedded and Embodied Interaction, 2012, pp. 127-130, ACM.
Green et al., "A reduced QWERTY keyboard for mobile text entry," CHI'04 extended abstracts on human factors in computing systems, Apr. 2004, pp. 1429-1432, ACM.
Grindlay, "Haptic guidance benefits musical motor learning," Haptics '08: Proceedings of the 2008 Symposium on Haptic Interfaces for Virtual Environment and Teleoperator Systems, 2008, pp. 397-404, Washington, DC, USA, IEEE Computer Society.
Huang et al., "Mobile music touch: mobile tactile stimulation for passive learning," Proc. CHI, 2010, pp. 791-800, ACM.
Huang et al., "PianoTouch: A wearable haptic piano instruction system for passive learning of piano skills," Proc. ISWC, 2008, p. 41-44, IEEE.
Jiang et al., "Using haptic feedback to improve grasp force control in multiple sclerosis patients," Robotics, IEEE Transactions on, 2009, 25(3), pp. 593-601, IEEE.
Johansson & Vallbo, "Tactile sensibility in the human hand: relative and absolute densites of four types of mechanoreceptive units in glabrous skin," Physiology, Jan. 1979, 286, pp. 283-300.
Jones et al., "A comparison of learning with haptic and visual modalities," Haptics-e, May 2005, 3(6).
Jones et al., "Vibrotactile pattern recognition on the arm and back," Perception, 2009, 38(1), p. 52.
Kohlsdorf et al., "Mobile music touch: the effect of primary tasks on passively learning piano sequences," Proc. ISWC, 2010, pp. 1-8, IEEE.
Lederman et al., "Haptic perception: A tutorial. Attention, Perception, & Psychophysics," 2009, 71(7), pp. 1439-1459, The Psychonomic Society, Inc.
Lee et al., "The effects of actuator selection on non-volitional postural responses to torso-based vibrotactile stimulation." Journal of neuroengineering and rehabilitation, 2013, 10(1), p. 21, BioMed Central.
Lemmens, P., et al., "A body-conforming tactile jacket to enrich movie viewing," In EuroHaptics 2009 and Symposium on Haptic Interfaces for Virtual Environment and Teleoperator Systems. World Haptics 2009. Third Joint, pp. 7-12, IEEE.
Lewiston, "MaGKeyS: A haptic guidance keyboard system for facilitating sensorimotor training and rehabilitation," PhD thesis, MIT, Feb. 2009.
Maderer, "Wearable computing gloves can teach Braille, even if you're not paying attention," Georgia Institute of Technology News Center, Atlanta, GA, Jun. 23, 2014.
Markow et al., "Mobile Music Touch: using haptic stimulation for passive rehabilitation and learning," Doctoral Dissertation, 2012, Georgia Institute of Technology.
Markow et al., "Mobile music touch: Vibrational stimulus in hand rehabilitation," 4th International Conference on Pervasive Computing Technologies for Healthcare (PervasiveHealth), 2010.
Matias et al., "Half-QWERTY: A one-handed keyboard facilitating skill transfer from QWERTY," In proceedings of the INTERACT'93 and CHI'93 Conference on Human Factors in Computing Systems, May 1993, pp. 88-94, ACM.
Montague & Nicolau, "Good Vibrations bring Braille into the 21st Century," The Conversation, May 30, 2014.
Morris et al., "Haptic feedback enhances force skill learning," WHC '07: Proceedings of the Second Joint EuroHaptics Conference and

(56) References Cited

OTHER PUBLICATIONS

Symposium on Haptic Interfaces for Virtual Environment and Teleoperator Systems, 2007, pp. 21-26, Washington, DC, USA, IEEE Computer Society.
Paraskeva, "Musical Gloves," Nov. 7, 2010.
Patton et al., "Robot-assisted adaptive training: Custom force fields for teaching movement patterns," IEEE Transactions on Biomedical Engineering, 2004, 51(4), pp. 636-646, IEEE.
Salma, "FingerReader is a Ring That Reads Out Printed Text to Visually Impaired People," Wonderful Engineering, Jul. 10, 2014.
Southern et al., "An Evaluation of BrailleTouch: Mobile Touchscreen Text Entry for the Visually Impaired," Proc. Mobile HCI, 2012, ACM.
Srimathveeravalli et al., "Motor skill training assistance using haptic attributes," WHC '05: Proceedings of the First Joint Eurohaptics Conference and Symposium on Haptic Interfaces for Virtual Environment and Teleoperator Systems, 2005 pp. 452-457, Washington, DC, USA, IEEE Computer Society.
Tan et al., "Tactual displays for wearable computing," Personal Technologies, 1997, 1(4), pp. 225-230, ResearchGate.
Walmsley et al., "Disambiguation of imprecise input with one-dimensional rotational text entry," ACM Transactions on Computer-Human Interaction (TOCHI), 2014, 21(1), p. 4, ACM.
Walters et al., "Touchfire: Towards a glove-mounted tactile display for rendering temperature readings for firefighters," ISWC 2010, 2010, pp. 1-4, IEEE.
Wrenn, "The Vibrating 'Ghost' Glove that can Train your Muscles to Replicate Tiger's Swing," DailyMail.com, Sep. 3, 2012.
Wu, et al., "Design of a Vibrotactile Vest for Contour Perception," International Journal of Advanced Robotic Systems, 2012, 9, InTech.
Yang et al., "Validating the performance of haptic motor skill training," HAPTICS '08: Proceedings of the 2008 Symposium on Haptic Interfaces for Virtual Environment and Teleoperator Systems, 2008, pp. 129-135, Washington, DC, USA, IEEE Computer Society.
Yuan et al., "Blind hero: enabling guitar hero for the visually impaired," Proc ACM SIGACCESS conference on Computers and accessibility, Oct. 2008, pp. 169-176, ACM.
Zelek et al., "A Haptic Glove as a Tactile-Vision Sensory Substitution for Wayfinding," Journal of Visual Impairment & Blindness, 2003, 97(10), AFB.

\* cited by examiner

FIG. 4 add a bag hike fee

FIG. 25

METHODS, SYSTEMS, AND APPARATUSES TO CONVEY CHORDED INPUT

CROSS-REFERENCE TO RELATED APPLICATIONS

This application claims priority to, and the benefit under 35 U.S.C. § 119(e), of U.S. Provisional Patent Application No. 61/985,519, filed 29 Apr. 2014, the entire contents and substance of which is hereby incorporated by reference as if fully set forth below.

STATEMENT REGARDING GOVERNMENT SUPPORT

This invention was made with government support under Grant No. 1217473 awarded by the National Science Foundation. The government has certain rights to this invention.

FIELD

Disclosed herein are methods, systems, and apparatuses to facilitate teaching and/or learning chorded input.

BACKGROUND

Various applications require users to learn chorded input (i.e., input requiring two or more simultaneous activities at the same time). For instance, chorded input is required in teaching applications in fields such as musical instrument playing (e.g., piano), language-based learning (e.g., Korean), code-based learning (e.g., Braille, Morse code), text-entry, and a variety of other applications. Improved systems for teaching and learning chorded input are needed.

For instance, improved systems for teaching Braille are needed. Currently, thirty-nine million people in the world are blind. Learning to type the Braille system is time consuming and a major component of the rehabilitation and independence training for individuals who are blind or visually impaired. Braille is especially difficult to learn for those who lose their sight later in life, such as the aging population, wounded veterans, and the increasing number of diabetics. Moreover, Braille instruction is neglected in schools, with only ten percent of those who are blind able to learn Braille using current methodologies.

The National Federation of the Blind calls illiteracy among the blind a "crisis." Because of a lack in certified teachers and bureaucratic barriers to providing education, blind and low-vision students are not being taught Braille. For these individuals, Braille equates to reading and writing; without this education, they are illiterate. Furthermore, for the blind, Braille literacy directly correlates with academic success and employment (even in contrast with those proficient with screen-readers), leaving 74% of blind individuals unemployed. Mainstreaming blind students in the public school system, where significantly less time is available for learning Braille, is another significant cause for this crisis; the influx of speech in technology is also causing neglect in Braille instruction. Listening alone is not enough, however, as research shows that Braille provides a critical advantage for students in learning math, grammar, language, spelling, and science. Blind individuals, adults and students alike, even try to attend Rehabilitation Centers to gain these necessary skills for independent living. However, access to these facilities is difficult and requires a commitment to seven or more months of inpatient learning. There are only twelve such facilities in the United States, and for many, access to instruction here is also impossible because of financial or geographic constraints. Current technology for Braille instruction is limited to refreshable Braille displays and electronic Braillers. Methods used to teach Braille today may involve tactile flash cards, block models of the Braille cell, and hand guidance of the individual's fingers. Users first learn to read, then type letters. These methods can be cumbersome and time-consuming.

In addition to the Braille example provided above, improved systems for teaching other chorded input (e.g., musical instruments, code-based systems, text-entry, etc.) are also needed. For instance, improved systems for teaching stenotype, a text entry technique used for real-time transcription, are also desired. Similar to Braille, stenotype is also a chorded text entry system. Passive Haptic Learning of stenotype would aim to reduce exorbitant practice time for experts and lower the barriers to entry into this industry, which currently has vocational school dropout rates of 85%-95%.

In addition, with mobile and wearable devices on the rise, developers still search for a method of discrete text entry for these small systems. The user's need for discrete entry and the challenges of learning a new entry method pose a persistent trade-off that leaves most novel techniques abandoned. Mobile devices such as smartwatches, Google Glass, and other wearables are becoming increasingly popular, but users report a common complaint. Users want to have a form of nonverbal (silent) text entry, ideally eyes-free, using touch. The slim, streamlined nature of these devices precludes many standard text entry methods, though. There has been research in search of a solution—including new or optimized keyboard interfaces for smartwatches and novel entry methods such as rotational text entry. However, discrete text entry remains a challenge on these devices because it is hard to create an interface that a human can dexterously manipulate that does not include bulky external hardware or non-subtle physical gestures. In addition, mobile devices continue to decrease in size and many extremely low-profile devices such as hearing aids, electronic textiles, and headsets cannot support these methods at all. Perhaps a non-visual, one-channel system like Morse code could provide some solution, but there are learning costs and barriers that prevent the adoption of many text entry systems such as this. Improved systems for conveying chorded input for eyes-free, silent text entry on small mobile devices is also desired.

SUMMARY

Disclosed herein are methods, computer readable media, systems, and apparatuses to convey chorded input. In some embodiments, the chorded input is conveyed via (passive and/or active) haptic learning technology. Haptic, as used herein, means of or relating to the sense of touch. Haptic learning technology can include tactile feedback technology that recreates the sense of touch by, for instance, applying a sensation (e.g., via forces, vibrations, and/or motions) to the user via a wearable, tactile interface. Passive Haptic Learning (PHL) refers the acquisition of sensorimotor skills without active attention to learning (i.e., allowing a person to learn "muscle memory" through a sensory stimulus without devoting attention to the stimulus). The sensorimotor skills learned can relate to a variety of applications including, but not limited to, Braille, musical instruments, code-based systems, text-entry systems, rehabilitation, or the like.

Disclosed herein are methods of conveying a chorded input comprising generating, by a processor in electrical communication with a plurality of actuators and an output device, a plurality of stimulation sequences, each stimulation sequence comprising instructions for activating one or more of the plurality of actuators in a particular sequential order; responsive to executing a first stimulation sequence, generating, by the processor, a first plurality of stimulation sequence signals configured to cause a first plurality of activations in which one or more of the plurality of actuators activate in a first sequential order, wherein each of the first plurality of activations is a discrete stimulation event; responsive to the plurality of actuators activating in the first stimulation order, generating, by the processor, an output signal to cause a perceptible indication by the output device; and responsive to executing a second stimulation sequence, generating, by the processor, a second plurality of stimulation sequence signals configured to cause a second plurality of activations in which one or more of the plurality of actuators activate in a second sequential order, wherein each of the second plurality of activations is a discrete stimulation event.

In some embodiments, a first activation and a second activation of the first plurality of activations are separated by a first predetermined offset (e.g., 0 milliseconds to 50 milliseconds). In some embodiments, a first activation and a second activation of the second plurality of activations are separated by a second predetermined offset. In some embodiments, the chorded input is conveyed via passive haptic learning. In some embodiments, each stimulation event is a vibrational stimulation, an audio stimulation, a tactile stimulation, or a combination thereof.

In some embodiments, execution of the second stimulation sequence begins from 100 milliseconds to 1 second after the first plurality of activations ends. Each stimulation sequence can represent a chorded input. The chorded input can represent a word, a letter, a syllable, a code, a number, a symbol, a musical note, a musical chord, or a combination thereof.

In some embodiments, each of the plurality of actuators is positioned on or within a wearable device configured to stimulate a portion of a device-wearer's body. In some embodiments, the wearable device comprises a glove, wherein the portion of the device-wearer's body comprises a left hand or a right hand, and wherein each of the actuators is configured to stimulate via vibrating a portion of the left hand or the right hand.

Some embodiments further comprise, before executing the first stimulation sequence, generating, by a processor, a signal to cause a parsing device to generate a parsing indication to a user. The parsing indication can represent a letter of the alphabet. The parsing indication can comprise a visual cue, an audible sound, a pause, a vibration, or a combination thereof. In some embodiments, the parsing indication comprises a visual cue, and wherein the device comprises a screen of a wearable headset configured for display of the visual cue. In some embodiments, each of the plurality of actuators comprise a vibration motor, a speaker, a bone-conduction device, or a combination thereof.

The perceptible indication can comprise a visual cue, an audible sound, a pause, a vibration, or a combination thereof. In some embodiments, the perceptible indication comprises an audible sound, and wherein the output device comprises an audio output device configured to generate the audible sound.

According to another example embodiment, a computer program product is provided. The computer program product can include a computer-readable medium. The computer-readable medium may store instructions that, when executed by at least one processor of a system, causes the system to perform a method. In some embodiments disclosed herein is a non-transitory computer-readable medium that stores instructions that, when executed by at least one processor, causes the at least one processor to perform a method comprising generating, by a processor in electrical communication with a plurality of actuators and an output device, a plurality of stimulation sequences, each stimulation sequence comprising instructions for activating one or more of the plurality of actuators in a particular sequential order; responsive to executing a first stimulation sequence, generating, by the processor, a first plurality of stimulation sequence signals configured to cause a first plurality of activations in which one or more of the plurality of actuators activate in a first sequential order, wherein each of the first plurality of activations is a discrete stimulation event; responsive to the plurality of actuators activating in the first sequential order, generating, by the processor, an output signal to cause a perceptible indication by the output device; and responsive to executing a second stimulation sequence, generating, by the processor, a second plurality of stimulation sequence signals configured to cause a second plurality of activations in which one or more of the plurality of actuators activate in a second sequential order, wherein each of the second plurality of activations is a discrete stimulation event.

According to another example embodiment, a system is provided. The system can include at least one memory operatively coupled to at least one processor and configured for storing data and instructions. In some embodiments disclosed herein are systems comprising at least one memory operatively coupled to at least one processor and configured for storing data and instructions that, when executed by the at least one processor, cause the system to: generate, by a processor in electrical communication with a plurality of actuators and an output device, a plurality of stimulation sequences, each stimulation sequence comprising instructions for activating one or more of the plurality of actuators in a particular sequential order; responsive to executing a first stimulation sequence, generate, by the processor, a first plurality of stimulation sequence signals configured to cause a first plurality of activations in which one or more of the plurality of actuators activate in a first sequential order, wherein each of the first plurality of activations is a discrete stimulation event; responsive to the plurality of actuators activating in the first sequential order, generate, by the processor, an output signal to cause a perceptible indication by the output device; and responsive to executing a second stimulation sequence, generate, by the processor, a second plurality of stimulation sequence signals configured to cause a second plurality of activations in which one or more of the plurality of actuators activate in a second sequential order, wherein each of the second plurality of activations is a discrete stimulation event.

Other embodiments, features, and aspects of the disclosed technology are described in detail herein and are considered a part of the claimed disclosed technology. Other embodiments, features, and aspects can be understood with reference to the following detailed description, accompanying drawings, and claims.

BRIEF DESCRIPTION OF THE FIGURES

Reference will now be made to the accompanying figures and flow diagrams, which are not necessarily drawn to scale, and wherein:

FIG. 4 depicts Braille phrases used in Example 2.

FIG. 25 depicts examples of written and perception test papers, as described in Example 5.

DETAILED DESCRIPTION

Figure 1:
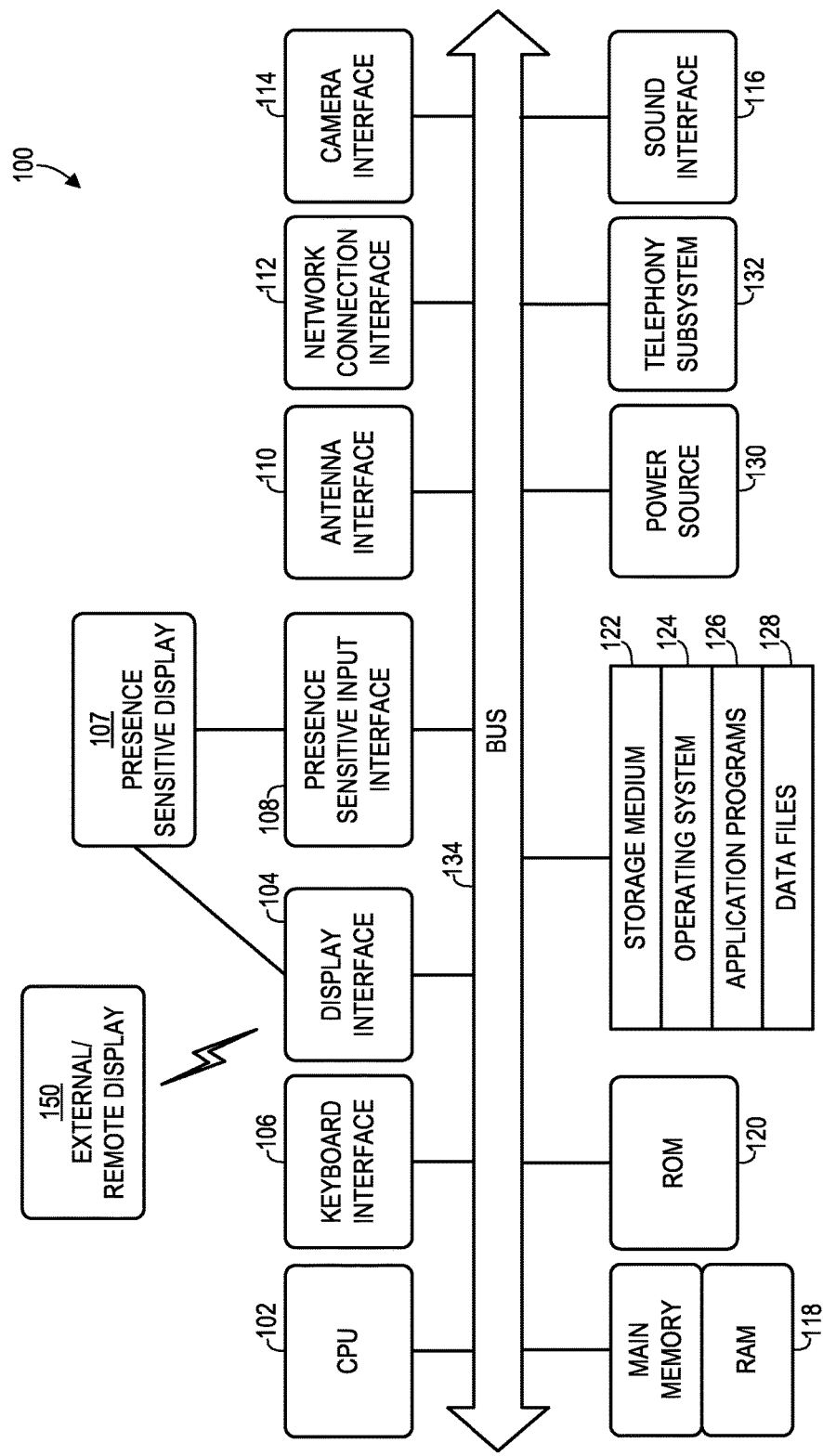
FIG. 1 depicts a block diagram of illustrative computing device architecture 100, according to an example implementation.

Disclosed herein are methods, systems, and apparatuses to convey chorded input. In some embodiments, the chorded input is conveyed haptically. In some embodiments, the chorded input is conveyed passively.

Some embodiments disclosed herein include an effective wearable computing system that can teach chorded input (e.g., Braille typing skills or piano playing) through sensory input (e.g., vibrational stimuli), with or without the active attention of the user. These systems have been demonstrated to be effective teaching tools through user studies, as demonstrated herein (for instance, in Examples 1-5 and corresponding Figures). The systems, methods and apparatuses disclosed herein can teach users how and when to type these chords, but correct human perception of multiple simultaneous stimuli is low. This disclosure presents a methodology, used in example herein for passive haptic learning systems, of teaching these chorded inputs using sequential stimuli. This technique was easily recognized and understood by users during system use.

Some embodiments of the disclosed technology will be described more fully hereinafter with reference to the accompanying drawings. This disclosed technology can, however, be embodied in many different forms and should not be construed as limited to the embodiments set forth therein.

In the following description, numerous specific details are set forth. However, it is to be understood that embodiments of the disclosed technology may be practiced without these specific details. In other instances, well-known methods, structures, and techniques have not been shown in detail in order not to obscure an understanding of this description. References to "one embodiment," "an embodiment," "example embodiment," "some embodiments," "certain embodiments," "various embodiments," etc., indicate that the embodiment(s) of the disclosed technology so described may include a particular feature, structure, or characteristic, but not every embodiment necessarily includes the particular feature, structure, or characteristic. Further, repeated use of the phrase "in one embodiment" does not necessarily refer to the same embodiment, although it may.

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

Unless otherwise specified, the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

In some instances, a computing device may be referred to as a mobile device, mobile computing device, a mobile station (MS), terminal, cellular phone, cellular handset, personal digital assistant (PDA), smartphone, wireless phone, organizer, handheld computer, desktop computer, laptop computer, tablet computer, set-top box, television, appliance, game device, medical device, display device, or some other like terminology. In other instances, a computing device may be a processor, controller, or a central processing unit (CPU). In yet other instances, a computing device may be a set of hardware components.

Various aspects described herein may be implemented using standard programming or engineering techniques to produce software, firmware, hardware, or any combination thereof to control a computing device to implement the disclosed subject matter. A computer-readable medium may include, for example: a magnetic storage device such as a hard disk, a floppy disk or a magnetic strip; an optical storage device such as a compact disk (CD) or digital versatile disk (DVD); a smart card; and a flash memory device such as a card, stick or key drive, or embedded component. Additionally, it should be appreciated that a carrier wave may be employed to carry computer-readable electronic data including those used in transmitting and receiving electronic data such as electronic mail (e-mail) or in accessing a computer network such as the Internet or a local area network (LAN). Of course, a person of ordinary skill in the art will recognize many modifications may be made to this configuration without departing from the scope or spirit of the claimed subject matter.

Various systems, methods, and computer-readable mediums are disclosed for conveying chorded input, and will now be described with reference to the accompanying figures.

FIG. 1 depicts a block diagram of illustrative computing device architecture 100, according to an example embodiment. Certain aspects of FIG. 1 may be embodied in a computing device 100. As desired, embodiments of the disclosed technology may include a computing device with more or less of the components illustrated in FIG. 1. It will be understood that the computing device architecture 100 is provided for example purposes only and does not limit the scope of the various embodiments of the present disclosed systems, methods, and computer-readable mediums.

The computing device architecture 100 of FIG. 1 includes a CPU 102, where computer instructions are processed; a display interface 104 that acts as a communication interface and provides functions for rendering video, graphics, images, and texts on the display. In certain embodiments of the disclosed technology, the display interface 104 may be directly connected to a local display, such as a touch-screen display associated with a mobile computing device. In another example embodiment, the display interface 104 may be configured for providing data, images, and other information for an external/remote display 150 that is not necessarily physically connected to the mobile computing device. For example, a desktop monitor may be utilized for mirroring graphics and other information that is presented on a mobile computing device. In certain some embodiments, the display interface 104 may wirelessly communicate, for example, via a Wi-Fi channel or other available network connection interface 112 to the external/remote display 150.

In an example embodiment, the network connection interface 112 may be configured as a communication interface and may provide functions for rendering video, graphics, images, text, other information, or any combination thereof on the display. In one example, a communication interface may include a serial port, a parallel port, a general purpose input and output (GPIO) port, a game port, a universal serial bus (USB), a micro-USB port, a high definition multimedia (HDMI) port, a video port, an audio port, a Bluetooth port, a near-field communication (NFC) port, another like communication interface, or any combination thereof.

The computing device architecture 100 may include a keyboard interface 106 that provides a communication interface to a keyboard. In one example embodiment, the computing device architecture 100 may include a presence-sensitive display interface 108 for connecting to a presence-sensitive display 107. According to certain some embodiments of the disclosed technology, the presence-sensitive display interface 108 may provide a communication interface to various devices such as a pointing device, a touch screen, a depth camera, etc. which may or may not be associated with a display.

The computing device architecture 100 may be configured to use an input device via one or more of input/output interfaces (for example, the keyboard interface 106, the display interface 104, the presence sensitive display interface 108, network connection interface 112, camera interface 114, sound interface 116, etc.) to allow a user to capture information into the computing device architecture 100. The input device may include a mouse, a trackball, a directional pad, a track pad, a touch-verified track pad, a presence-sensitive track pad, a presence-sensitive display, a scroll wheel, a digital camera, a digital video camera, a web camera, a microphone, a sensor, a smartcard, and the like. Additionally, the input device may be integrated with the computing device architecture 100 or may be a separate device. For example, the input device may be an accelerometer, a magnetometer, a digital camera, a microphone, and an optical sensor.

Example embodiments of the computing device architecture 100 may include an antenna interface 110 that provides a communication interface to an antenna; a network connection interface 112 that provides a communication interface to a network. In certain embodiments, a camera interface 114 is provided that acts as a communication interface and provides functions for capturing digital images from a camera. In certain embodiments, a sound interface 116 is provided as a communication interface for converting sound into electrical signals using a microphone and for converting electrical signals into sound using a speaker. According to example embodiments, a random access memory (RAM) 118 is provided, where computer instructions and data may be stored in a volatile memory device for processing by the CPU 102.

According to an example embodiment, the computing device architecture 100 includes a read-only memory (ROM) 120 where invariant low-level system code or data for basic system functions such as basic input and output (I/O), startup, or reception of keystrokes from a keyboard are stored in a non-volatile memory device. According to an example embodiment, the computing device architecture 100 includes a storage medium 122 or other suitable type of memory (e.g., RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 124, application programs 126 (including, for example, a web browser application, a widget or gadget engine, and or other applications, as necessary) and data files 128 are stored. According to an example embodiment, the computing device architecture 100 includes a power source 130 that provides an appropriate alternating current (AC) or direct current (DC) to power components. According to an example embodiment, the computing device architecture 100 includes a telephony subsystem 132 that allows the transmission and receipt of sound over a telephone network. The constituent devices and the CPU 102 communicate with each other over a bus 134.

According to an example embodiment, the CPU 102 has appropriate structure to be a computer processor. In one arrangement, the CPU 102 may include more than one processing unit. The RAM 118 interfaces with the computer bus 134 to provide quick RAM storage to the CPU 102 during the execution of software programs such as the operating system application programs, and device drivers. More specifically, the CPU 102 loads computer-executable process steps from the storage medium 122 or other media into a field of the RAM 118 in order to execute software programs. Data may be stored in the RAM 118, where the data may be accessed by the computer CPU 102 during execution. In one example configuration, the device architecture 100 includes at least 125 MB of RAM, and 256 MB of flash memory.

The storage medium 122 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow a computing device to access computer-executable process steps, application programs and the like, stored on removable and non-removable memory media, to off-load data from the device or to upload data onto the device. A computer program product, such as one utilizing a communication system may be tangibly embodied in storage medium 122, which may comprise a machine-readable storage medium.

According to one example embodiment, the term computing device, as used herein, may be a CPU, or conceptualized as a CPU (for example, the CPU 102 of FIG. 1). In this example embodiment, the computing device may be coupled, connected, and/or in communication with one or more peripheral devices, such as display. In this example embodiment, the computing device may output content to its local display and/or speaker(s). In another example embodiment, the computing device may output content to an external display device (e.g., over Wi-Fi) such as a TV or an external computing system.

In some embodiments of the disclosed technology, the computing device 100 may include any number of hardware and/or software applications that are executed to facilitate any of the operations. In some embodiments, one or more I/O interfaces may facilitate communication between the computing device and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the computing device. The one or more I/O interfaces may be utilized to receive or collect data and/or user instructions from a wide variety of input devices. Received data may be processed by one or more computer processors as desired in various embodiments of the disclosed technology and/or stored in one or more memory devices.

One or more network interfaces may facilitate connection of the computing device inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth enabled network, a Wi-Fi enabled network, a satellite-based network any wired network, any wireless network, etc., for communication with external devices and/or systems.

Figure 2:
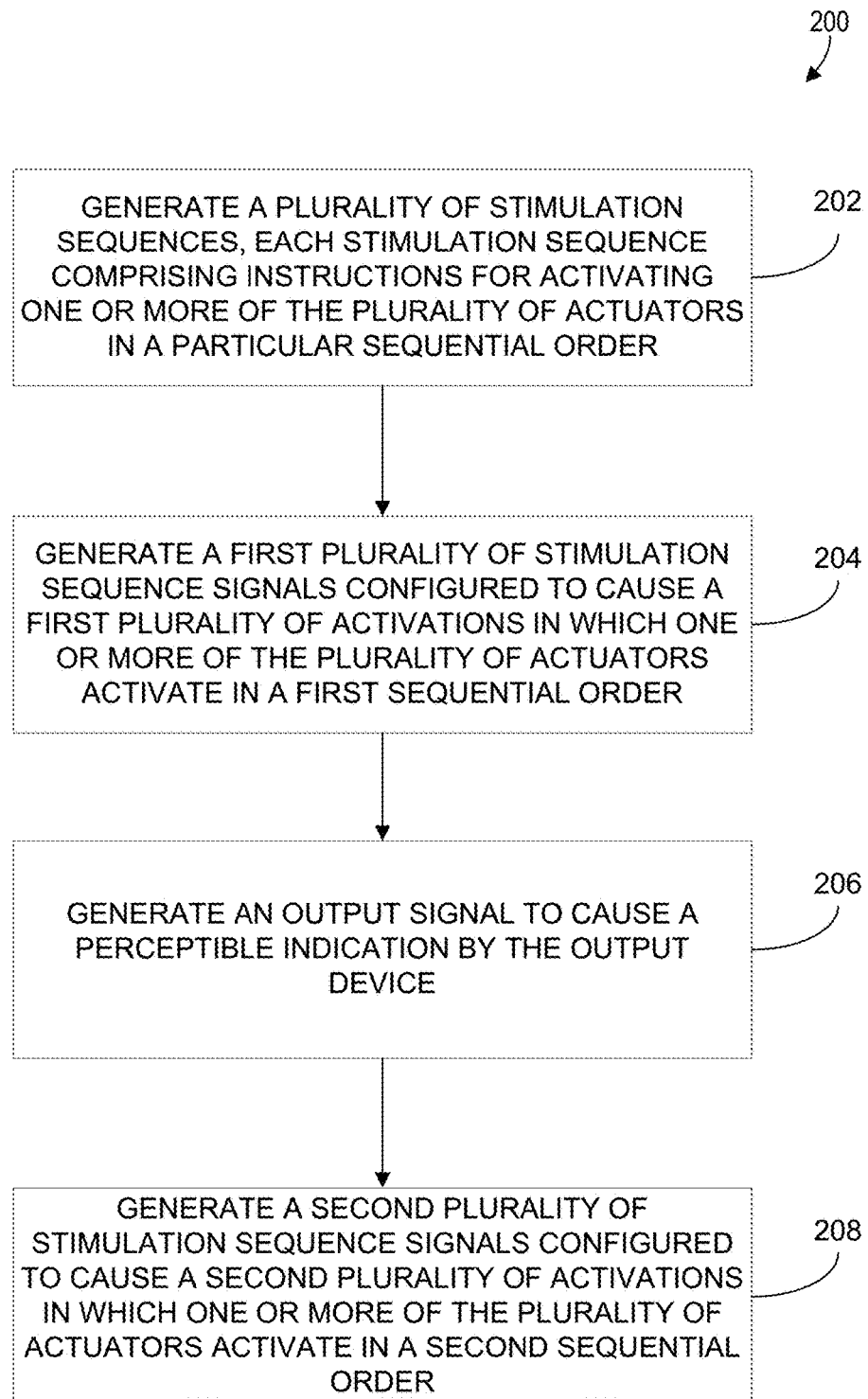
FIG. 2 depicts a block diagram of an illustrative method, according to an example implementation.

FIG. 2 is a flow chart illustrating an example method of conveying a chorded input 200, according to some embodiments. According to some embodiments, the method 200 may include the generation of stimulation sequences that may be stored in memory, and read by a processor. The processor can be in electrical communication with a plurality of actuators and an output device. In some embodiments, each stimulation sequence may comprise instructions for activating one or more of the plurality of actuators in a particular sequence. The plurality of actuators may drive variety of devices, including, but not limited to a vibration motor, a speaker, a bone-conduction device or a combination thereof. According to some embodiments, the plurality of actuators can be positioned on or within a wearable device configured to stimulate a portion of a device-wearer's body. For example, in some embodiments, the wearable device may be a glove, or a pair of gloves, and the plurality of actuators may be coin vibration motors configured to vibrate portions of a wearer's fingers.

In some embodiments, at 202, a processor of a computing device 100 may generate a plurality of stimulation sequences. According to some embodiments, each stimulation sequence and the resulting sequential activation of one or more of the actuators may represent a chorded input. For example, in some embodiments, three sequential activations of three coin vibration motors in different fingers of a glove may represent the three fingers necessary to play a particular piano chord. Such chorded inputs may represent a wide variety of information, including, but not limited to, a word, a letter, a symbol, a syllable, a code, a number, a musical note, a musical chord, or a combination thereof.

At 204, the processor can generate a first plurality of stimulation sequence signals configured to cause a first plurality of activations in which one or more of the plurality of actuators activate in a first sequential order. Each of the first plurality of activations can be a discrete stimulation event. Each stimulation event can be a vibrational stimulation, an audio stimulation, a tactile stimulation or some combination thereof. In some embodiments, stimulation events may by visual stimulations or electric stimulations. According to some embodiments, the processor generates the first plurality of stimulation sequences in response to executing a first stimulation sequence. Thus, for example, a first stimulation sequence may cause a plurality of stimulation events, such as vibrations, to occur in a sequential order, wherein the sequence of vibrations represents a chorded input, such as an input to a Braille machine.

In some embodiments, at 206, responsive to the plurality of actuators activating in the first stimulation order, the processor can generate an output signal to cause a perceptible indication by the output device. The output device may be may be an audio output device configured to generate an audible sound, a speaker, a display, a screen, or a wearable headset configured for display of a visual cue. According to some embodiments, the perceptible indication may include a visual cue, an audible sound, a pause, a vibration, or a combination thereof. The perceptible indication may be useful in denoting the end of one stimulation sequence (representative of a chorded input) and the next stimulation sequence. For example, in some embodiments a first stimulation sequence may represent a first piano chord and a second stimulation sequence may represent a second piano chord, and the perceptible indication may be a beep played by a speaker indicating that the stimulation events representing the first chord have ended and now the stimulation events representing the second chord is about to begin.

In some embodiments, at 208, the processor can generate a second plurality of stimulation sequence signals configured to cause a second plurality of activations in which one or more of the plurality of actuators activate in a second sequential order. Each of the second plurality of activations can be a discrete stimulation event. According to some embodiments, the processor can generate the second plurality of stimulation sequences in response to executing a second stimulation sequence.

In some embodiments, the method 200 can further include generating a signal to cause a parsing device to generate a parsing indication to a user before executing the first stimulation sequence that gives the user context about an upcoming sequence. According to some embodiments, the parsing indication may be a visual cue, an audible sound, a pause, a vibration, a combination thereof. In some embodiments the parsing indication may be an indication of the idea embodied by the chorded input. For example, in some embodiments the parsing indication may represent a letter of the alphabet. Thus, in some embodiments a parsing indication may be a sound played by a speaker indicating a letter of the alphabet. In some embodiments the parsing device may be a speaker, a display, a screen, or a wearable headset configured for display of a visual cue.

According to some embodiments, the activations of the actuators caused by a given stimulation sequence may be separated by a predetermined offset. For example, a first activation and a second activation in a plurality of activations may be separated by a predetermined offset, which could be from 0 milliseconds to 50 milliseconds (e.g., from 0-5 ms, from 5-10 ms, from 10-15 ms, from 15-20 ms, from 20-25 ms, from 25-30 ms, from 30-35 ms, from 35-40 ms, from 40-45 ms, from 45-50 ms). It will be understood by those of skill in the art the there may be more than one predetermined offset, or the value of the predetermined offset may change in different embodiments.

Additionally, in some embodiments, the execution of a subsequent stimulation sequence can begin a predetermined time after a plurality of activations ends. In some embodiments, the predetermined time is from 100 ms to 1 s (e.g., 100-200 ms, 200-300 ms, 300-400 ms, 400-500 ms, 500-600 ms, 600-700 ms, 700-800 ms, 800-900 ms, 900 ms-1 s).

According to some embodiments, the method may execute any number of stimulation sequences, wherein each sequence represents a particular chord. According to some embodiments, the method may automatically repeat a set of stimulation sequences, generating the resulting stimulation events over and over again, any number of times. As such, the method 200 can serve to convey one or more chorded inputs via passive haptic learning.

In some embodiments, a non-transitory computer-readable medium may store instructions that when executed by at least one processor, cause the processor to execute the method 200. Further, the method 200 may be executed by a system comprising at least one memory operatively coupled to at least one processor and configured for storing data and instructions that, when executed by the at least one processor cause the processor to execute the steps of the method.

According to another example embodiment, a computer program product is provided. The computer program product can include a computer-readable medium. The computer-readable medium may store instructions that, when executed by at least one processor of a system, causes the system to perform a method. In some embodiments disclosed herein is a non-transitory computer-readable medium that stores instructions that, when executed by at least one processor, causes the at least one processor to perform a method comprising generating, by a processor in electrical communication with a plurality of actuators and an output device, a plurality of stimulation sequences, each stimulation sequence comprising instructions for activating one or more of the plurality of actuators in a particular sequential order; responsive to executing a first stimulation sequence, generating, by the processor, a first plurality of stimulation sequence signals configured to cause a first plurality of activations in which one or more of the plurality of actuators activate in a first sequential order, wherein each of the first plurality of activations is a discrete stimulation event; responsive to the plurality of actuators activating in the first sequential order, generating, by the processor, an output signal to cause a perceptible indication by the output device; and responsive to executing a second stimulation sequence, generating, by the processor, a second plurality of stimulation sequence signals configured to cause a second plurality of activations in which one or more of the plurality of actuators activate in a second sequential order, wherein each of the second plurality of activations is a discrete stimulation event.

According to another example embodiment, a system is provided. The system can include at least one memory operatively coupled to at least one processor and configured for storing data and instructions. In some embodiments disclosed herein are systems comprising at least one memory operatively coupled to at least one processor and configured for storing data and instructions that, when executed by the at least one processor, cause the system to: generate, by a processor in electrical communication with a plurality of actuators and an output device, a plurality of stimulation sequences, each stimulation sequence comprising instructions for activating one or more of the plurality of actuators in a particular sequential order; responsive to executing a first stimulation sequence, generate, by the processor, a first plurality of stimulation sequence signals configured to cause a first plurality of activations in which one or more of the plurality of actuators activate in a first sequential order, wherein each of the first plurality of activations is a discrete stimulation event; responsive to the plurality of actuators activating in the first sequential order, generate, by the processor, an output signal to cause a perceptible indication by the output device; and responsive to executing a second stimulation sequence, generate, by the processor, a second plurality of stimulation sequence signals configured to cause a second plurality of activations in which one or more of the plurality of actuators activate in a second sequential order, wherein each of the second plurality of activations is a discrete stimulation event.

It will be understood that the various steps shown in FIG. 2 are illustrative only, and that steps may be removed, other steps may be used, or the order of steps may be modified.

Certain embodiments of the disclosed technology are described above with reference to block and flow diagrams of systems and methods and/or computer program products according to example embodiments of the disclosed technology. It will be understood that one or more blocks of the block diagrams and flow diagrams, and combinations of blocks in the block diagrams and flow diagrams, respectively, may be implemented by computer-executable program instructions. Likewise, some blocks of the block diagrams and flow diagrams may not necessarily need to be performed in the order presented, or may not necessarily need to be performed at all, according to some embodiments of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that may direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the disclosed technology may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

The systems, methods, computer readable media (CRM), and apparatuses disclosed herein can convey chorded input in a variety of ways. The chorded input can be conveyed through any sensory perception, including sight, sound, touch, or a combination thereof. The conveyance can include, in some embodiments, tap input; audio input; bone conduction; visual input; gesture input; text input; or a combination thereof. In some embodiments, the chorded input is conveyed haptically (actively and/or passively). The conveyance can include teaching, learning, or a combination thereof.

Learning is not always an active process; it can sometimes be passive. Passive learning is "caught, rather than taught," and is characterized as "typically effortless, responsive to animated stimuli, amenable to artificial aid to relaxation, and characterized by an absence of resistance to what is learned." For instance, subjects who live in a media rich environment and are passively exposed to political information are 40% more likely to acquire the information than subjects living in a media poor environment. A media-rich environment need not be limited to audio and visual stimulation though. It has been shown that a multi-modal combination of audio and haptic cues gives users a richer understanding of musical structure and improves performance on music pieces and in a series of experiments, we showed that manual skills can be learned or reinforced passively while the user is engaged in other tasks using tactile stimulation.

The chorded input can be conveyed via simultaneous/grouped stimuli. The chorded input can be conveyed via sequential stimulation. In some embodiments, the chorded input is conveyed with accompanying audio.

The systems, methods, and apparatuses disclosed herein can be used in a variety of applications. For instance, the systems, methods, CRM, and apparatuses disclosed herein can be used to convey chorded input. Chorded input can include any use wherein multiple actions are undertaken simultaneously, for instance, pressing multiple keys simultaneously. For instance, the systems, methods, and apparatuses disclosed herein can be used to teach chorded input including, but not limited to, a word, a letter, a number, a syllable, a symbol, a musical note, a musical chord, or a combination thereof.

In some embodiments, the systems, methods, and apparatuses disclosed herein can be used to facilitate music-related learning (including, for instance, sight recognition, sound recognition, music reading, and musical-instrument playing). In some embodiments, the music-related learning involves newly learning how to play music on an instrument. In some embodiments, the musical-related learning involves enhancing and/or advancing skills related to an already-learned musical instrument (e.g., enhancing speed of playing or speed of learning a new song or portion thereof, increased number or volume of musical notes and/or chords learned). Examples of musical instruments whose playing can be facilitated through the systems, methods, and apparatuses disclosed herein can include, but are not limited to, wind instruments (e.g., flute), string instruments (e.g., guitar), percussion instruments (e.g., drums), brass instruments (e.g., trumpet), electronic instruments (e.g., synthesizer), and keyboard instruments (e.g., piano). The musical instruments whose playing can be facilitated through the systems, methods, and apparatuses disclosed herein can include, but are not limited to, idiophones (e.g., directly struck idiophones, indirectly struck idiophones, plucked idiophones, friction idiophones, blown idiophones), membranophones (e.g., struck membranophones, plucked membranophones, friction membranophones, singing membranophones), chordophones (e.g., simple chordophones, zithers (e.g., bar zithers, stick zithers, tube zithers, raft zithers, board zithers, trough zithers, frame zithers), composite chordophones (e.g., lutes, harps, harp lutes)), electrophones, and acrophones (e.g., free aerophones, non-free aerophones (e.g., flutes, reed aerophones, trumpets)). Further examples of musical instruments whose playing can be facilitated through the systems, methods, and apparatuses disclosed herein can include, but are not limited to, piano, guitar, xylophone, marimba, drums, organ, horns, bagpipes, harmonica, clarinet, flute, trumpet, saxophone, oboe, piccolo, recorder, tuba, harp, banjo, mandolin, and ukulele. In some embodiments, portions of music are taught. In some embodiments, entire pieces of music are taught. In some embodiments, wherein the chorded input involves multiple limbs, the music can be taught in individual limbs sequentially. In some embodiments, wherein the chorded input involves multiple limbs, the music can be taught in multiple limbs simultaneously (e.g., two-hands for piano at once time).

In some embodiments, the systems, methods, and apparatuses disclosed herein can be used to teach words, letters, phrases, or combinations thereof to facilitate language-related learning (including, for instance, sight recognition, sound recognition, reading, writing, and verbal comprehension). In some embodiments, the language-related learning involves newly learning a language or portion thereof. In some embodiments, the language-related learning involves enhancing and/or advancing skills related to an already-learned language (e.g., enhancing speed of reading, writing, and/or comprehending; increased number or volume of words, letters, and/or phrases learned). Examples of language-related learning that can be facilitated through the systems, methods, and apparatuses disclosed herein can include, but are not limited to, English, Korean, Mandarin, Cantonese, Hindi, Spanish, Arabic, Portuguese, Bengali, Russian, Japanese, Punjabi, German, Javanese, Wu, Malay, Telugu, Viatnamese, French, Marathi, Tamil, Urdu, Persian, Turkish, Italian, Thai, Gujarati, Jin, Min Nam, Polish, Pashto, Kannada, Xiang, Malayalam, Sundanese, Hausa, Dutch, Greek, Czech, Swahili, Afrikaans, Oriya, Burmese, Hakka, Ukranian, Bhojpuri, Tagalog, Yoruba, Maithili, Swahili, Uzbek, Sindhi, Arharic, and Fula. In some embodiments, the systems, methods, and apparatuses disclosed herein can be used to facilitate the use of a language in a particularized function, such as stenography. In some embodiments, the language-based skills can be conveyed to teach typing. In some embodiments, the language-based skills can be conveyed to teach reading. Language-based skills can be taught, in some embodiments, via incremental use with a panagram.

In some embodiments, the systems, methods, and apparatuses disclosed herein can be used to teach words, letters, phrases, codes, or combinations thereof to facilitate code-related learning (including, for instance, sight recognition, sound recognition, reading, writing, and verbal comprehension). In some embodiments, the code-related skills involve rhythm and/or temporally based systems. In some embodiments, the code-related learning involves newly learning a code or portion thereof. In some embodiments, the code-related learning involves enhancing and/or advancing skills related to an already-learned code (e.g., enhancing speed of reading, writing, and/or comprehending; increased number or volume of words, letters, and/or phrases learned). Examples of code-related learning that can be facilitated through the systems, methods, and apparatuses disclosed herein can include, but are not limited to, Braille and Morse code. In some embodiments, the Morse code is taught via tap input for text entry on for instance, a mobile device. In some embodiments, Morse code is taught using just audio (which may result in passive learning of text entry).

In some embodiments, the systems, methods, and apparatuses disclosed herein can be used to facilitate rehabilitation. For instance, the rehabilitation can include motor skill rehabilitation related to injury, disability, birth defect, aging, or combination thereof. In some embodiments, the rehabilitation includes increasing sensory perception to individuals suffering from paralysis.

In some embodiments, the systems, methods, and apparatuses disclosed herein can be used in any application using a haptic interface, which includes, but is not limited to, teleoperation, flight simulation, simulated training, dance, simulated combat, gaming controllers, gaming add-ons for augmented reality, computer-based learning systems, and text-entry systems. In some embodiments, muscle memory is taught via conveyance of chorded input. In some embodiments, machine and/or system control is taught via conveyance of chorded input.

In some embodiments, the conveyance incorporates use of a wearable device. The wearable device can include, in some embodiments, a glove system including one or more gloves. In some embodiments, the wearable device can include a smart phone, a smart watch, a mobile phone, a computer, an electrostimulation unit, a wearable fitness unit (e.g., FITBIT®, JAWBONE®UP), a visual aid accessory (e.g., GOOGLE®GLASS).

Also disclosed herein are methods of teaching manual skills and/or music wherein: the fingers are stimulated in a pattern corresponding to a motor action/skill (using pre-programmed phrases, songs, patterns . . . ); some actions in the motor skill include multiple simultaneous finger actions ("chords"); these chorded actions are represented by sequential stimuli/stimuli with a temporal offset; and users may devote their active attention to other tasks and pay no active attention to the stimuli. In some embodiments, the delay between sequential stimuli is between 0 ms (immediately successive and/or overlapping) and 250 ms for chords, and/or 0 ms and 1.5 s for sequential actions.

In some embodiments, the sequential stimuli may alternate between hands, even within a chorded action, according to a pre-programmed pattern based upon clarity determination. In some embodiments, stimuli within a chord traversing both hands are presented sequentially with temporal offset. In some embodiments, stimuli within a chord traversing both hands are grouped (in order) by the hand (e.g., if >2 stimuli per hand). In some embodiments, stimuli within a chord traversing both hands start with the hand containing the most stimuli (=actions) in the chord. In some embodiments, stimuli within a chord traversing both hands are conveyed by alternating hands (e.g., if <2 stimuli per hand). In some embodiments, stimuli within a chord traversing both hands are conveyed by grouping adjacent stimuli (stimuli that are on the same hand, on adjacent fingers), when the corresponding fingers on the other hand are not stimulated in the chord or when the stimuli on the opposite hand is an adjacent pair. In some embodiments, stimuli within a chord traversing both hands are conveyed by alternating between hands, when the corresponding finger on the other hand is also in the chord. In some embodiments, stimuli within a chord traversing both hands are conveyed by sequences progressing from the pinky fingers towards the index fingers (on fingers requiring stimulation). In some embodiments, this is done by the hand, if ordered by the hand. In some embodiments, this is done over the entire chorded sequence, if alternating hands Also disclosed herein are methods for teaching manual tasks as described in the preceding paragraph, wherein audio accompanies tactile stimuli. In some embodiments, patterns and sequences (tactile) used for teaching are partitioned into chunks of from 10 and 18 tactile stimuli. In some embodiments, the method of teaching manual tasks is structured with synchronized audio that is used to encode meaning to the tactile patterns presented immediately before each chord-group of tactile stimuli for multiple simultaneous actions (e.g., vocalized "g" preceding the four stimuli to encode the Braille letter g). In some embodiments, the method of teaching manual tasks is structured with synchronized audio that is presented immediately before sections of sequential-action stimuli (e.g., words). In some embodiments, the method of teaching manual tasks is structured with synchronized audio that is presented preceding larger groups of stimuli (e.g., words, phrases).

While certain embodiments of the disclosed technology have been described in connection with what is presently considered to be the most practical embodiments, it is to be understood that the disclosed technology is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the disclosed technology, including the best mode, and also to enable any person skilled in the art to practice certain embodiments of the disclosed technology, including making and using any devices or systems and performing any incorporated methods. The patentable scope of certain embodiments of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

EXAMPLES

Example 1

Passive Haptic Learning of Non-Chorded Input

Haptic guidance can help users learn manual skills. This learning can still occur if the user is distracted by performing another task. In this example, it has been established that PHL effectively aids learning of rote patterns of muscle memory for the fingers of one hand. The Mobile Music Touch (MMT) project demonstrated passive learning of a pattern of keys that play a piano melody. In this research, users wore a PHL glove (wearable, tactile interface) while doing other tasks, such as taking a test or doing homework. The glove system played the song to be learned and stimulated the appropriate finger for each note. Users could ignore the vibrations, perform distracting tasks, and learning still occurs. Studies showed that participants were able to learn 45 notes of simple melodies, such as Ode to Joy, in 30 minutes using this method.

In a feasibility study, three participants passively learned how to type a phrase on a randomized, 10-key keyboard with a non-chorded, 1-finger-to-1-key mapping. The keyboard contained letters 'A'-'H', space, and enter. Users in this study wore a pair of gloves with embedded vibration motors and focused on playing a memory card game for 30 minutes while repeatedly hearing the phrase spoken and feeling the corresponding finger pattern (to type the phrase) stimulated. At the end of this PHL session, users were able to type the phrase with less than 20% error. They were also able to type the components of the phrase (words and letters) without error, and understood the mapping of the keyboard enough to type a new phrase with <20% error.

Example 2

Passive Haptic Learning of Braille Skills for Two Phrases

Here, as compared to Example 1, the experiment of Example 2 can (1) demonstrate that Braille typing skills can be "taught" without active attention of the learner; (2) articulate a method of teaching chorded input using a sequential tapping pattern (where previous efforts at teaching chords failed); (3) establish a method for teaching the entire Braille alphabet in four hours; (4) demonstrate that Braille letter identification, both visually and tactilely, can be a side effect of learning to type Braille; and (5) introduce a distraction task with more sensitive performance metrics.

This example involves a system for Passive Haptic Learning of typing skills. In a study containing 16 participants, users demonstrated significantly reduced error typing a phrase in Braille after receiving passive instruction versus control (32.85% average decline in error vs. 2.73% increase in error). PHL users were also able to recognize and read more Braille letters from the phrase (72.5% vs. 22.4%). In a second study, containing 8 participants, the full Braille alphabet was passively taught over four sessions. Typing error reductions in participants receiving PHL were more rapid and consistent, with 75% of PHL vs. no control users reaching zero typing error. By the end of the study, PHL participants were also able to recognize and read 93.3% of all Braille alphabet letters. These results suggest that Passive Haptic instruction facilitated by wearable computers may be a feasible method of teaching Braille typing and reading.

Example 2 tested whether Braille typing skills can indeed be learned passively. To evaluate this, the study measured user performance on typing tests surrounding learning periods. During each study session, the user was given a pre-test before any learning, then performed a distraction task with or without simultaneous Passive Haptic Learning. The session concluded with a typing post-test and Braille reading quizzes. The distraction task was scored so PHL's effect on user performance could be examined. Braille reading quizzes examined whether there was a transfer of knowledge between Braille typing and reading skills. Each user participated in two sessions: one with PHL and one with none (control). All users learned one of two phrases during their first session, and learned the remaining phrase during their next session. The experiment was counterbalanced for phrase and condition. Participants are all native English speakers who did not know Braille.

Figure 3:
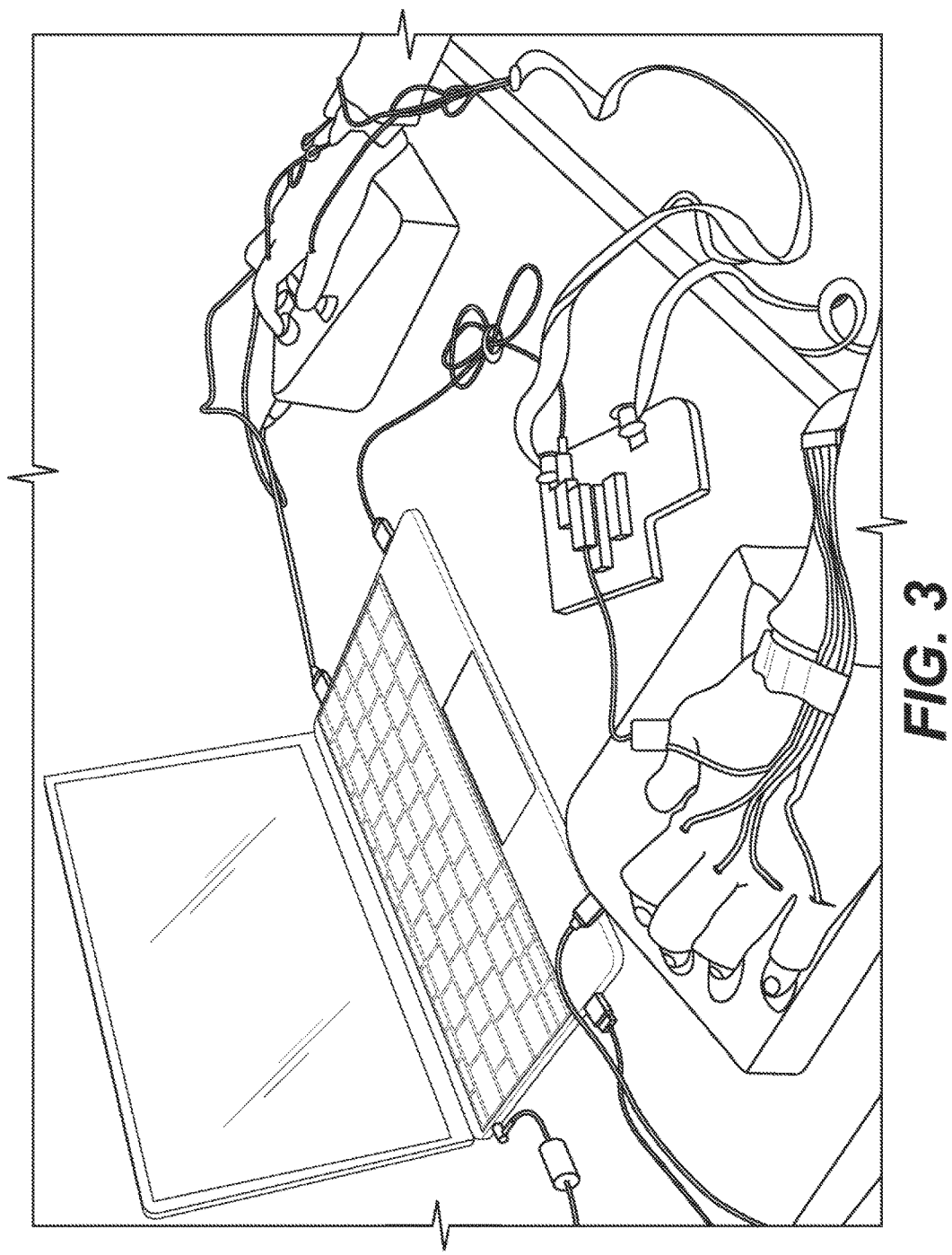
FIG. 3 depicts a system used in Example 2.

System: This system used in Example 2 included a pair of gloves with one vibration motor in each finger and a programmed microcontroller to drive the glove interface. The microcontroller coordinated vibration timings and sequences to correspond with audio prompts for two phrases. For convenience, created herein is a Braille keyboard from two BAT keyboards. The system is shown in FIG. 3.

Gloves: The wearable, tactile interface used to deliver vibration stimuli in Example 2 was in the form of a pair of gloves. The gloves were fingerless for optimal fit on different size hands, enabling the motors to rest flush near the base knuckle of each finger. Each motor was secured to the stretchy glove layer using adhesive and was located on the back of the hand (dorsal, non-palm-side) inside the glove. These gloves used Eccentric Rotating Mass (ERM) vibration motors (Precision Microdrives model #308-100) and were driven high or left floating through a Darlington Array chip attached to an Arduino Nano with buffered circuitry.

Audio and Vibration Sequences: Braille is a chorded language, meaning that multiple keys are required to type one alphabet character. Rather than deliver stimuli simultaneously to all fingers used in typing a given chord—as human perceptive ability of these simultaneous stimuli is limited—each chord's vibrations were staggered by activating the motors sequentially instead. Audio and timing cues were used to indicate the completion of a chord (letter) to users.

There were two circumstances in which vibration and audio are used together for this study: once during each pre-test and during Passive Haptic Learning. During both these times, users were presented with audio of each word in the session's phrase followed by the audio spelling of that word. After each letter was spoken, the motors on the fingers required to type that chorded letter were each vibrated in a sequence. When that chord was finished, the system paused for 100 ms before playing the audio for the next letter. This audio-haptic stimulus was repeated for the entire distraction task period for PHL, with 10 seconds rest in between each repetition. Motors were activated for 300 ms to 750 ms, and phrase vibration sequence timings were chosen to enable clear discrimination and recognition of vibrations and separate chorded letters. This results in approximately 60 repetitions of the phrase during the distraction task period.

Keyboard: The Braille keyboard used in this study consisted of two Infogrip BATs. BAT keyboard inputs were translated into Braille keyboard entries. Key presses generated ASCII characters that were translated to the appropriate Braille value from a hash-map. Both staggered entry (pressing one key down at a time and then releasing all of them) and simultaneous entry (pressing all the required keys down at the same time) are supported. This technique produced a chorded input system that follows the Perkins Brailler standard as digital Braille keyboards do, such as Freedom Scientific's PAC Mate.

Typing Software: Typing test sessions in our studies were administered by specialized typing software. The software prompted the user via audio and showed a blank screen. Upon each successful entry of a Braille letter or space, the screen displayed an asterisk (to prevent learning during testing, and provide feedback on correct entry technique). This software logged user input and performance, and calculated statistics like uncorrected error rate (UER) and words per minute (WPM) using formulae detailed by MacKenzie & Tanaka-Ishii, *Text Entry Systems: Mobility, Accessibility, Universality* (2007), San Francisco, Calif.: Morgan Kaufmann.

Figure 4:
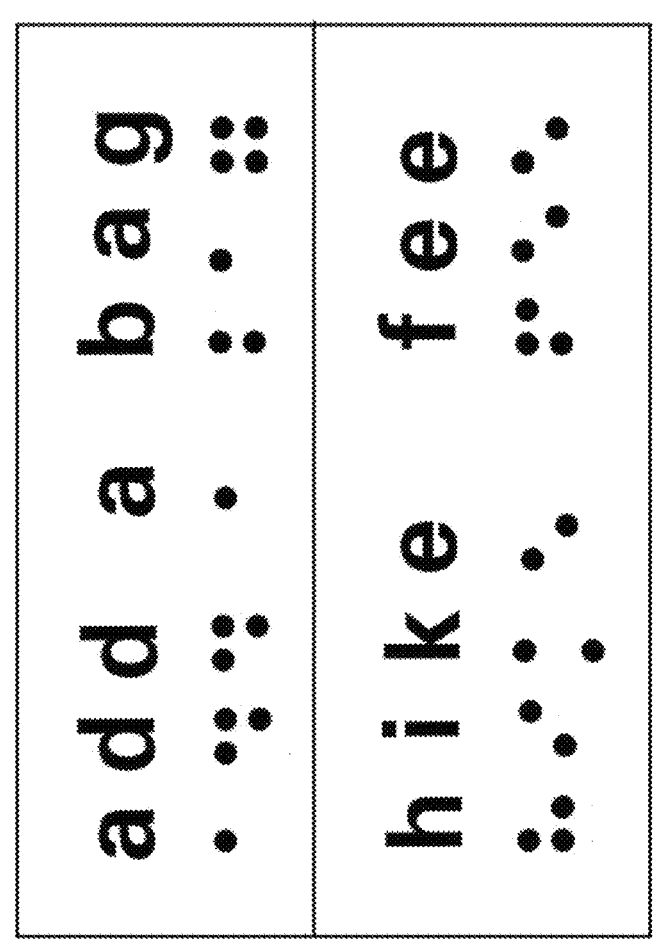

Phrases Tested: The phrases (FIG. 4) used in this study were "add a bag" (AAB) and "hike fee" (HF), and were chosen for easy identification via verbal audio clips. These phrases do not include homophones, difficult or little-known spellings, and have coherent meanings for easy understanding and memory. They were also chosen to be of comparable length (15-18 vibrations). Finally, these phrases consist of Braille letters requiring no more than three keys each to type and have comparable complexity (repeated letters, 4 or 5 unique letters, containing words of 3-4 characters).

Pre-Test: Initial performance of users was determined through a typing pre-test. Study administrators use a verbal set of instructions and gestures to introduce participants to the keyboard and the nature of typing chords. This procedure allows users, who all came from an uninformed position, to understand the nature of typing on the chorded keyboard and to comprehend the meaning of the audio and vibrations. At the start of the pre-test, participants heard the current phrase's audio and felt the corresponding vibration sequence once before being prompted to try typing the phrase. Users were given one trial at typing the phrase during the pre-test. During this first vibration-guided pre-test, they were asked to pay attention to understanding the meaning conveyed by the vibrations, and to use the pre-test to understand how to correctly type chords on the keyboard. Results from this pre-test are used as a baseline for users' typing performance.

Distraction Task: After the pre-test, subjects in both PHL and control conditions participated in a distraction task. The distraction task let the subjects focus on tasks other than PHL and measured their ability to perform while receiving the stimulus. Both groups were given 30 minutes of distraction task with the gloves on and ear buds in. In this study, the distraction task used was an online game. Users were told to focus only on the game and give any audio and vibrations no attention. During the task, both groups were also asked to score as high as possible. At the end of each distraction task period, their scores were logged.

For this study, the distraction game was chosen to (1) be difficult/cognitively demanding/mentally taxing; (2) contain no reading/words; (3) emit no sounds/mutable; and (4) log a score. An online game called Fritz! was selected as the distraction task and was administered to both groups. Before the game, all subjects were provided with instruction on how to play. The goal of Fritz! was to clear levels of blocks by aligning those of similar patterns through moving adjacent blocks. If users were experiencing a PHL study session, they received haptic and audio stimulation while they played the game. Control groups were provided with neither PHL audio nor vibration. For the purpose of the study, PHL groups were specifically told not to pay any attention to the vibrations or audio and to focus entirely on the game.

Post Test: After the distraction task, users were given a typing (post) test. During this test, participants were first prompted to type the entire phrase they just learned (and/or attempted during the pre-test). They were given three trials to type the full phrase, before being prompted (for three trials) to type each word in the phrase, and each letter in the phrase (presented in random order). Participants felt no vibrations during the test.

Braille Reading Quizzes: The goal of this research was to examine the potential of Passive Haptic Learning for the application of learning typing skills on the Braille Keyboard. There is a linear mapping between the Braille Keyboard and the dots of the Braille cell, so Braille reading quizzes were added in addition to Braille typing tests—on the off-chance that participants could use the typing skills they passively learned to understand and read Braille as well. The quizzes were designed to determine if this transfer occurred or not. Recruiting was from a pool of sighted individuals that do not know Braille, and it is understood that tactile perception may be difficult for these untrained individuals. For this reason, reading quizzes were included that used visual representations of Braille, in addition to "tactile quizzes" using embossed Braille representations.

Two quizzes were administered at the end of each session. The visual quiz was presented before the tactile quiz because it was assumed to be the simpler of the two, since the tactile quiz combines Braille typing-to-reading translation with tactile perception.

Figure 5A:
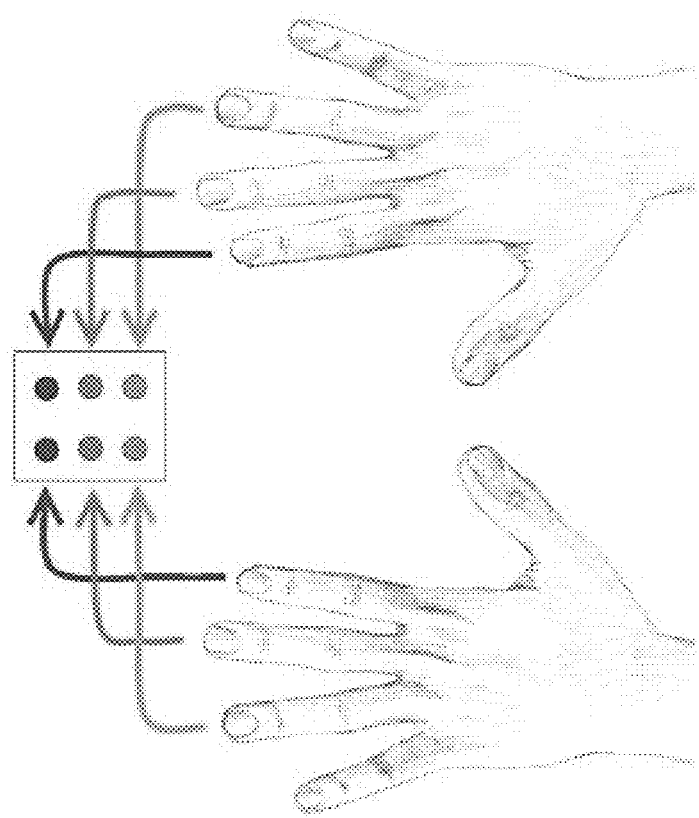
FIG. 5A depicts a mapping diagram for Braille used in Example 2.

At the beginning of both quizzes, instructions were provided that described how the finger mapping of the keyboard aligned with the dots of the six-dot Braille cell. Study administrators also demonstrated this mapping using their hands in combination with a verbal set of instructions to ensure participants correctly understood the relationship. The picture used on the quizzes to convey the mapping can be seen in FIG. 5A.

Figure 5B:
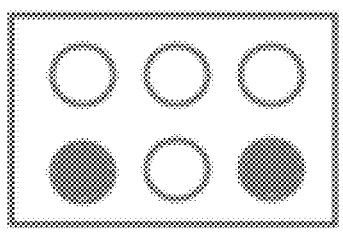
FIG. 5B depicts an example of a visual quiz used in Example 2.

Visual Quiz: The visual quiz was comprised of images of Braille cells with dots filled-in or left empty to illustrate what would be embossed on a printed Braille document. One question was created for each letter from the phrase they were assigned. The "add a bag" session users were quizzed on the phrase's letters in the consistently randomized order: d, g, b, a. For the "hike fee" session, they were quizzed in the order: f, i, e, k, h. Each question showed a Braille cell image (FIG. 5B) and asked users to write-in the letter it represents.

Figure 5C:
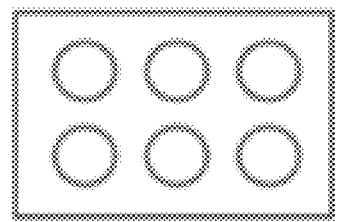
FIG. 5C depicts an example of a tactile quiz used in Example 2.

Tactile Quiz: The Tactile Quiz was designed to understand whether the student can perceive the Braille cells with their fingers, and whether they can identify the letter from what they perceived. For this quiz, the subject placed their dominant hand into a box, open only on one side, which contained a card embossed with the current letter from the quiz. This setup allows the subject to slide their hand in and access the Braille with their fingers without glimpsing the Braille on the card. Participants were given the same letters that appeared in their visual quiz but in a different consistently randomized order (b, g, a, d and h, e, f, i, k). After the student feels the Braille cell using their fingers, they bubble-in a blank Braille cell on the quiz—three rows of two small empty circles—to indicate what they perceived (FIG. 5C). Subjects also filled-in a blank with their identification of the embossed letter.

RESULTS OF TWO-PHRASE STUDY: With the aid of PHL, participants significantly reduced typing error rates on the Braille keyboard, often reaching 100% accuracy. Users also learned to read nearly 75% of the Braille letters presented. These findings suggest that users learned some Braille/chorded text entry via Passive Haptic Learning.

Typing: The typing software used in the study also calculated uncorrected error rate (UER) and words per minute (WPM), which were used for analysis of the participants' performance. As this study was within-subjects, paired t-tests are used to compare the effect of receiving PHL versus not having PHL. Because the a priori hypothesis was that PHL will improve performance on phrase and letter typing accuracy and visual and tactile recognition of letters, no familywise multi-hypothesis correction was necessary. Threshold of significance was set to $\alpha=0.05$.

Figure 6:
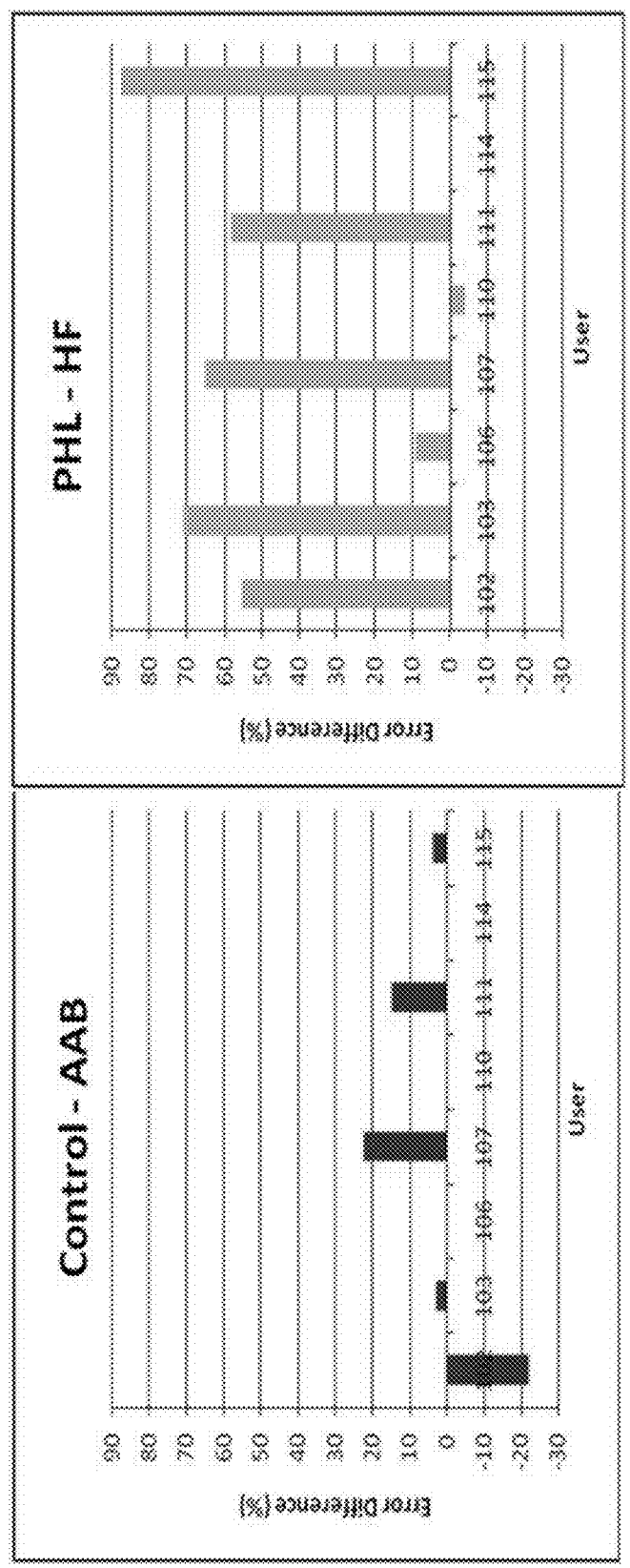
FIG. 6 depicts the typing accuracy improvements for participants who typed "add a bag" in their control session and "hike fee" in their passive haptic learning session in the study described in Example 2.
Figure 7:
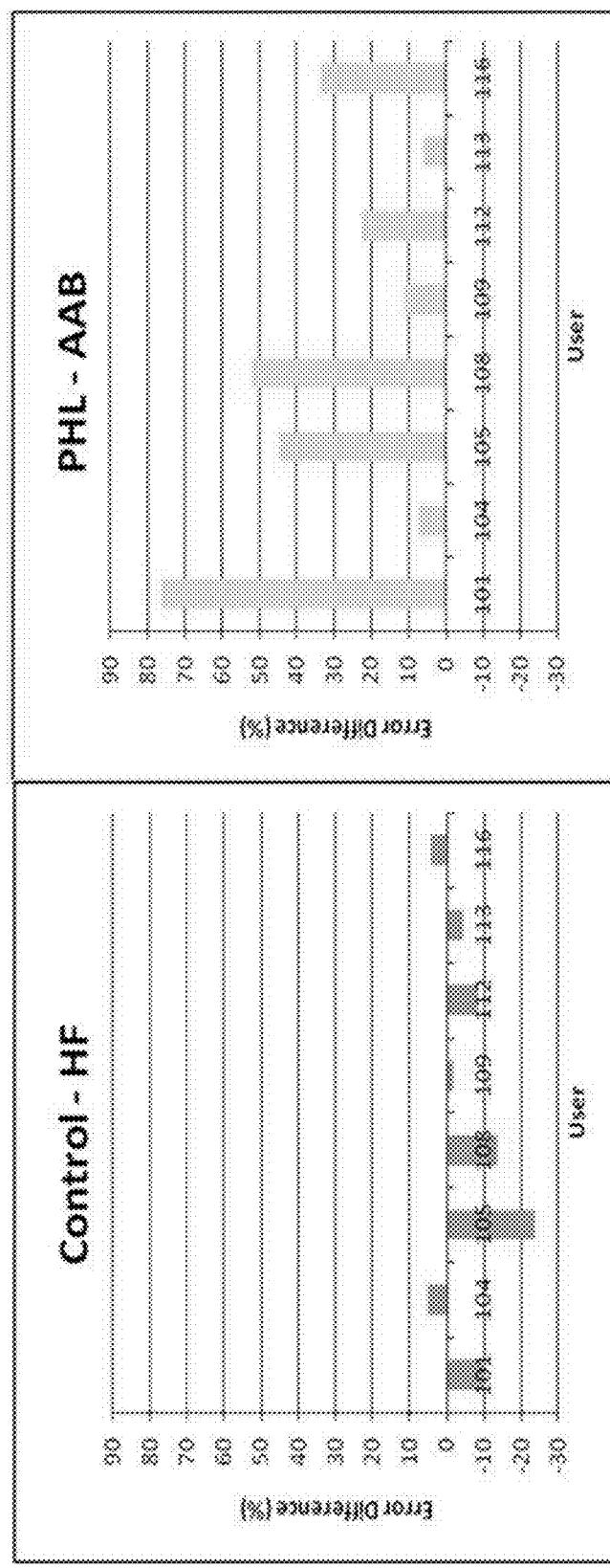
FIG. 7 depicts the typing accuracy improvements for participants who typed "hike fee" in their control session and "add a bag" in their passive haptic learning session in the study described in Example 2.

Comparing the typing error rate in the pre-test trial with the average error rate of the three phrase-typing trials on the post-test, the UER (uncorrected error rate) difference was calculated and graphed for each user's sessions. For both phrases, as seen in FIGS. 6 and 7, users reduced their typing error (increased accuracy) significantly after passive learning sessions (31.55% and 42.78% on average).

Figure 8:
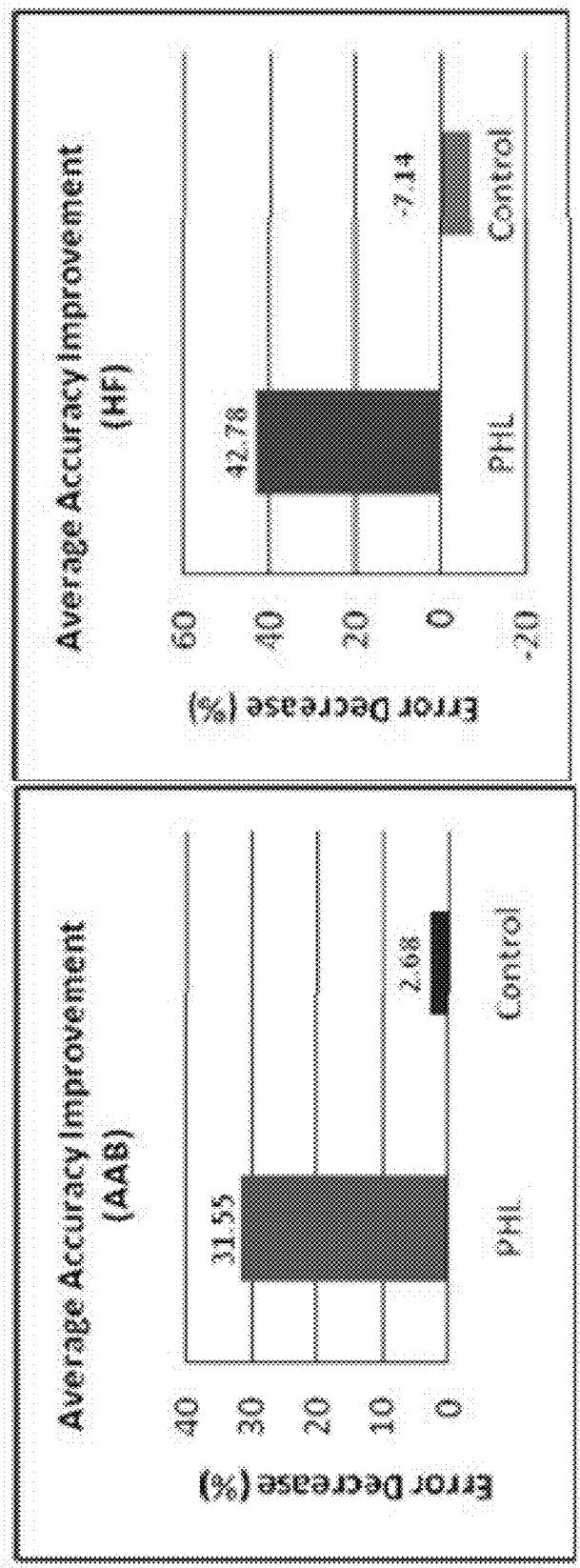
FIG. 8 depicts the average typing accuracy differences between the two phrases (HF="hike fee" and AAB="add a bag") tested in the study described in Example 2.
Figure 9:
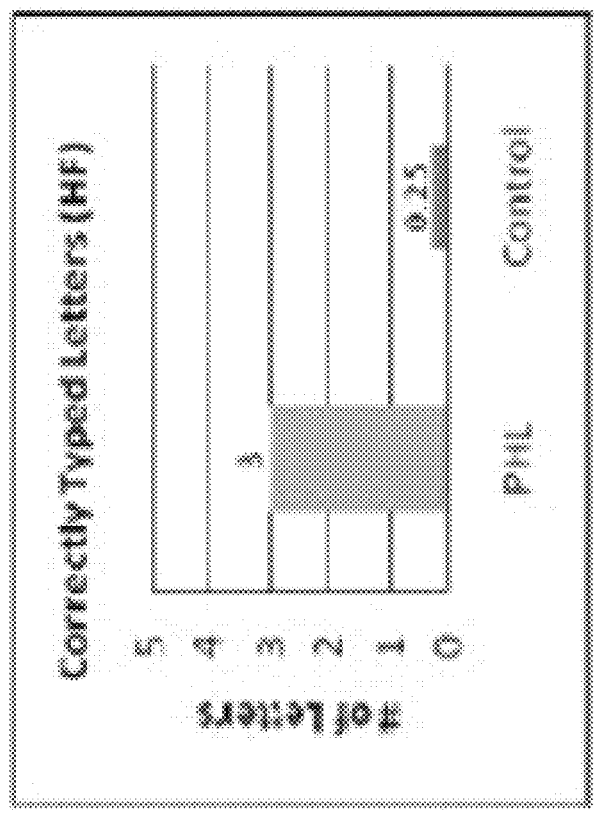
FIG. 9 depicts the letters typed correctly for the two phrases (HF="hike fee" and AAB="add a bag") tested in the study described in Example 2.
Figure 9:
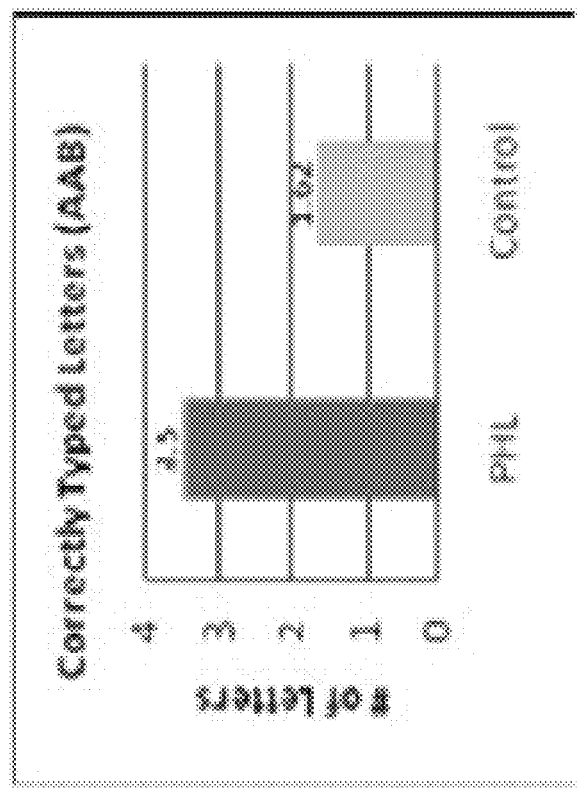

This result was not true for control sessions, where minimal to no improvement (2.68%) was the norm for "add a bag" and increased errors (up 7.14%) was the norm for "hike fee." This data is represented in the average improvements in accuracy for each phrase (FIG. 8). A paired t-test suggests a statistical difference in the conditions: participants given PHL have a larger AER difference (39.14) between pre-test baseline performance and post-test performance (M=37.16, SE=30.22) than people not given PHL (M=−1.97, SE=11.98; BCa 95% CI[22.0, 56.27], t(15)=4.87, p<0.00001). When a participant was asked to type each single letter from the phrase, the number of correctly typed letters was significantly higher for PHL sessions than for control (FIG. 9).

T-tests illustrate that there is a statistical difference (2.31) in the number of correct letters typed between the conditions when participants are given PHL (M=3.25, SE=1.69) than people not given PHL (M=0.94, SE=1.12: BCa 95% CI[1.33, 2.31]; t(15)=5, p<0.00001).

Distraction Task: The base performance for participants on the distraction task, the Fritz! Game, were also characterized. A player not in the PHL study conducted three trials of his game play. Each trial consisted of 10 minutes of a focused session and a distracted session. During the focused session, the player played the game only. For the distracted session, the player was instructed to play the game while attending a television program as well. The player showed reduced scores during distracted game sessions by an average of 19.36%.

Figure 10:
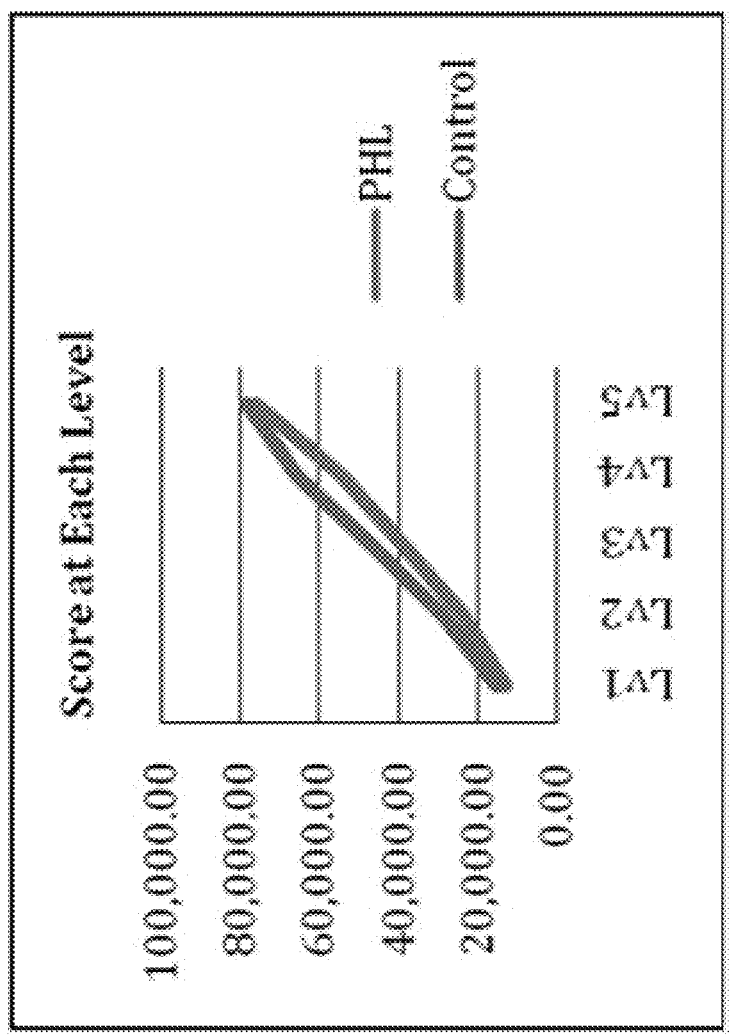
FIG. 10 depicts the scores received during the distraction test at each level for the study described in Example 2.

All 16 subjects played the game for each PHL and control sessions and cleared up to level 5 during the 30 minutes. Results for performance differences were noisy due to the nature of the game, but average score differences between PHL and control were found to be within 10% as seen in FIG. 10. These results help to demonstrate and reconfirm the sensitivity of our chosen distraction task at monitoring user attention and mental resource sharing.

Reading Braille: Average score (letters identified correctly) was used to compare the tactile and visual quiz performance of participants that were given PHL and those that were not (control group). For sessions assigned either phrase, participants that were given PHL performed significantly better on reading (identifying) Braille letters. All users had near perfect tactile perception of the Braille cells; thus, PHL had little to no effect on the perception of letters on the Braille cards.

Figure 11:
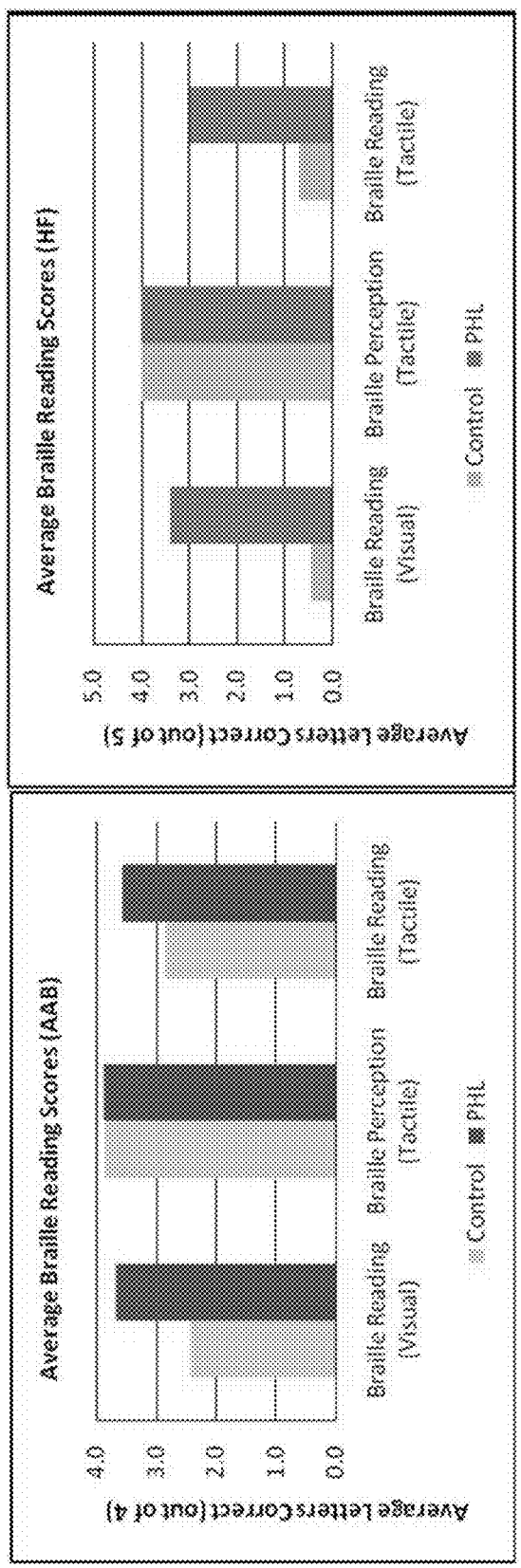
FIG. 11 depicts the reading scores between conditions tested in the study described in Example 2. The left "visual" bars are from visual quiz results, while the right "tactile" bars present results from the tactile quiz, as described in Example 2.

The "add a bag" (AAB) Phrase Performance: As seen in FIG. 11, performance on the Braille reading quizzes was better in PHL than in control. Users were able to read 91.7% of the phrase's letters in Braille after receiving Passive Haptic Learning. Perception (of embossed Braille dots with the fingers) was nearly even between the groups, and on average, untrained users' tactile perception of the dot configurations was excellent (near 4 of 4 letters). Identification accuracy (# of correctly recognized letters) of the embossed (tactile) Braille was close to the same as identification accuracy during the visual test. If a participant was able to correctly perceive a Braille letter, their accuracy at correctly identifying that letter typically mirrored their ability on the visual quiz.

The "hike fee" (HF) Phrase Performance: Findings from the "add a bag" quizzes remained consistent in "hike fee" sessions as well, as shown in FIG. 11, with the PHL group far outpacing the control group. As also seen in typing scores, group differences were more evident in HF performance. The average number of accurately identified letters differed between the control group and the PHL group by three letters out of five. PHL participants again showed no difference in perception of Braille dots using the fingers (on the tactile quiz) from those that didn't receive passive learning; while identification on the tactile quiz for the PHL group was on average 2.3 letters better. Passive Haptic Learning participants did significantly better in reading Braille than the control group.

DISCUSSION OF TWO-PHRASE STUDY: Results of this initial study indicate that Passive Haptic Learning of chorded text entry is indeed possible. Typing test results show that users can learn to type Braille passively through vibration and audio stimuli alone. Study administrators observed users typing not only "staggered" input for each letter, but also simultaneous chorded input. This observation supports the idea that, given our current system structure, users were able to grasp the nature of chorded typing as well as understand the meaning of the audio and vibration sequences (that users received during the vibration-guided pre-tests and PHL period).

A larger performance gap was found in HF sessions. This effect is believed to be indicative of the phrase's higher difficulty. Though the phrases were designed to be as well-matched as possible, "hike fee" has five unique letters and more vibrations, undoubtedly resulting in some increased difficulty. This difficulty lets users learn less of the phrase during the pre-test, the source of any knowledge in the control group; while PHL users could successfully passively learn the difficult phrase.

Distraction task performance helped confirm that users paid little attention to the vibration and audio stimulation during PHL. Score differences were minimal, though they may indicate some mental resource sharing by this spatially-based game and our passive stimuli. Experimentation using this game indicates its sensitivity in scoring and that it fits well with our parameters. In practice, however, a goal was to create a system by which users can acquire Braille typing skills with little perceived effort. If PHL for Braille is a mild distraction while performing another task, that goal can still be reached.

It was also found that users could transfer knowledge learned in typing on the Braille keyboard to reading Braille. This result—acquisition of Braille reading skills through (passive learning of) Braille typing—may have intriguing implications. During the entire study, users were in the "asterisks" condition of uninformative feedback for all typing tests, meaning that users never saw what they typed on screen and had no indicators whatsoever of their correctness throughout the entire study. The only learning participants received was guided by the haptic interface—not an inappropriate mechanism considering the target audience (users who are blind). It is believed that application of this technology can be used to help improve Braille literacy.

Several components of these findings on Braille reading are of note. As could be expected, perception using the fingers was the same for both PHL and control groups. Interestingly though, our sighted, untrained pool of users were able to correctly perceive embossed Braille using their fingertips. Within each group (PHL or control), users identified nearly the same Braille letters during both the visual and tactile quizzes, a logical finding because if a user knows a letter visually, then they know that letter tactilely as well. A prominent finding regarding identification (reading) is the gap between those with Passive Learning and those given only the pre-test introduction. This result coincides with congruent results of user typing performance, indicating more strongly that users passively learned. Encouraged by the results of this feasibility study, the work was expanded to examine teaching typing of the entire Braille alphabet passively in Example 3, below.

Example 3

Passive Haptic Learning of Braille Skills for Full Alphabet

Example 2 focused on whether Passive Haptic Learning of Braille typing skills was possible. Example 3 investigates a larger goal: making and studying a system that facilitates Passive Haptic Learning of typing the full alphabet in Braille.

This study is an investigation into making and testing a real-world passive Braille instruction system. For the Full Alphabet Study, the number of sessions was increased and the amount of time spent in PHL was decreased. An 8-word pangram was taught passively, one word at a time. The study is four sessions in length, each session composed of two compressed "mini-sessions" containing a typing pre-test, distraction task, typing test, and reading quizzes. Each of these mini-sessions are structured in the same way as sessions were in the Example 2, but distraction task periods lasted only 20 minutes. The time for Passive Haptic Learning (which occurs during the distraction period) was reduced, because oftentimes in Example 2's study, users encountered a ceiling effect (0% error in PHL) for the 4-letter (9 character) phrase over 30 minutes. This study is also a trial at exploring the necessary time for PHL and at reducing the overall time to learn Braille.

Using this structure, a randomized, controlled, between-subjects study of the full alphabet system on eight participants was studied (all sighted, native English speakers who did not know Braille). Each user was designated as either PHL or control and received only that condition throughout the study. Every mini-session corresponded to a word in the pangram #1 ("The quick brown fox jumps over the lazy dog," as discussed below), and users learned 2 words per visit (2 mini-sessions per session). All users learned the pangram's words in order (the repeated "the" was omitted between "over" and "lazy").

Pangram #1 for PHL: With the intent of teaching how to type the full alphabet, a pangram was used as a set of words to passively train the user. A pangram contains all 26 letters of the alphabet at least once, and forms a sentence in English. The sentence chosen as the main pangram to be used in Passive Haptic Learning was "the quick brown fox jumps over the lazy dog." This pangram was chosen over others for four primary reasons. The sentence is coherent and familiar to many English speakers, which enables users to remember and understand the phrase seamlessly. This pangram was chosen also because it uses non-ambiguous words with few homophones, which can be an important consideration when using audio prompts. Words in the pangram are also of nearly equal lengths, with 3-5 letters and 10-17 vibrations each, remaining consistent with previously determined lengths for PHL phrases. Finally, this sentence contains just eight unique words and repeats only four letters.

System: The system was updated to provide audio prompts for the necessary content to be used in the typing pre-tests and tests (which maintained similar structure to those of Example 2). Prompts for the PHL pangram #1 consisted of only audio of the phrase or word. Audio prompts for the untaught #2 pangram (introduced in the post-test section) each consisted of the word, followed by its spelling. This procedure was done for clarity of understanding on the part of the user, as this pangram is both uncommon and unfamiliar, and contains words with potentially unknown spellings. This method also emphasizes the composition of the word, allowing the participant to type the letters that they have already learned even though they have not learned the full/self-contained word.

The typing software was also updated to display informative feedback (letters typed) to the user. This change was made—from displaying only asterisks to displaying letters typed-because a goal for the Full Alphabet Study in Example 3 was examining whether PHL can be used to teach typing of the entire Braille alphabet. Here, the feedback was intended to help reinforce learning and encourage confidence.

The gloves with embedded tactile interface of ERM vibration motors remained the same for this study, as did the Braille keyboard, as presented in Example 2. Audio and vibration sequences maintained the same structure, with each word being spoken, followed by its spelling coordinated with each letter's keys vibrated in sequence, as presented in Example 2.

Pre-Test: During the first pre-test only, users received the full pangram #1 with coordinated vibration once and did not receive vibration stimuli again in the study except during PHL. Similar to Example 2, participants then had a chance to type the full pangram. This initial vibration-guided trial (only in the very beginning of the study, in mini-session "the"), was followed by a standard pre-test present in all mini-sessions. This pre-test consisted of one trial each at typing the entire pangram #1 and then each word that it contains (presented in a random order). Pre-tests form the baseline in user performance before each PHL (or control) period. Introductions to chords and the initial vibration sequence were identical to procedures from Example 2.

Distraction Task: In this between-subjects study, users who were designated as PHL received audio and vibration stimuli during the distraction task, while those in the control group received only the audio of the current word repeated on a loop. The same online game is used in this study as in Example 2. During each mini-session, users were told not to pay any attention to the vibrations or audio and to focus all their attention on doing their best at the game.

Post-Test: Following each distraction task period, users were given a typing (post) test. Participants felt no vibration during the test and heard audio prompts provided by the typing software. The test consisted of three trials at typing the mini-session's word, followed by three trials typing each of the letters in that word (in a randomized order), and three trials at typing the full pangram #1. The test then prompted users to type each word in the "untaught" #2 pangram, presented in random, giving them three trials for each of these words as well, before concluding with one trial typing the full untaught pangram. The #2 "untaught" pangram was selected to be "when zombies arrive quickly fax judge pat" based upon the same factors for selection of the PHL pangram—it contains coherent meaning, similar word lengths (10-18 key-presses each), and contains few repeated letters.

Braille Reading Quizzes & Full Tests: The structure and administration of the (visual) quiz and tactile quiz was the same as used in Example 2. Quizzes were created for (the letters in) each of the 8 words in the PHL #1 pangram and were presented at the end of that word's mini-session. Following the completion of the final Quizzes (at the end of the fourth visit, mini-session "dog"), the full test and full quizzes were given. The full typing test consisted of three trials at typing every letter of the alphabet. The full quizzes were a visual and a tactile quiz containing a randomized list of all the letters of the alphabet.

RESULTS OF THE FULL-ALPHABET STUDY: Users receiving PHL outperformed those that did not. This finding was true for the full pangrams/alphabet as well as for individual words. Data indicates that a system for PHL instruction of Braille can rapidly and successfully help individuals learn reading and typing passively.

Typing Phrases: Participants receiving PHL throughout their learning time showed greater improvements in performance, often reached perfect performance, and did so in less time than those without passive learning.

Figure 12:
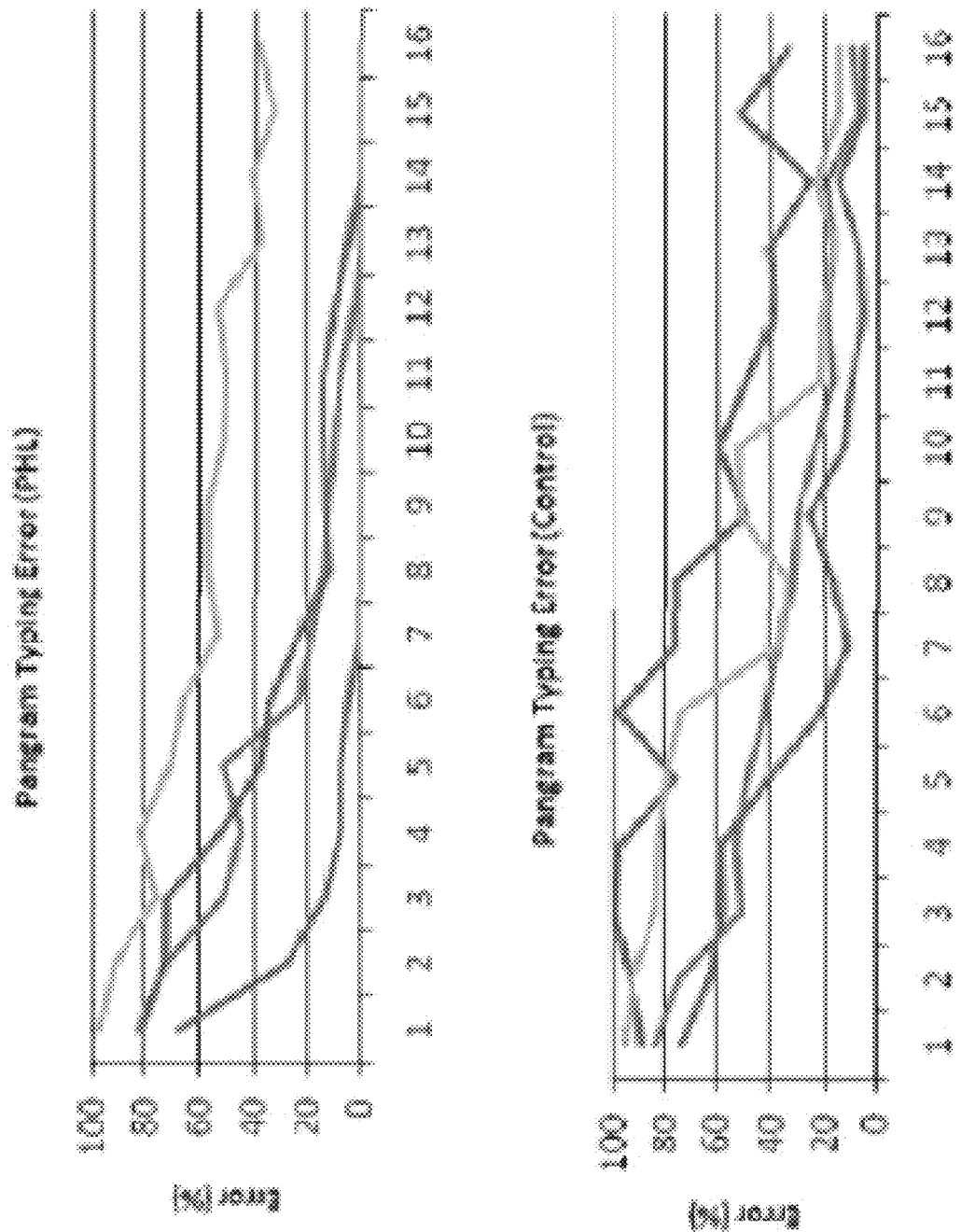
FIG. 12 depicts typing error rates between a control group and a Passive Haptic Learning group for Panagram #1 in the study described in Example 3.

As illustrated in FIG. 12, participants experiencing PHL were able to reduce their errors in typing the main pangram #1 phrase more rapidly and consistently. A single-factor ANOVA was also performed on the groups' pangram typing error rates over the study's 16 tests, and it found a statistical difference between the conditions (F=10.05, p<0.0001). Because of the informative feedback used during testing periods, control users learned some letters through Active Practice trial-and-error; however, their learning was highly variable and more gradual. No users in the control condition achieved 0% error: while ¾ users receiving PHL reached perfect performance on average before the final session.

Figure 13:
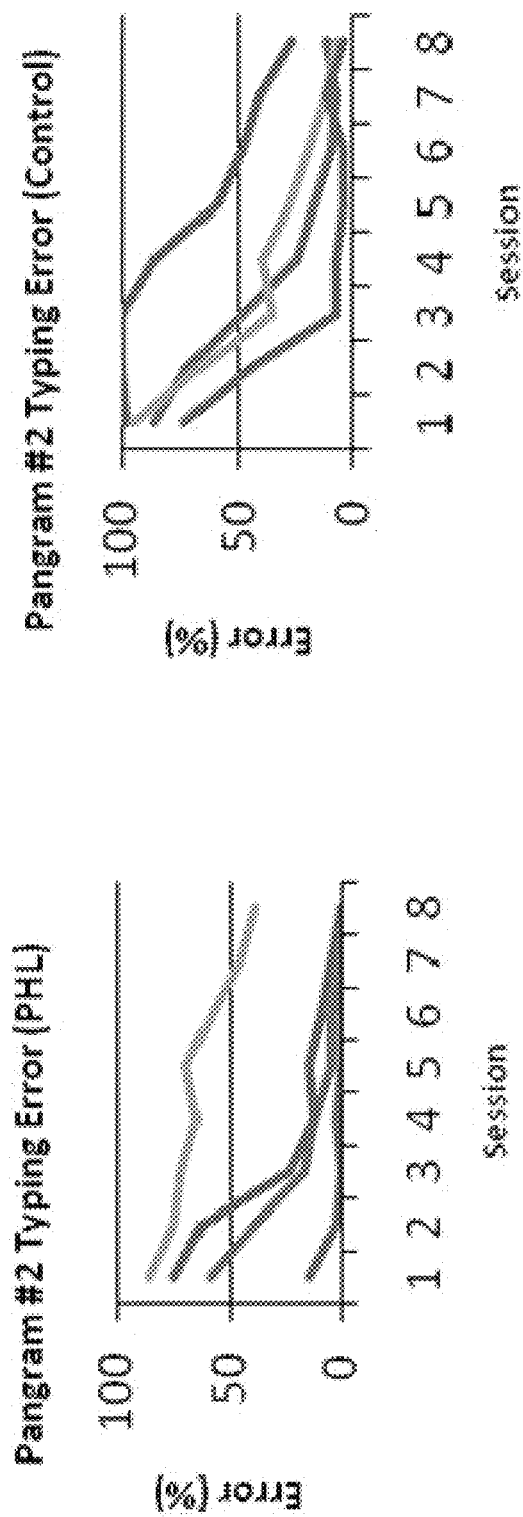
FIG. 13 depicts typing error rates between a control group and a Passive Haptic Learning group for Panagram #2 in the study described in Example 3.

These results suggest that PHL can be used to reduce learning time and difficulty for people learning Braille typing. Users not receiving PHL had significantly more variation in their number of typing errors. The near monotonic decrease in error for participants given PHL suggests that, as in previous work, passive learning may be aiding in passive rehearsal as well. Similar effects can be seen in user performance of the second "untaught" #2 pangram during the tests, as is illustrated in FIG. 13. Single-factor ANOVA results for this pangram's (#2) typing error rates over the 8 tests again found statistical difference (F=7.138, p<0.0001).

Figure 14:
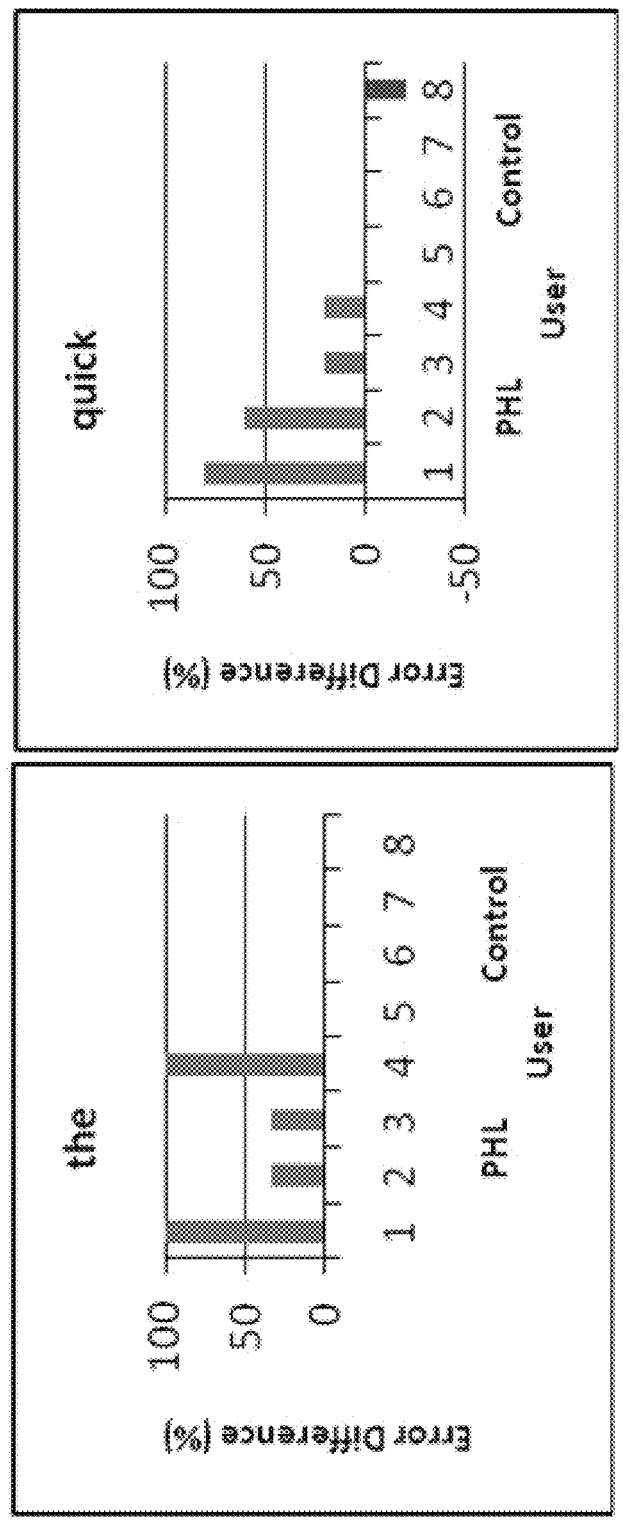
FIG. 14 depicts pre-test and post-test error rates between a control group and a Passive Haptic Learning group for "the" and "quick" in the mini-sessions devoted to learning those words in the study described in Example 3.

Typing Words: As in Example 2, users receiving PHL illustrated UER differences between pre-tests and post-tests for each word. These improvements in PHL users' performance can be seen in FIG. 14, which shows differences in error rates before and after passive instruction (or lack thereof) of that word. Words at the beginning of the pangram are highlighted in the image because this performance difference is most visually noticeable in initial sessions, before PHL users achieve 0% error on that word (while there is still room for improvement).

Figure 15:
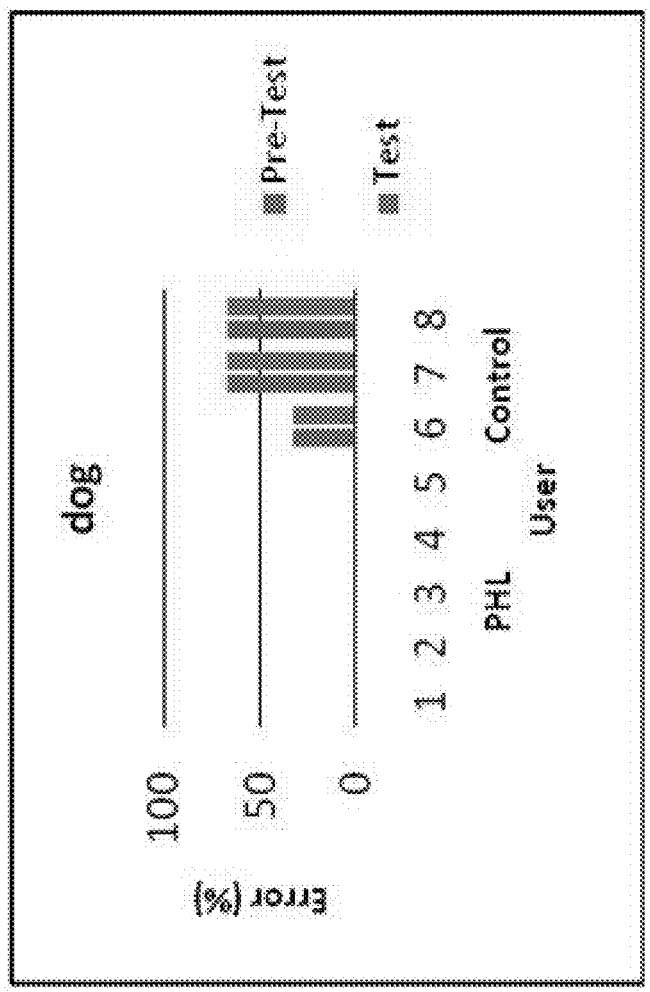
FIG. 15 depicts pre-test and post-test error rates between a control group and a Passive Haptic Learning group for "dog" in the mini-session devoted to learning that word in the study described in Example 3.

FIG. 15 gives another view on the difference in word typing performance between PHL and control groups. On later words in the phrase, PHL participants achieved 0% error and control participants continued to stagnate around 30-60%.

Distraction Task: From distraction task scores analysis, data shows that the control subjects showed better average performance than PHL by 3.03%. The more equitable performance between groups compared to Example 2 may be due to the addition of audio stimuli during the distraction task in the control group. This result suggests that users undergoing Passive Haptic Learning heeded instructions and did not pay attention to the vibration stimuli.

Figure 16A:
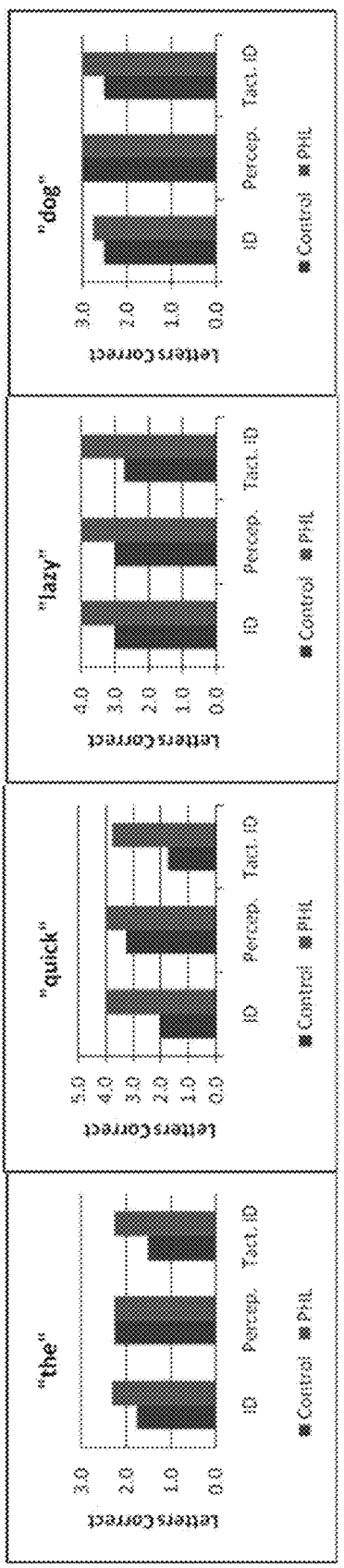
FIG. 16A depicts reading scores for mini-sessions 1, 2, 7, and 8's quizzes in the study described in Example 3. Here, ID is visual Braille reading, "Percep." is tactile perception and "Tact. ID" is tactile reading score.
Figure 16B:
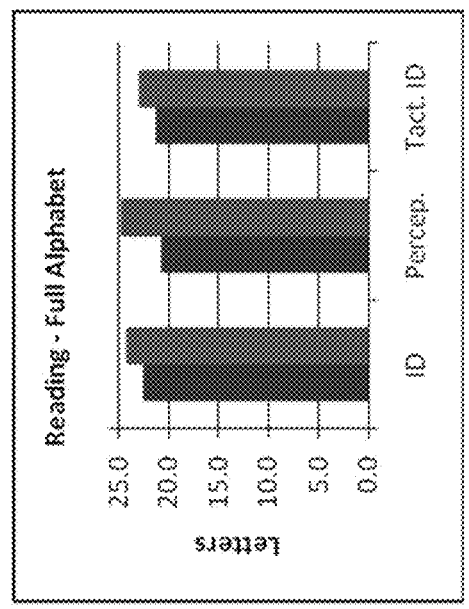
FIG. 16B depicts the full Braille reading quiz results in the study described in Example 3. The control bar is on the left and the PHL bar is on the right.

Reading Braille: As seen in FIG. 16A, PHL participants also out-read users in the control group to achieve high levels of correct Braille reading in all words' tests. Those who received Passive Haptic Learning correctly read within one letter of possible on average for each word's quizzes, while control users identified fewer letters. Identification accuracy on tactile quizzes followed that of visual quizzes, as was also true in Example 2. For 3-letter words in the PHL pangram—the, fox, dog—as seen in Example 2, perception accuracy was consistent between groups; however, words of 4-5 letters saw a difference in tactile perception accuracy between PHL and control users. This result is present in word quizzes, as well as the full quiz (FIG. 16B). On the final quiz, PHL participants successfully read 93.3% of the Braille alphabet on average.

Questionnaire: Users were then presented with a nine-question survey. Seven-point Lickert scales were used on some questions (Strongly Agree (7) to Strongly Disagree (1)). Select results are shown in Table 1, below.

TABLE 1

| Question | PHL | Control (did not receive vibration) |
| --- | --- | --- |
| "I did not actively pay attention to the vibrations while playing the video game" | 7 (x4) | 5 (x2), 7 (x2) |
| "Near the end of the sessions, I didn't pay attention to the vibrations at all" | 7 (x3), 6 (x1) | 3 (x1), 7 (x3) |
| "I focused only on playing the video game" | 7 (x2), 6 (x2) | 7 (x2), 6 (x2) |

DISCUSSION: In Example 3, users receiving Passive Haptic Learning dominate throughout learning to type the full Braille alphabet and reach 0% typing error within four hours. Results indicate that those with PHL were able to learn words passively, and complete learning more quickly. All users were able to learn actively some letters through trial-and-error during the tests, and those with PHL reached 0% error rapidly by needing only to actively learn a few unknown letters (i.e., "z" before they were passively taught 'lazy') because other letters they encounter on the tests were known from passive learning.

Full study results also suggest that typing practice can also act as reading practice. Those receiving PHL again read more than those with only control (active practice). The gap in perceptive ability in those without Passive Haptic Learning is unexpected though. Without wishing to be bound to theory, it is hypothesized that those experiencing Passive Haptic Learning were able to match what they sense with their expectations and knowledge of the letters.

Because of the informative feedback used during the lengthy tests in this study, users were able to "pick-up" how to type letters during the tests. This study was thus somewhat a comparison of active typing practice (AP) and PHL. Results strongly support the promise in a system for Passive Haptic Learning of Braille typing (and reading). This system shows promise to reduce time and difficulty for people learning Braille.

Example 4

Passive Haptic Learning of Piano

Examples 1-3 discuss passive haptic learning using gloves with embedded vibration motors to teach users how to play simple, one-handed, one-note-at-a-time piano melodies or how to type Braille. Given that the effort on Braille described in Example 3 demonstrated that PHL can be applied to two-handed chorded typing, Example 4 examines whether the same techniques can be applied to synchronized, two-handed chorded music played on the piano. Example 4 further examines whether audio accompaniment is necessary or if tactile stimulation alone is sufficient for passively teaching motor skills. Based on the study outlined below, Example 4 can (1) demonstrate Passive Haptic Learning/Rehearsal without the need for accompanying audio: (2) explore Passive Haptic Learning of chorded, two-handed piano music; and (3) present and contrast two successful methods of teaching complex piano melodies via haptics.

Figure 17:
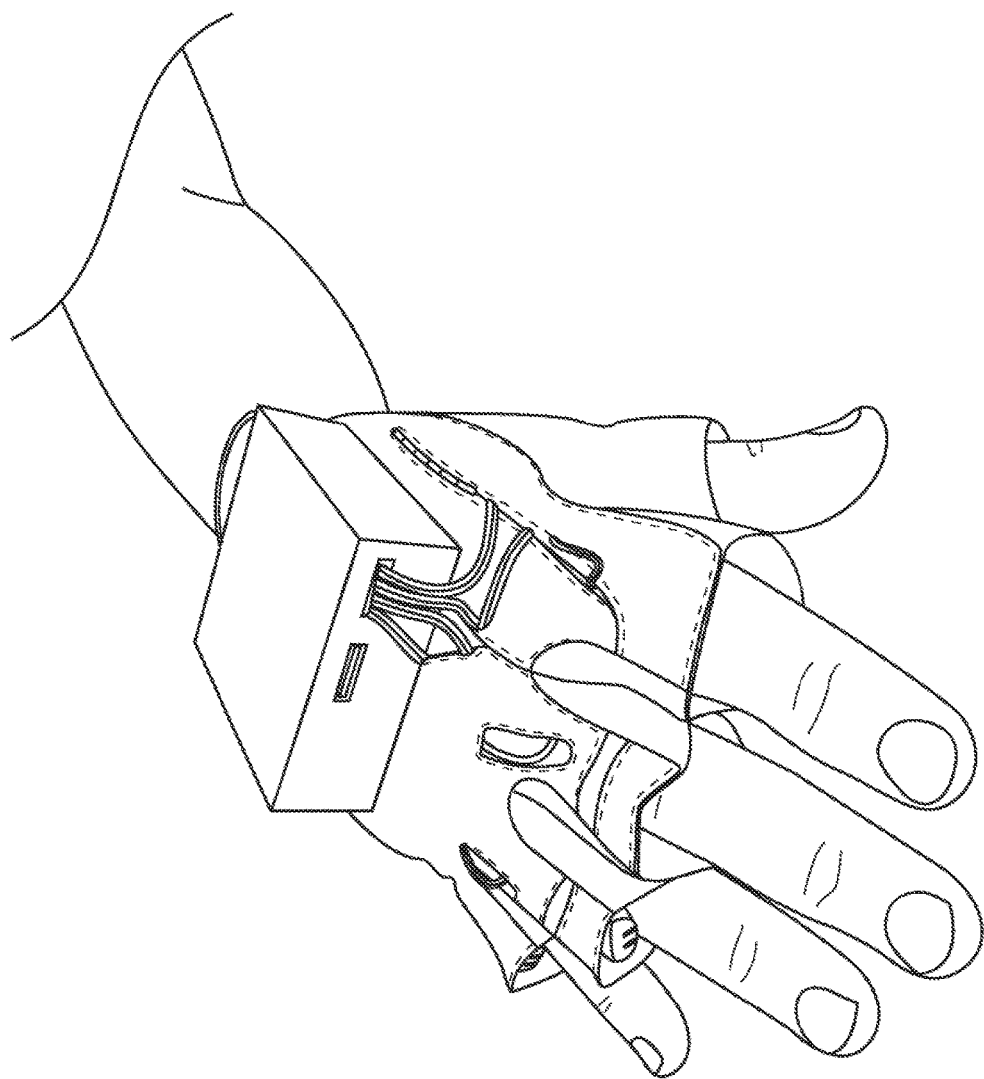
FIG. 17 depicts a PHL glove used to teach piano melodies, such as in the study described in Example 4.

Apparatus: FIG. 17 depicts a PHL glove used to teach piano melodies. For both piano studies below, a system consisting of a glove or a pair of gloves outfitted with a vibration motor on the back of each finger near the knuckle (ventral side of the hand) was used. In addition, the hardware included a microcontroller that controls and drives the glove(s). Each glove contained five vibration motors (one per finger). The vibration motors were Precision Microdrives Eccentric Rotating Mass (ERM) tactors (part #310-113) in the coin form factor. 3.3V DC provided results in the peak recommended vibration strength (1.38 G) and 220 Hz vibration frequency (increases proportionally with applied voltage). All motors were held flush with the fingers by the fabric making up the gloves. The gloves were fingerless to provide optimal fit for varying hand sizes. Both experiments tested users' performance on a CASIO® piano keyboard with keys that light under program control. The piano was connected to a PC using a USB cable that enabled communication and recording of what is played into MIDI format.

Accompanying Audio: Example 4 tested whether audio stimulation is needed for successful learning, or if tactile stimulation is enough to passively practice a motor skill. Example 4 examines two conditions of PHL's effect on a person's ability to retain what is learned during an active practice session of piano. In essence, the gloves were used for Passive Haptic Rehearsal to prevent forgetting of a piano melody. The two conditions are: (1) using only vibration versus (2) PHL using the vibration and audio. Each subject was tested under both conditions at different times, using one of two chosen song phrases each time. This within-subjects experiment used 12 participants and was randomized and counterbalanced for phrase and condition. The 45-note song phrases were selected from "Jingle Bells" (the "dashing through the snow" section) and "Amazing Grace" arranged to be performed using only the right hand (one key at a time). These phrases were broken into four sections and, the study began by allowing users to practice each of these sections by watching the phrase on the keyboard as it lights each keys while the song plays. Users rehearsed each section, followed by the full phrase, until they reached zero error on the note sequence. Upon learning the song, users spent a forgetting period of 30 minutes taking a GRE reading comprehension section while experiencing either the vibration or the audio+vibration stimulus from the system. This Passive Haptic Rehearsal variant on PHL also illustrates passive "practice" of a motor skill; but here, the study tested non-novice users (as opposed to those never having played the piece)—especially useful for skills requiring maintenance (such as music or stenotype). During the vibration-only condition, participants felt the fingers used to play the song "tapped" by the glove in the proper sequence and timing. Participants experiencing the audio+vibration condition "feel" the song being played through the haptics and also hear the song playing from the computer speakers. At the end of the GRE distraction task the participant removes the glove and is given three attempts to play the song phrase without any cues.

Figure 18:
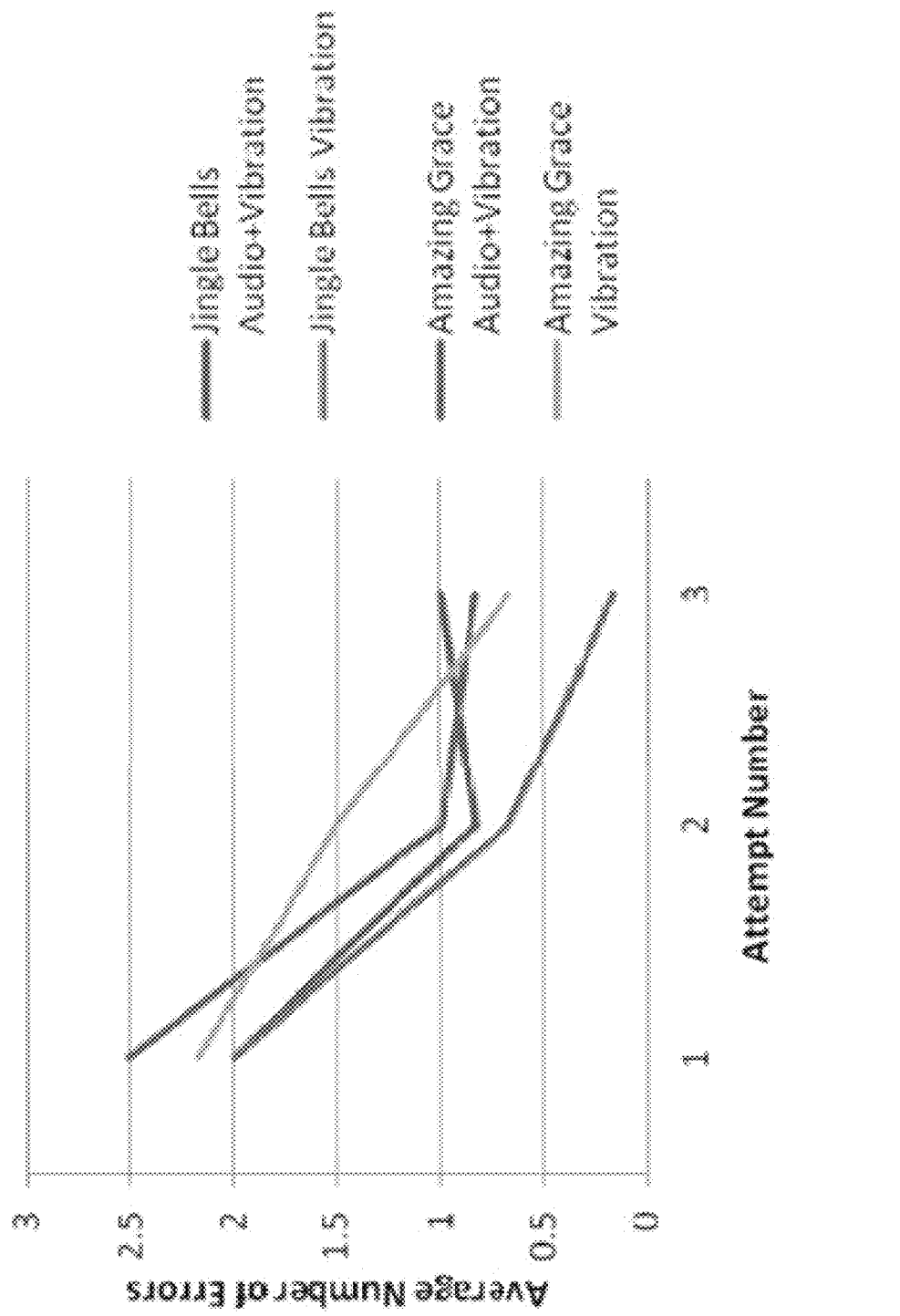
FIG. 18 depicts the results for a study of passive haptic learning with or without accompanying music, as described in the study in Example 4. Errors after the forgetting period are shown for each attempt under each condition (separated by song).

Each participant's performances are recorded in MIDI format and evaluated using a Dynamic Time Warping (DTW) algorithm, to account for errors of substitution, insertion, and deletion. DTW findings the optimal match between two sequences, minimizing the costs associated with various types of error. This method is similar to the ISO standard for speech recognition accuracy. Using a paired t-test, the errors made in the vibration-only condition were compared with those in the audio+vibration condition. There was no significant difference between the conditions for any of the three attempts (ATT1meanvib=2.08 vs. ATT1meanaud+vib=2.25, p=0.74), (ATT2meanvib=1.08 vs. ATT2meanaud+vib=0.92, p=0.76), (ATT3meanvib=0.42 vs. ATT3meanaud+vib=0.92, p=0.11). The average of the three attempts were also compared (AttAVGmeanvib=1.19 vs. AttAVGmeanaud+vib=1.36, p=0.60), as well as the best of the three post attempts: (BESTmeanvib=0.25 vs. BESTmeanaud+vib=0.25, p=1.00). There was no statistically significant difference in any of these cases (see FIG. 18). The participants' GRE scores were also evaluated. Using the 2-tailed, paired t-test, no meaningful difference between the values was found (GREmeanvib=22.58 vs. GREmeanaud+vib=22.67, p=0.92).

Figure 19:
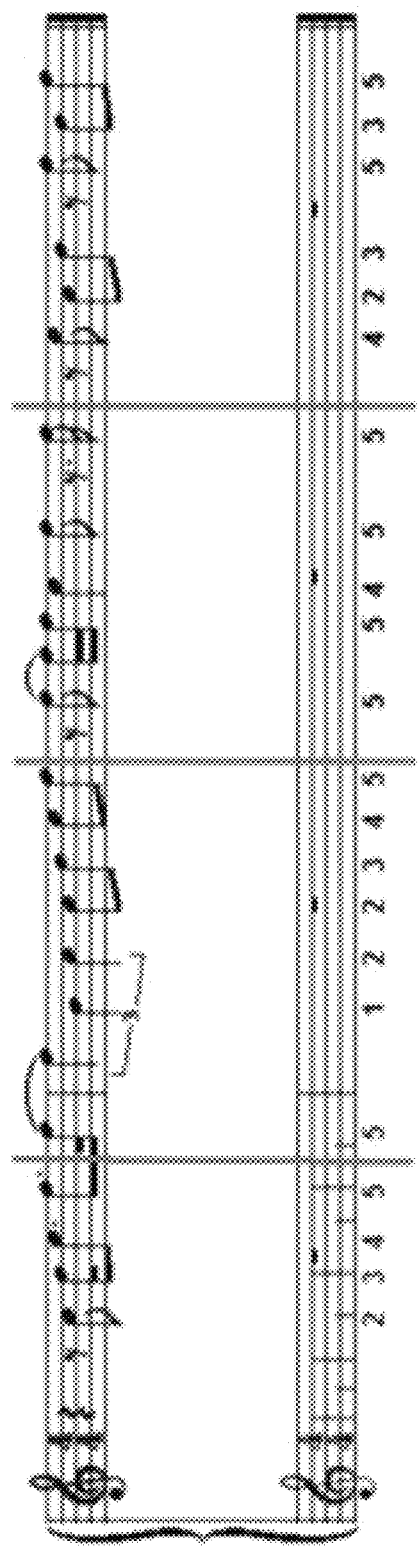
FIG. 19 depicts one of the four generated song phrases from the four condition study described in Example 4. Lines show subsections used in active practice.
Figure 20:
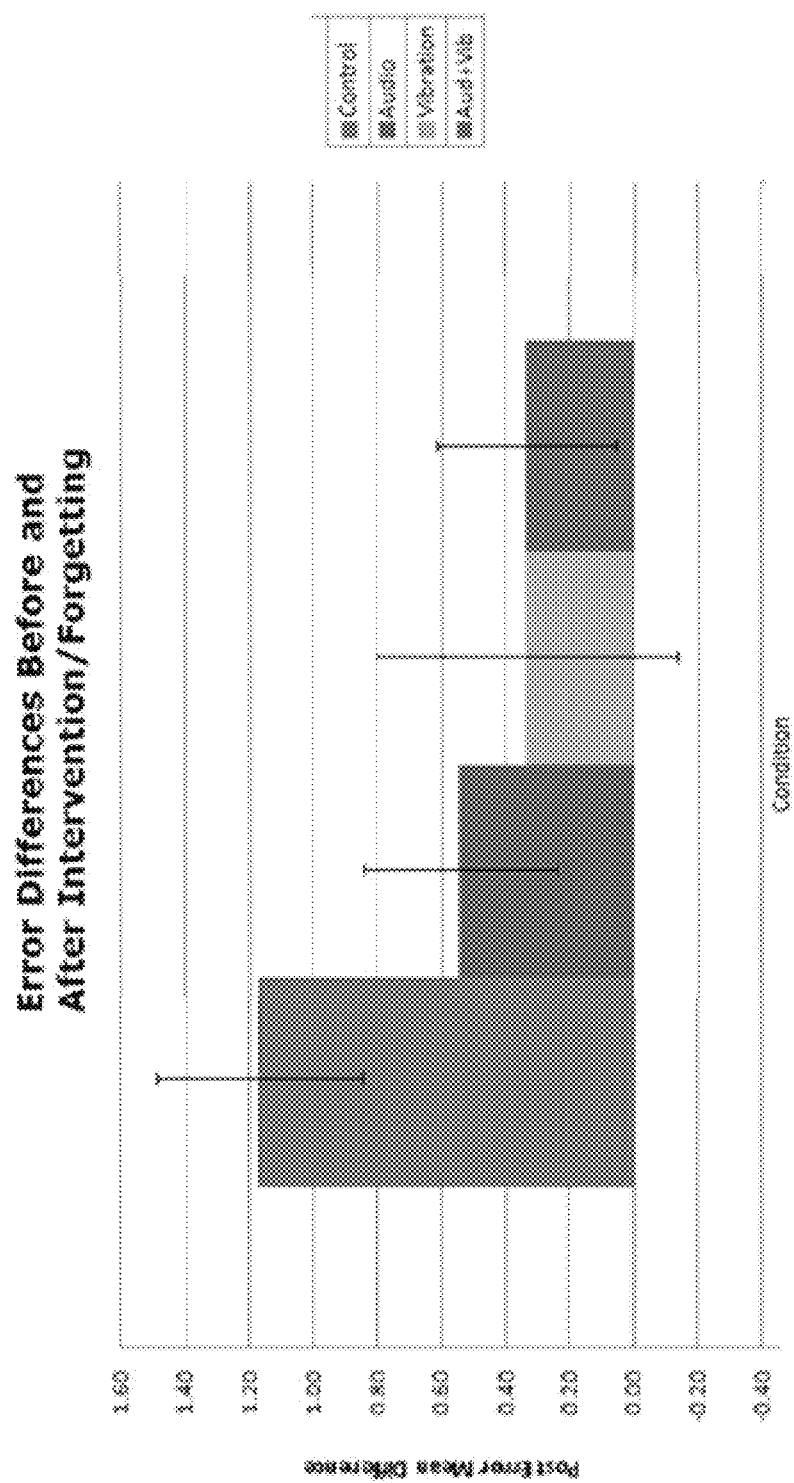
FIG. 20 depicts the mean error difference (error increase from before the forgetting period) by condition, as described in the study in Example 4.

Four Condition Study: Four conditions were then contrasted in a follow-up study: (1) control (no intervention); (2) audio (music) only; (3) vibration only; and (4) audio+vibration. This within-subjects study, containing 24 participants with no piano experience, followed a similar structure to that just described (in the first phase of Example 4 above). In this study, users came for four sessions and encountered a different condition and musical phrase (one of four) each visit. The study was counterbalanced for phrase and condition. These conditions were counterbalanced, furthering the determination of what stimuli contribute to Passive Haptic Learning. T to avoid variance due to song selection, four newly generated music phrases were used. When randomly generated musical songs were used previously, the phrases learned had to be reduced in length to avoid frustrating the participants. To create these songs, "Wolfram Tones" was used (Wolfram Tones is software product that takes user constraints and generates "musical" passages). The songs were constrained to match the five fingers of the right hand to five keys on the piano, with no simultaneous notes (chords), and to have 22 notes (see FIGS. 19-20). The study followed a similar structure as that just described (in the first phase of Example 4 above): (1) participants practiced parts of the phrase, and eventually the whole phrase (guided by the light-up keys)*; (2) participants took the GRE test while receiving one of the four conditions (quantitative section, 30 min.); and (3) participants were given three attempts to perform the music phrase. N.B.—A change was made (*) from the original study: users were not permitted to practice until perfect to avoid a ceiling effect on shorter phrases. They were given one try at each subsection, five tries with two subsections together, and 10 attempts at the full phrase. At the end of a session participants also completed the NASA TLX assessment, evaluating their perceived workload during the 30 minute GRE period while experiencing one of the four conditions. See FIG. 20.

Results: Recorded performances were analyzed for error rates using a Dynamic Time Warp. The best of the three post attempts was compared with the last attempt at the entire phrase during the practice session—yielding error difference scores before and after the GRE distraction "forgetting" period. In a comparison with the control group performance: audio+vibration was found to demonstrate a statistically significant improvement in error scores versus the control case, with a p-value of 0.02 (one-tailed paired t-test) and an effect size of 0.16 (large effect). Vibration alone was also found to have an effect when compared to control with a pvalue of 0.05 (one-tailed paired t-test) and effect size of 0.11 (moderate effect); while the audio alone condition showed no significant difference from control with a p-value of 0.08 (one-tailed paired t-test).

The control condition resulted in the highest increase in the number of errors with an average increase in errors of 1.17. The audio-only condition showed an average increase in 0.54 errors, while both the audio+vibration and the vibration-only conditions averaged an increase in errors of 0.33 over the 24 participants. No significant difference was found in the GRE scores for any condition, revealing that the participants appeared to have given a similar amount of attention to the GRE test regardless of the condition applied.

When examining perceived "load" (NASA TLX), the study looked particularly at the two cases that most point toward distraction: Effort and Frustration. There was no significant differences between the averages of the conditions for Effort; while participants assigned a higher rating for Frustration when comparing the audio+vibration condition (average rating of 11.25) to control (average rating of 8.5) resulting in a two-tail paired t-test of p=0.01.

Discussion: This study revealed that audio alone, vibration alone, and audio+vibration all result in an overall lower error score than the control case. This result suggests that such interventions are worthwhile for learning and retention. While the audio+vibration case did achieve statistical significance for error differences, this condition also had a higher frustration rating when compared to the control condition. Vibration only achieved marginal significance for the error difference (due to its higher variation in results—the average error increase was the same as audio+vibration), but had lower NASA TLX scores, suggesting less distraction. To design a tactile teaching system for use in daily life, it is important to consider not only the glove's effectiveness, but also its potential to cause unwanted distraction, rendering it undesirable for long-term wear. The study's results may justify the use of vibration alone instead of having to incorporate audio to aid in learning and retention, and subsequent pilot studies have demonstrated that haptics alone has been sufficient for passive learning, even with no initial practice.

Teaching Two-Handed Pieces: With the objective of passively teaching complex piano pieces, a study was conducted to examine this task's feasibility and teaching structure. The study was structured in a similar manner to the feasibility study conducted for PHL of Braille: users were taught two "phrases" under different conditions and their learning was examined. This study aimed to demonstrate both internal validity of passively teaching advanced, two-limb music containing chords and to examine what method is best for learners (passively learning one hand at a time, or both together). Braille is inherently chorded and requires the synchronized use of both hands to produce most letters. However, there exists a dichotomy in the musical methodology regarding how to learn two-handed pieces. Typically, when learning a piece of music that uses both hands, piano students learn to play one hand and then the other before playing both parts together. However, music research literature views learning both hands together from the start to be more advantageous. Even so, in teaching and practice, it is viewed as largely too challenging to learn both hands at once. Difficulty is posed by having to divide attentional resources between both limbs when learning a dexterity skill (especially when playing a more complicated piece of music). These views suggest that learning one hand at a time may help make learning more palatable. In addition, original piano PHL work efficiently taught a lengthy sequence of notes to one hand, whereas our two-handed Braille work taught discreet letters, not an entire sequence. Teaching advanced piano blends challenges from both of these tasks from previous Examples 1-3.

Figure 21:
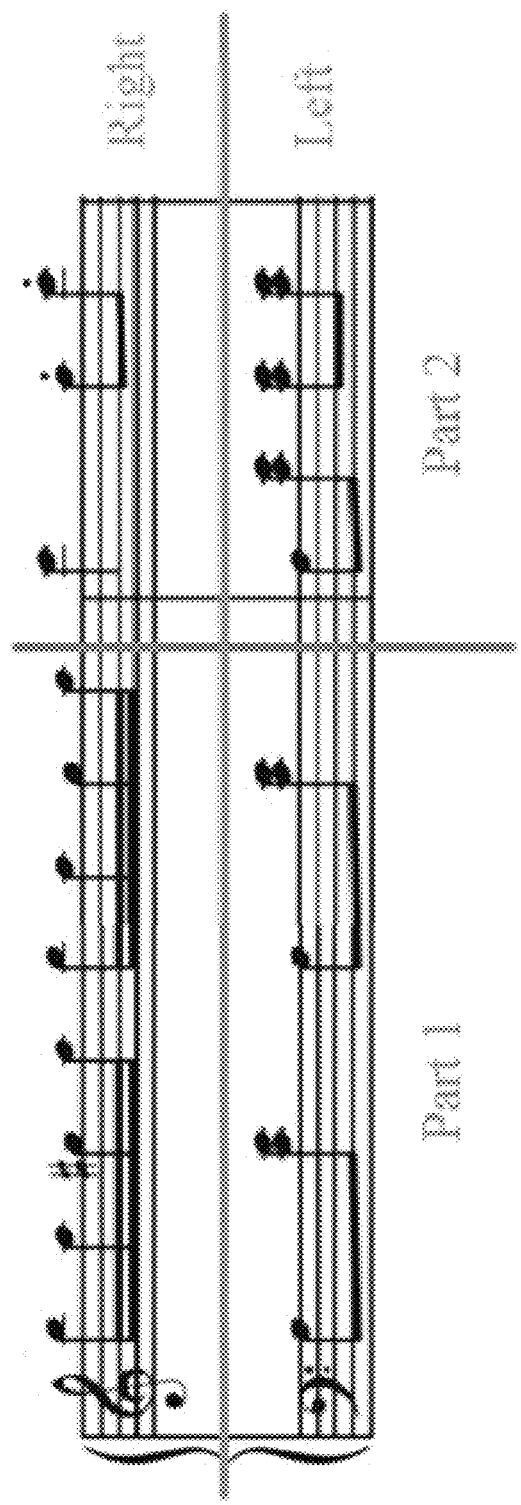
FIG. 21 depicts one music phrase used in the study (from "Turkish March"), as described in the study in Example 4. Divisions show what parts were learned during what condition's first and second learning period. (Sync. (Parts 1 then 2) or L then R).

Study: These teaching structures were investigated, as well as the potential for teaching two-limb, chorded music sequences passively, with a within-subjects user design containing eight participants. Each user attended two sessions; during each they passively learned one of two music phrases under a different condition each time. The study was counterbalanced for phrase and condition. The conditions examined here concern how the haptic gloves passively teach participants: (1) "LR" (left-right) condition: users learn the left hand's part followed by the right hand (as piano students typically learn) and (2) "Sync" condition: users learn both hands together (as they would perform the song). Phrases were selected from Mozart's "Turkish March" and Vivaldi's "The Four Seasons, 2nd movement: Spring." These phrases were chosen to contain chords over both hands as well as dissimilar parts for both the left and the right hand. In some embodiments, Passive Haptic Learning was found to be best presented in sets of 10-17 stimuli to be learned at a time, so each session was split into two learning periods (see FIG. 21). During these periods, users either learned the left hand portion followed by the right hand part, or, to keep session structure parallel and stimuli set lengths reasonable, they learned the first half of the phrase (both hands together) then the second half of the phrase (both hands together). In the LR condition, the left hand is taught first because the left hand typically carries the more simple part (non-melody) of the piece.

Participants with no knowledge of piano were used, as established by using a pre-test at the start of each session. Their performance here acted as a baseline for comparison with a test given after they received Passive Haptic Learning. For the pretest, users were shown the music phrase being "played" on the lit keys of the piano keyboard (the phrases were pre-programmed into the keyboard). They were then told where to place their hands and asked to play what they know. They were given one try at playing the phrase during the pre-test. After the pre-test, users spent a learning period of 20 minutes receiving haptic stimuli while focusing their attention on an online game. During this time, participants wore the gloves and felt vibrations on their fingers associated with the music (see the Passive Haptic Learning Stimuli section below) for the part of the song they were learning. Participants were told to not pay attention to the stimuli and to only focus on getting a high score at the game. This game (distraction task) was previously selected for sensitivity as a distraction metric (Fritz! as discussed above).

After the first learning period, users were tested on their performance of the part of the song they learned passively. Users were allowed three attempts at playing the part. Before the first attempt, the song's audio was played, and before the last two attempts users were shown the piece "played" on the lighted keys. This structure illustrates what was initially passively learned and facilitates clarification of reaches/#'s during the piece. Users then entered the second learning period (with a new part of the song), structured identically to the first. After the second learning period and test, users were given a full test where they were asked to play the entire phrase (either by playing the left and right parts together, or the first part followed by the second part). They were shown the phrase "played" on the lit keyboard before each of three given attempts.

Passive Haptic Learning Stimuli: The fingers required to play each tone in the music were "tapped" using the vibration motors in the gloves. These haptic stimuli were synchronized with the tones of the music. Additionally this structure provided chord parsing information and action feedback: sequences yielding chords were separated by tones while keeping stimuli temporally tight, and users may have understanding of the tones to be expected when they "type" on the piano keyboard. Each tone of the song (or song part) was played into the participant's earbuds, and the finger or fingers required to play this tone were then stimulated sequentially. This process was followed by the next tone and stimuli until the end of the song (part), after which the system waited 20 seconds and repeats.

Results: Performance data was captured in MIDI format, which represents what notes were played and on/off times. This data was then translated into ASCII for easier visual perusal and rapid, automated processing. A Dynamic Time Warping algorithm was used to analyze the distance between the sequences produced when testing users and the correct sequence of notes in each musical phrase. In the algorithm, each chord the user had played was either found to be entirely correct (a match) or was labeled incorrect (insertion, deletion, or substitution). For example, when looking for the chord '62-70-72' (three simultaneous keys) only an exact match would contribute no increase in distance (error): '62-70' would be counted as entirely incorrect. This distance measure is then divided by the max length of the phrase or input to yield % error, similar to the metric in text entry.

To examine the feasibility of passively teaching a sequence of two-handed key sets via haptics, without the active attention of the learner, differences in performance error were examined between the pretest and the average of the full post tests. In both conditions, LR and Sync, as well as overall, users demonstrated reduced error after receiving Passive Haptic Learning. Paired t-tests reveal that error differences between pretest and full tests (LR: M=33.60%, SE=0.0531; Sync: M=49.55%, SE=0.0547; All: M=41.58%, SE=0.0560) were significant (LR: $t(7)=4.47$, $p<0.0015$; Sync: $t(7)=6.41$, $p<0.00019$; All: $t(15)=7.42$, $p<2E-06$). A "content sensitive" Dynamic Time Warp distance measure was also devised for better analysis of correct song content in which chorded inputs may be recognized as fractionally (rather than entirely) correct. This measure was developed to be more sensitive to learning differences, in case users did not learn or perform note groups (chords) correctly. Though non-typical in applications like text entry, where a similar Mean String Distance (MSD) measure is used to examine only whether a letter is entirely correct, applications similar to this one, where learning, dexterity, and performance are evaluated, may benefit from such a metric. Already, the standard DTW measure showed learning in our testing; this secondary measure is simply for additional insight. It, too, reflected a significant effect on error reduction between pretest (LR: M=82.76%, SE=0.0359; Sync: M=78.02%, SE=0.0412; All: M=80.39%, SE=0.0267) and full tests (LR: M=37.61%, SE=0.0398; Sync: M=27.40%, SE=0.0524; All: M=32.51%, SE=0.0331) when compared with a paired t-test (LR: $t(7)=6.13$, $p<0.0003$; Sync: $t(7)=6.93$, $p<0.0002$; All: $t(15)=9.46$, $p<1E-07$).

Figure 22:
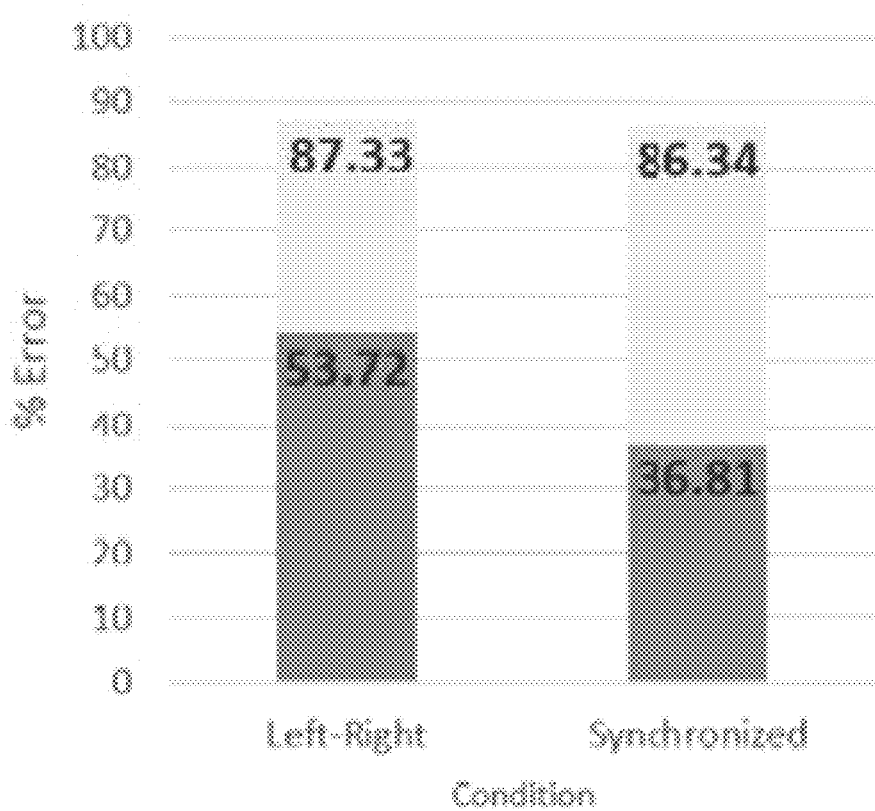
FIG. 22 depicts the performance error by condition in the study described in Example 4. Before PHL (upper) reflects pretest performance, and after PHL (lower) reflects average full post-test performance (using original DTW).

Teaching conditions (LR or Sync) were compared for effectiveness. When users were given Passive Haptic Learning in the "Sync" structure, they presented both better ultimate performance and improvement from the pretest. Ultimate performance (lowest error in best full post test score) was examined for differences between conditions (LR: M=44.22%, SE=0.0562; Sync: M=23.12%, SE=0.0690) and compared with a paired t-test which suggests the differences are significant ($t(7)=1.98$, $p=0.0443$). Improvement (error difference between the pretest and the average test performance) was also compared (LR: M=33.60%, SE=0.0531; Sync: M=49.55%, SE=0.0547) and significant differences were again found with a paired t-test ($t(7)=-2.19$, $p=0.0322$). See FIG. 22.

Content-sensitive DTW reflected closer performance on the full test between conditions that illustrate an observed performance behavior difference: users who were in the LR condition learned and played the notes for each hand, but failed to synchronize them into the correct chord arrangements for the piece when tested. This partially present content was reflected in lowered error rates for this group when using the content-sensitive metric versus the original all-or-nothing DTW measure. Further examination of performance improvements demonstrated no ordering effect or significant difference in errors by song (which would reflect a potential difference in song difficulty). Comparison of performance on the distraction task (online memory game) showed no significant difference ($t(7)=0.554$, $p=0.300$).

Discussion: These results suggest complex piano pieces may be taught passively. Passively learning each part of the piece across both hands at once is possible and yields the best results. This result is consistent with research that suggests, if possible, it is best to learn both hands together. It may be possible for active learners to overcome their initial struggles with practicing with both hands simultaneously by first using Passive Haptic Learning. More generally, these results suggest the use of Passive Haptic Learning of synchronized, multi-limb skills for other instruments and other domains. All users correctly played the notes of a chord together (when they were taught them together by the haptic interface—i.e., in the Sync condition) despite each stimuli being presented sequentially (slight staggered in time for perception). Before Passive Learning, users were told that each tone they hear is followed by stimulation on the finger or fingers to press that make that tone. With only this instruction, the interface successfully, passively enabled users to parse the stimuli and seamlessly self-synchronize.

According to Example 4, it was shown that passive vibration stimulus presented comparable, beneficial performance results to passive vibration+accompanying music. This result allows for development of haptic-only teaching systems that would be more practical for daily use. Example 4 also demonstrated successful, significant results teaching complex (two-handed, chorded) piano melodies to novices, using only Passive Haptic Learning. Example 4 also established that users can learn to play both the left and right hand's tunes at once, enabling a more rapid reduction of error using only the haptic glove system.

Example 5

Passive Haptic Learning of Morse Code and Text Entry on Various Devices

Figure 23:
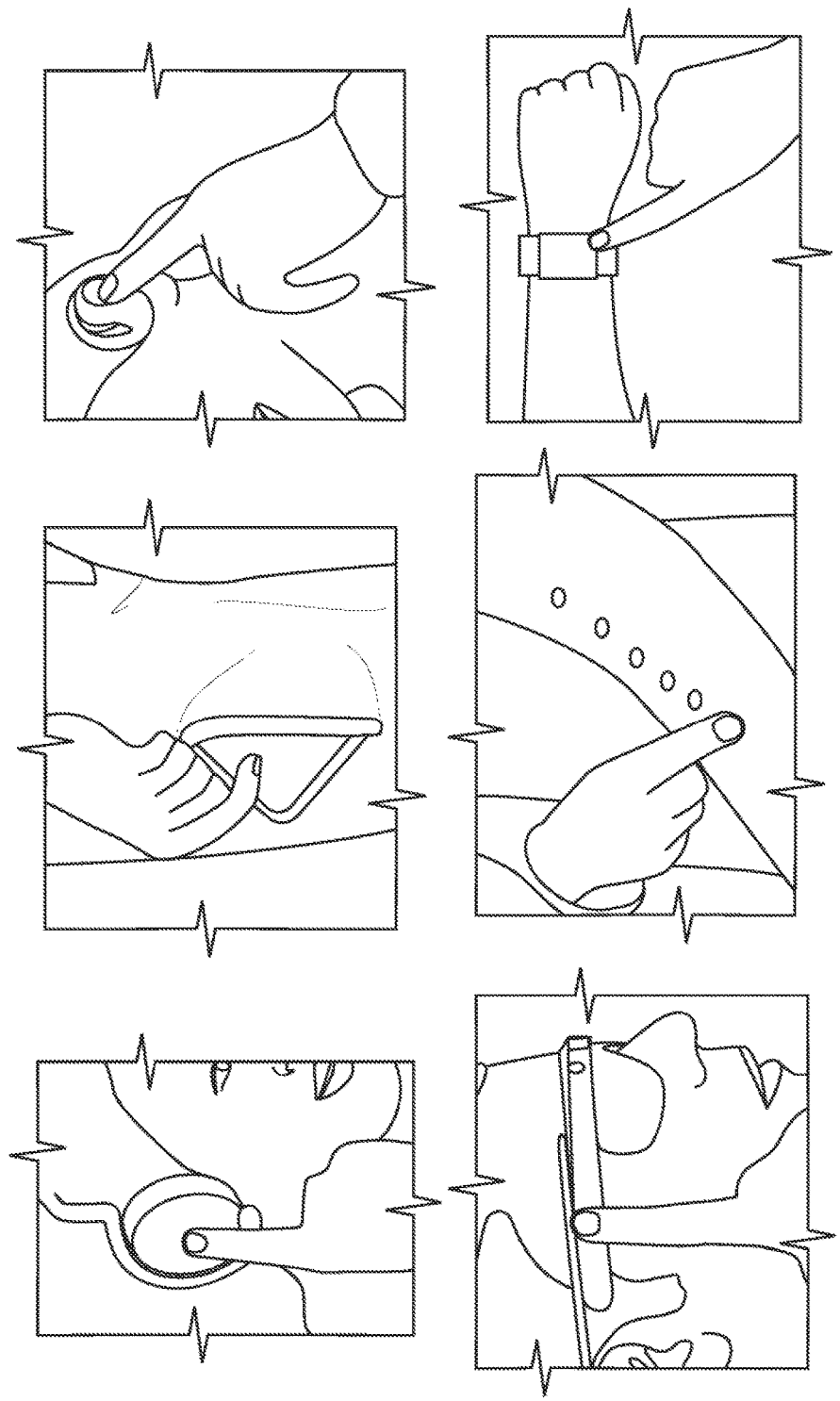
FIG. 23 depicts examples of mobile devices supporting one-channel input for silent, eyes-free text entry.

In Example 5, a passive learning method was examined to facilitate ease of adoption of techniques related to discrete text entry on small mobile and wearable devices (such as those depicted in FIG. 23). Example 5 also shows use of Passive Haptic Learning to help teach Morse code on Google Glass while users focused on a task other than learning. Results illustrate that Passive Haptic Learning produces significantly increased knowledge of the entry system without any additional active learning or practice. Users were also functional at inputting Morse code on Google Glass using just a finger, and could understand it silently through haptics. Passive instruction, including haptic stimuli, was also administered using the device itself to demonstrate potentially easy integration of passive learning into users' daily routines.

Text entry's "learning curve problem" can manifest in both mobile and non-mobile systems. In some cases, an entry system is already an established necessity of an industry or user group, but the challenge posed by learning to use the system acts as a barrier to even its niche of users. These user groups must aggressively pursue proficiency in these complex systems or be left behind. For example, as explained above, the blind face the Braille "literacy crisis" due to challenges learning the complex and chorded Braille system. As another example, stenographers can maintain 300 WPM using their chorded, phoneme-based typing system used ubiquitously for rapid transcription in court-reporting and closed captioning, but learning this typing method takes years and schools of stenography report averages of 85%-95% dropout rates. In many other cases, new or optimized systems (such as those for mobile) bring benefits but fail to be adopted by a critical mass of users because of the challenge posed by learning to use them. These optimized systems range from new devices that support rapid speeds in a mobile format to new layouts that are engineered for usability.

Even with these benefits, barriers remain and these systems are relegated to niche markets due to the time and difficulty required to learn them. Potential ways of overcoming the learning curve have been explored as a result. One approach is to accept a trade-off between improvements and making learning easier to support adoption of the technique. To do this, researchers may leverage previous knowledge—by maintaining similarity to the pervasive QWERTY layout or the standard phone number pad—while making some changes that provide usability benefits. Others create "easy to learn" or predictive systems usually requiring visual information for entry (often not appropriate for mobile) and often limited because of the need to see and correct/select prediction errors. Fully optimized systems tend to require little visual feedback but have steep learning curves that prevent their adoption by the casual user.

Example 5 explores PHL to intervene on the learning side of this problem. Using passive learning, perhaps users can overcome the initial, steepest part of the learning curve. In this case, rapid or low-effort learning might allow users to adopt a new text-entry mechanism. With this in mind, Passive Haptic Learning of Morse code is explored. Example 5 can (1) present a technique for silent, eyes-free text entry on small mobile devices; (2) examine a passive learning method to facilitate ease of adoption of the technique; (3) demonstrate Passive Haptic Learning of this temporal system in less than four hours; and (4) characterize haptic stimulation produced using low-frequency signals on Google Glass.

Background: While mobile devices are decreasing in size, users' dexterity limits remain much the same. This conundrum has led to difficulty in creating viable text entry systems for small mobile devices. Silent and fast typing is desirable for a mobile device because it can be used in many more social situations than speech recognition (e.g., classroom notetaking, interaction during a meeting, conveying private information, etc.). "Touch typing" is desirable so that the user can achieve high speeds and perform text entry while "on-the-go" (e.g., while attending to his/her surroundings). One approach to solving this problem was to reduce the QWERTY keyboard in size to fit on a mobile phone. However, touch typing became difficult and imprecise. The visual/manual attention required to type on a mini-QWERTY or virtual keyboard on a phone results in many humorous, and sometimes dangerous, situations as users attempt to drive or navigate while "texting." However, the familiar QWERTY keyboard layout helps new users of the mini-QWERTY quickly reach speeds adequate for composing short messages and so was adopted readily by mobile users. Multitap and T9 use a similar strategy. The 12-button telephone keypad, with three to four letters associated with each of the numerical digits, is familiar to most users. These systems are easy to "walk up" and use initially, but maximum speeds are often under 20 words per minute (WPM). In addition, while Multitap can be used by experts with little visual attention, T9 (along with other predictive systems) requires the user verify each word visually as it is typed. However, more optimization of these techniques was needed along with a solution for text entry on increasingly small devices. A unique compromise in leveraging users' past experience, reducing the size of the keyboard, and requiring less space can be seen in the half-QWERTY keyboard. The keyboard uses one hand for typing, reduces the number of keys in half, and leverages typists' QWERTY skills. Unfortunately, while this system and others like it allow users to approach speeds close to that of their desktop rates without visual attention, it is still too large for most mobile systems. To date, most small mobile keyboards that both allow touch typing and fast entry rates have had to create new designs instead of leveraging keyboards of the past. With increasing optimization came increased difficulty in learning too, though.

For example, the TWIDDLER® allows desktop-level typing speeds with little visual attention. However, it is popular with only a small fraction of mobile users. While the TWIDDLER® requires less than half the practice of a desktop QWERTY keyboard to achieve desktop rates (25 hours to achieve ~50 wpm), only the most committed mobile users are willing to dedicate the time to learning it. Optimized keyboard layouts often face the same fate. One major barrier to adoption is initial learning (or "walk-up usability"), when learning is most difficult. Active learning of text entry systems follows an exponential regression curve (akin to the power law of practice), and practice is more effective distributed over a period of time instead of massed. Give the desire for walk-up usability, it is a challenge for users to overcome the (time-consuming, and initially steep) learning process of these more complex text entry systems.

Here, Example 5 examines Morse code, a very different text entry system from Braille. This entry method is rhythm-based and requires only one "key" to type-ideal for devices of almost any size: in-ear Bluetooth headsets, hearing aids, Google Glass, or even tapping on a phone in a pocket. Anything integrating a 3×3×2 mm accelerometer or binary input channel could, in theory, use Morse as a language input technique. The method has top keying rates of 35 WPM using a straight-key and receiving rates of 140 WPM. It is eyes-free, silent, and easy to implement, but this entry system requires initial learning. A goal of Example 5 is to examine helping the novice user overcome the initial difficulty to make techniques like this tractable.

PASSIVE HAPTIC LEARNING OF MORSE CODE: Entry and reception of Morse code can be silent, does not require visual attention, and can be recognized using any device with binary (on/off) input-accelerometers to binary capacitive touch sensing (from electronic textiles to touchpads). This system serves as an example solution to discrete text entry on mobile devices, but presents the challenge of teaching individuals how to use it. Example 5 explores how to aid learning of the technique by teaching the system passively.

Study Structure: Example 5 examines both passive teaching and entry using Morse Code on Google Glass. An initial experimental trial on Passive Haptic Learning of Morse code was successful using a PHL system, so a full study was undertaken that aimed to examine if users could passively learn the full alphabet in Morse code. The structure of the study was akin to that of the full alphabet study for Braille and other previous work on Passive Haptic Learning provided in the Examples above. Twelve users participated in the between-subjects structured study, and each was classified as either Passive Haptic Learning or control. This grouping was randomized. Participants attend four sessions each. Each session is structured to both passively teach (if in the PHL group) and evaluate user progress at learning Morse code. Users were exposed to the entire alphabet over these four visits. This was done by introducing two words from an eight-word pangram each session.

A pangram is a phrase that contains all alphabet letters, such as the pangram used to teach Morse: "the quick brown fox jumps over the lazy dog." Each session was split in half and each half centers upon passive learning (if not in the control group) and testing of one word from the pangram. The structure of each session was: (1) input pre-test for this session (2) undertake the distraction task (+passive stimulation of word 1) for 20 min.; (3) undergo written, input, and perception tests for word 1; (4) undertake the distraction task (+passive stimulation of word 2) for 20 min.: and (5) undergo written, input, and perception tests for word 2.

During the distraction task, users play an online game (Fritz! Discussed previously). This scored task was selected based upon its sensitivity as a distraction metric and has been used in prior PHL research to gage users' ability to focus on the primary task even while receiving passive stimulation. During this time, participants were told to focus exclusively on the game and achieving a high score, and not to pay attention to the stimuli they are receiving from Google Glass.

Figure 24:
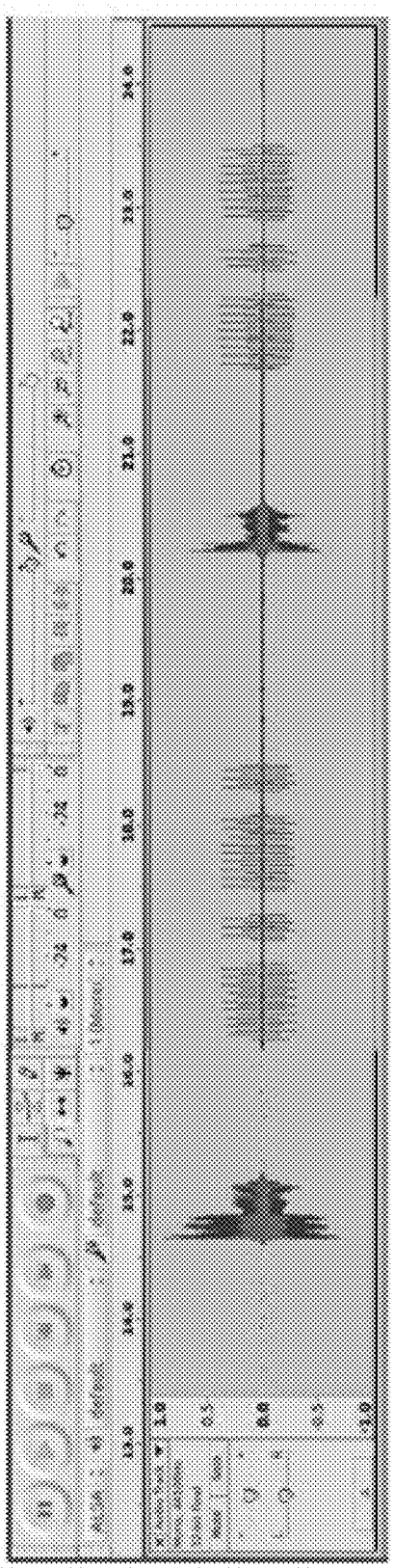
FIG. 24 depicts an activation profile for haptic stimuli produced by GOOGLE GLASS, as described in Example 5. This profile was taken using a microphone, and shows the letters c and k spoken, each followed by vibrations indicating their equivalent Morse code (-.-. and -.-).

Passive Stimulation: As in previous work, in this study a combination of audio and haptic stimuli was used to passively teach users as they performed other tasks (the distraction task). Unlike previous research that used external hardware to teach users, Example 5 explores using the input device itself to administer the stimuli. By varying frequencies and signals sent to the bone conducting transducer in Google Glass as audio, the bone conduction "audio" system available on Google Glass was transformed to a haptic element. A 15 Hz audio signal (square wave) sent to the bone conducting transducer produced a vibration. When wearing the device, this vibration is against the back right side of the users' head. This vibration was quantified by examining the resulting activation profile and vibration strength. The activation profile including both activation times (for dots and dash stimuli) is shown in FIG. 24 and was found by attaching a microphone to the device. The peak vibration amplitude was found to be 1.8 G.

Other signal frequency ranges were also examined to produce haptic stimuli. Over 30 Hz did not produce noticeable tactile feedback, and the quality of this feedback was seriously degraded over 20 Hz. Under 10 Hz produced a signal with osculations clearly discernible—resulting in poor differentiation between oscillations and dots. Between 14 Hz and 16 Hz was found to be the ideal range for producing tactile feedback. Morse code requires a sequence of multiple "keystrokes" to produce each letter. Keystrokes in Morse are known as dots and dashes and are differentiated by duration of the key-press—dashes are by definition three times the duration of a dot. In Example 5, each keystroke was represented by a touch of long or short duration (to indicate dashes and dots). Input uses one finger, and participants enter a series of taps to produce each letter. Users must be able to simply, passively process the stimuli equating to Morse code, so interaction design is critical.

The structure used here was informed by that which was discovered effective for passively teaching Braille (both languages are high keystrokes per character (KSPC) systems). The passive stimuli for this experiment were as follows: Googl eGlass speaks each letter in the word being learned, followed by a series of vibrations—equating to each dot or dash to produce that letter. Dots and dashes were each vibrations, with durations of either 200 ms or 600 ms. The audio helps the user discretely parse and associate meaning to the dots and dash series (as was done to help users parse simultaneous keystrokes (chords) necessary to type Braille). Users learn one word every learning (distraction task) period, so during this time that word's stimuli are administered on a loop. Those in the control condition receive repeated audio stimulation with no vibration during this time.

Figure 25:
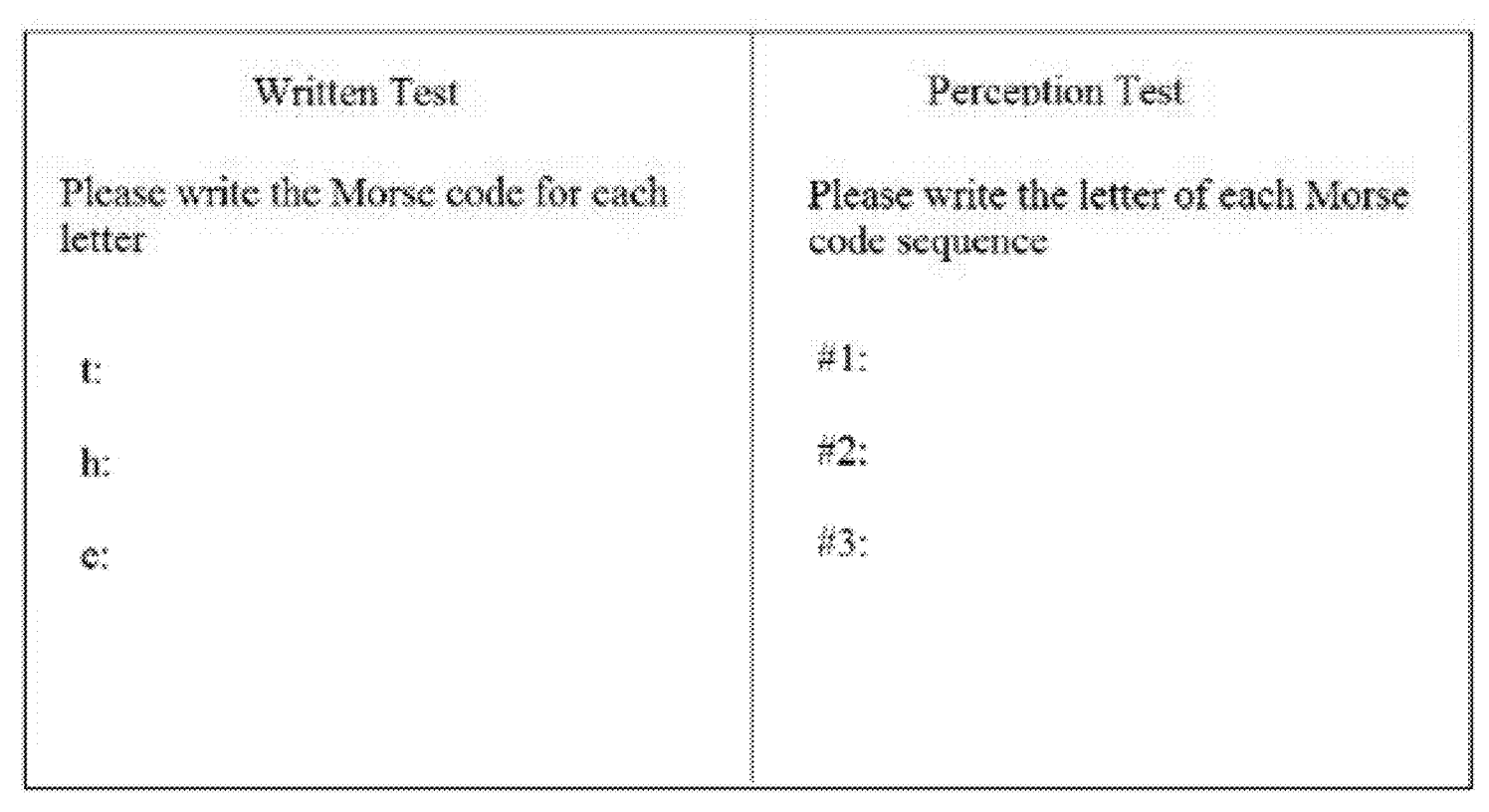

Written Test: After each learning period (distraction task), users were given a series of tests to evaluate their knowledge and use of Morse code. The first test administered was a paper-based test referred to herein as the written test. See FIG. 25. This test was given first to test learning and knowledge directly—by using a medium participants are already proficient with (paper and pen), not measuring their knowledge based upon their performance using Morse on Google Glass (a system they are just now learning). This test also reflected only what the users knew after the intervention (distraction task), not augmented by any active learning that occurred during the input test (which gave users visual feedback). This test presented participants with a list of each letter from the word they were just exposed to. They were asked to write the Morse code for that letter (dots and dashes) next to each letter. Users were told to answer what they know and, if they were completely unsure, to answer with a question mark. At the end of their final (fourth) session, users were also given a test on the full alphabet.

Input Test: Users input Morse on Google Glass, and their performance was evaluated using an "input test." See FIG. 26. This test reflects both learning of Morse code and a user's skill at text entry using the Google Glass system. To enable typing on Glass, an activity was built to receive user input and administer a test of text entry to participants. Users were able to type on the device touchpad using their (index) finger. No corrections were permitted (i.e. backspace). Audio prompts (along with visual prompts) told users what to type during the test. The software logged all test data natively.

Users were also provided with visual feedback of each letter they typed, instead of obscuring this information. This feedback facilitated some active learning during the testing periods. A goal of Example 5 was to model conditions conducive to learning (as one using a system "in the wild" would try to aid learning in every fashion), so for ecological validity the study provided visual feedback (see FIG. 25.). Providing this feedback means that the system had to decode touchpad actions into dots, dashes, and letters on the fly. For this, a threshold was used to discern between a dot or dash touch. Users were told that, like Morse code using a straight-key, dots and dashes are differentiated by their duration—a quick tap is a dot and a dash is a longer touch. This threshold reflects the speed that a novice might reach after Passive Haptic Learning, approximately 10 WPM. At this speed, dots were expected to be less than 200 ms and dashes were greater than 400 ms, so the cutoff duration of a touch meaning a dot was 300 ms. System compliance was forced with this time structure, rather than having a rolling average threshold that may cause recognition errors by the system and confuse participants with inconsistencies. A lower cutoff time may force faster typing speeds from users to comply with the system. To leave time for a user to think about the dots and dashes that comprise each letter, the system waits 1200 ms of inactivity before committing and displaying the resulting letter.

Input (pre-)tests consisted of one attempt each at the pangram and each word in the session; while input tests gave three attempts for participants to type the pangram, the word they learned, and each letter in the word (in random). Input tests after the second half of a session also contained three tries at typing a second pangram. This second pangram was included to demonstrate that users can use their skill not just as a learned sequence but for entering new text as well. This second pangram was chosen to be "when zombies arrive quickly fax judge pat."

Perception Test: Referred to as "coding" in Morse code, perception and recognition of Morse signals was also tested via audio. The final of the three tests, the "perception" test is also paper-based and asks users to attend to a series of Morse code vibrations and write down the letters they recognize (see FIG. 25). This Morse code was administered at a rate of 10 WPM and contained only the letters from the word they were just exposed to. Letters were presented in a random order and only played once. Users could pause the system between letters, but many chose not to. The final session of the study concluded with a perception test of all letters in the alphabet as well (in random).

RESULTS: Significant performance differences were found between conditions, with those receiving Passive Haptic Learning performing better than those in the control group. Performance on the distraction task (online memory game) showed no significant difference between groups ($t(10)=0.424$, $p=0.372$).

Figure 26:
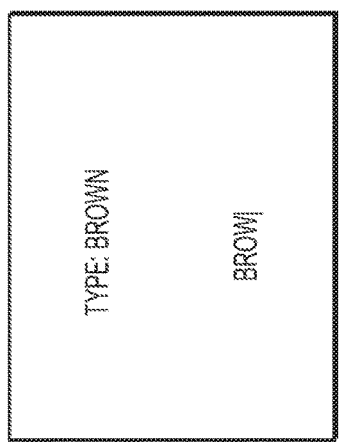
FIG. 26 depicts an example screenshot and use during an input test described in Example 5.
Figure 26:
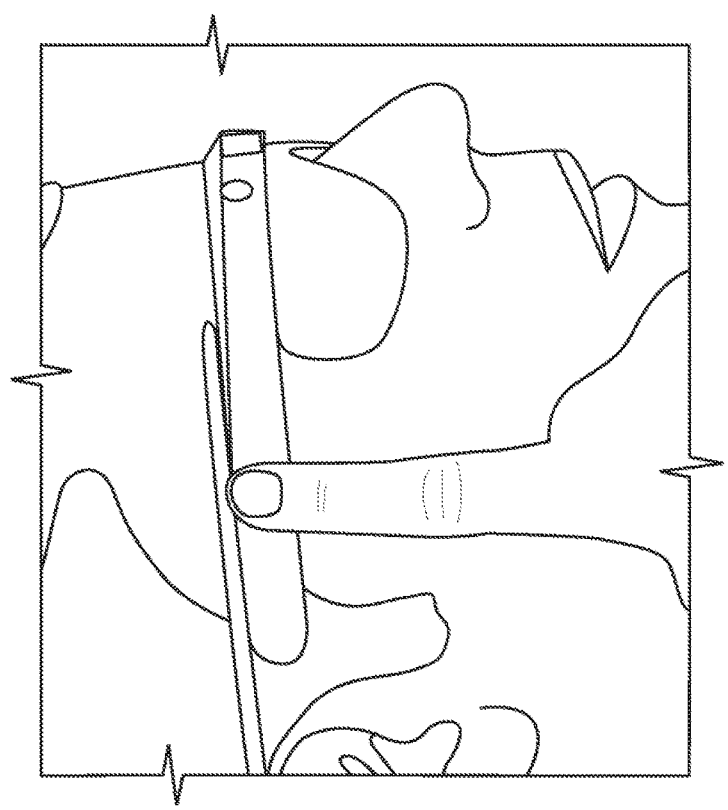
Figure 27:
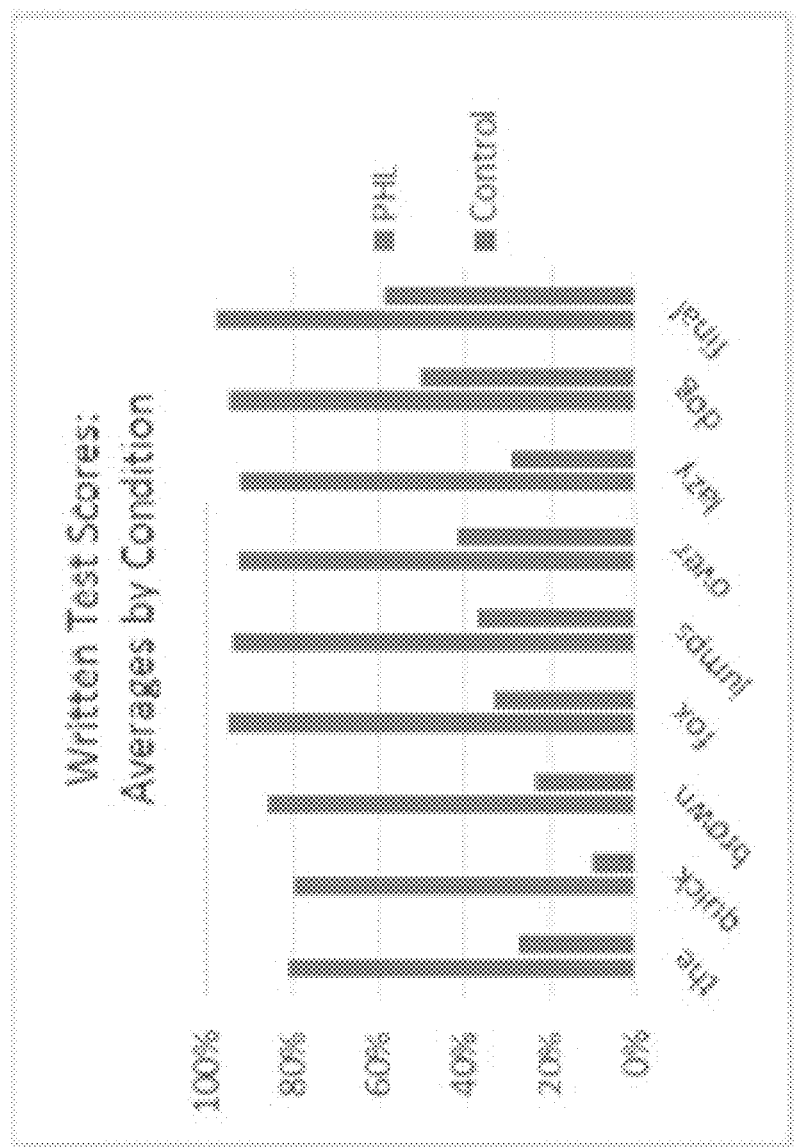
FIG. 27 depicts average score by condition on each written test as described in Example 5. "Final" refers to the test of the full alphabet at the end of session 4.

Written Test: For the paper-based written test, what letters participants correctly answered in Morse were examined. The number of correct letters out of possible letters in the word formed a percentage score for each word's test. The performance of users in the Passive Haptic Learning group were compared to those in the control group and found to have significant differences. T-tests reveal that PHL users performed significantly better than control users on all written tests. Mean scores for the Passive Haptic Learning group ranged from 80-100% for all tests (versus 0-50% score means in the control group) as shown in FIG. 26. On the final test (of all letters in the alphabet) PHL users scored a mean percentage of 98.0% correct answers ($SE=0.015$); whereas control group users scored 59.0% on average ($SE=0.102$). This difference was again significant ($t(10)=3.917$, $p<0.0013$).

Figure 28:
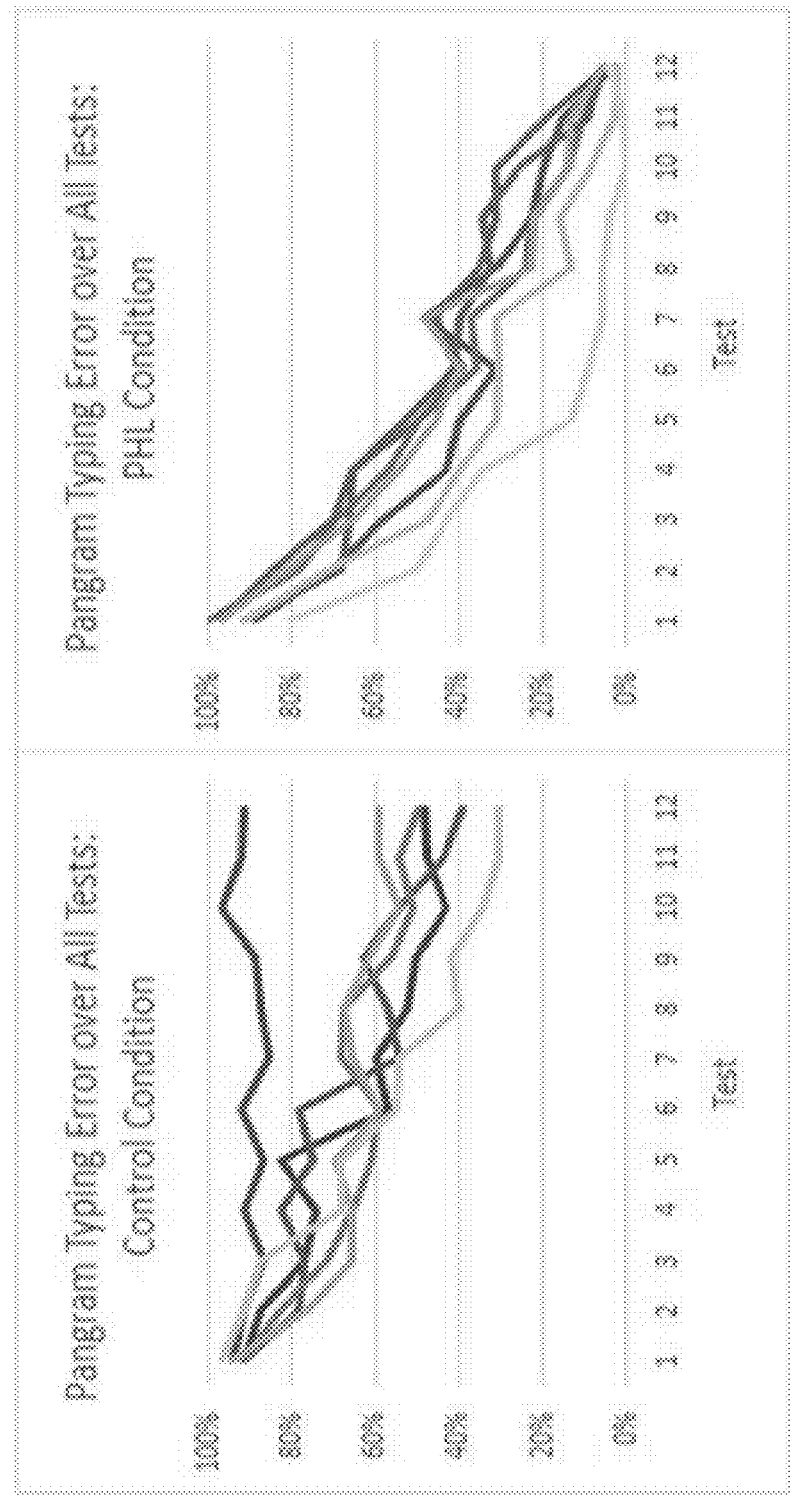
FIG. 28 depicts typing error rates for the full alphabet (using the panagram "the quick brown fox jumps over the lazy dog") on each input test, as described in Example 5. Each line represents a user's performance over time.

Input Test: Accuracy on the input tests was calculated using a Mean String Distance algorithm and used in the Total (Uncorrected) Error Rate metric standard in text entry evaluation. These measures were used to compare the letters that users entered with the (ground-truth) prompt string's letters. To analyze the performance of users over time, the study examined error rates on the pangram over the four sessions. The pangram reflects their knowledge of all letters in the alphabet (in Morse) and their ability to type them on Google Glass. Also examined was the single attempt at typing the pangram given during each pretest, and the average of the three trials given during each test. Users who receive Passive Haptic Learning demonstrate different trends in performance over time—with all PHL users reaching lower error scores than all control group users after the first session. These results are graphed in FIG. 28. A Single-Factor ANOVA reveals that Passive Haptic Learning has a significant effect on performance ($F=54.3$, $p<3E-10$). Starting error levels were not significantly different between the groups, but all PHL users finished the sessions with less than 6% error on their final test of the full alphabet (the pangram); whereas the control group finished with a mean error of over 53%.

Figure 29:
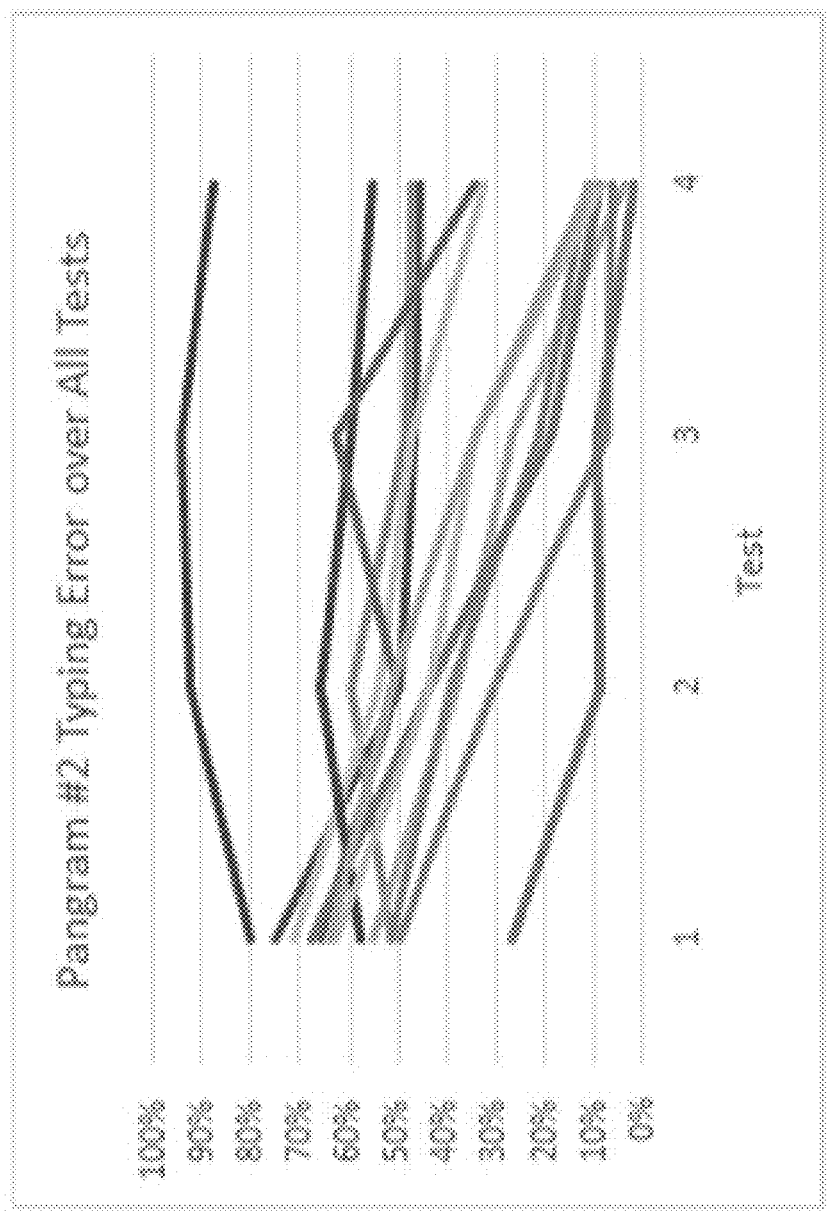
FIG. 29 depicts typing error rates for the full alphabet (using the panagram "when zombies arrive quickly fax judge pat") over all tries (four tests contained this panagram). Each line represents a user's typing performance over time. Dark lines represent users in the control group; light lines represent users in the PHL group.
Figure 30:
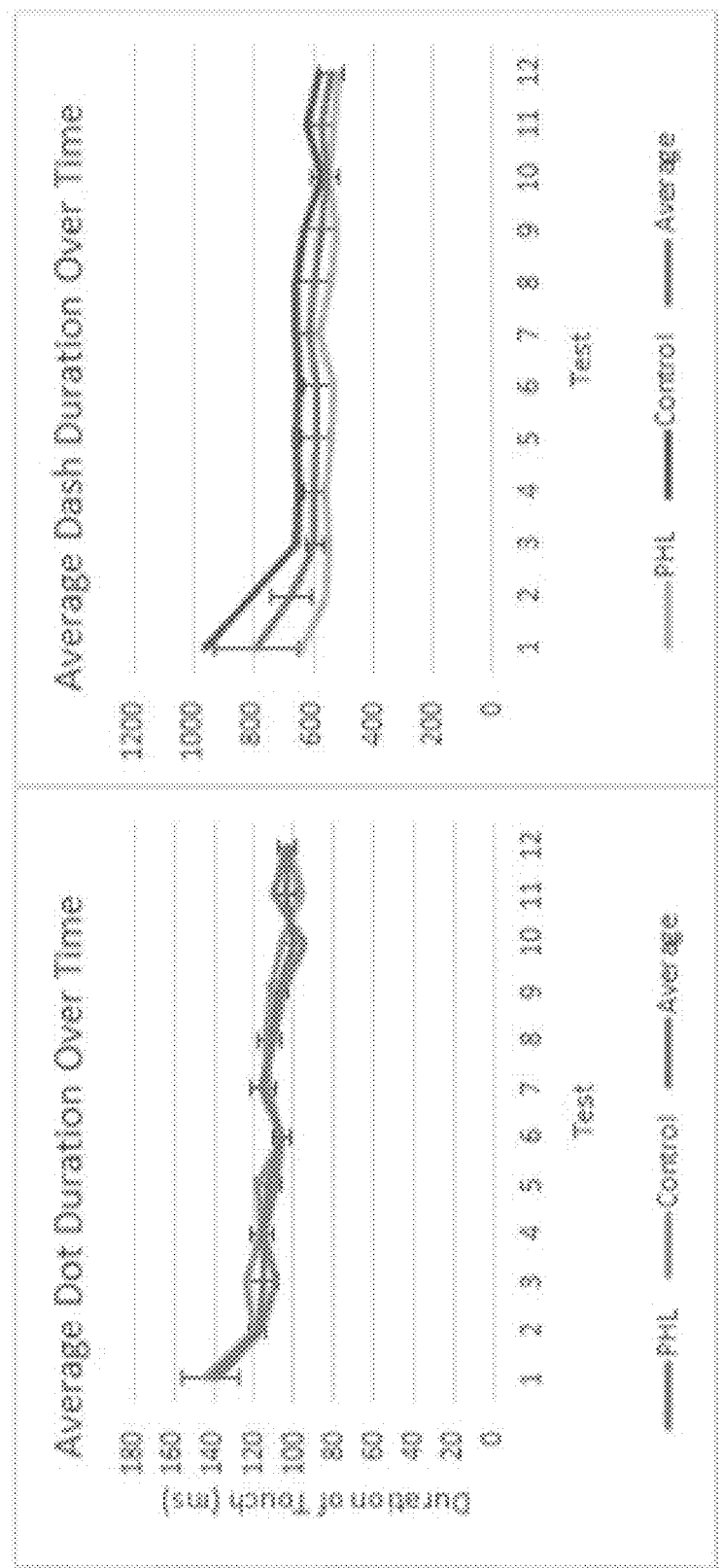
FIG. 30 depicts average dot and dash durations over all tests as described in Example 5. Error bars are shown on "average" lines.

Also examined were error rates at typing the second "zombies" pangram. See FIG. 29. This again reflects users' knowledge and input performance on all letters of the alphabet, in a different order than they have been taught. The average of the three attempts users were given at typing this pangram during the end of each session was recorded (see FIG. 29). A Single-Factor ANOVA reveals that Passive Haptic Learning had a significant effect on performance here as well ($F=17.4$, $p<0.0003$). Users receiving Passive Haptic Learning finished with a group average of 7.3% error on their last test ($SE=0.013$), while the control group mean was 50.5% error ($SE=0.082$). Also calculated was a second error score based upon the content of the strings in Morse. Also analyzed was the distance between the sequence of entered dots and dashes and the correct sequence. This measure was developed to be more sensitive to learning differences, in case users did not learn or perform entire touch groups correctly. Though non-typical in text entry, where measures reflect only whether a letter is entirely correct, applications similar to this one where learning, dexterity, and perception all factor-in, may benefit from such a metric. Results from this statistic revealed the same statistical conclusions as the standard error metric. This "content sensitive" error score was not needed to demonstrate learning effects here. In fact, the researchers found that for Morse code this metric yielded misleading accuracy scores for grossly erroneous text (like that produced in the initial pretest). Users demonstrated speeds of between 2.4 and 4 Words Per Minute on average when typing the pangram. Speed changes were present as users progressed from initial speeds below 2.5 WPM to nearly 4 WPM. The system "commit" wait time in this experiment, integrated to allow novice learners time to think when inputting the components of each letter, caused reduced speeds. Calculating speeds without the sum of these system waits shows average entry rates in excess of 8 WPM in the (accurate) PHL group, close to our target entry rate at the give system threshold (between dot and dash). The average duration of a dot and dash was calculated for each input test. Also analyzed were the changes of these averages over time and found that users in both groups altered their times to converge to different values than initially using the system. FIG. 30 depicts this progression for both dots and dashes. Average dot durations were initially 141.5 ms before converging to 103.1 ms by the final test ($SE1=14.5$; $SE12=4.55$). Dash durations began with more variance and a mean duration of 793.8 ms, eventually converging to 543.8 ms ($SE1=140.8$; $SE12=42.4$).

Figure 31:
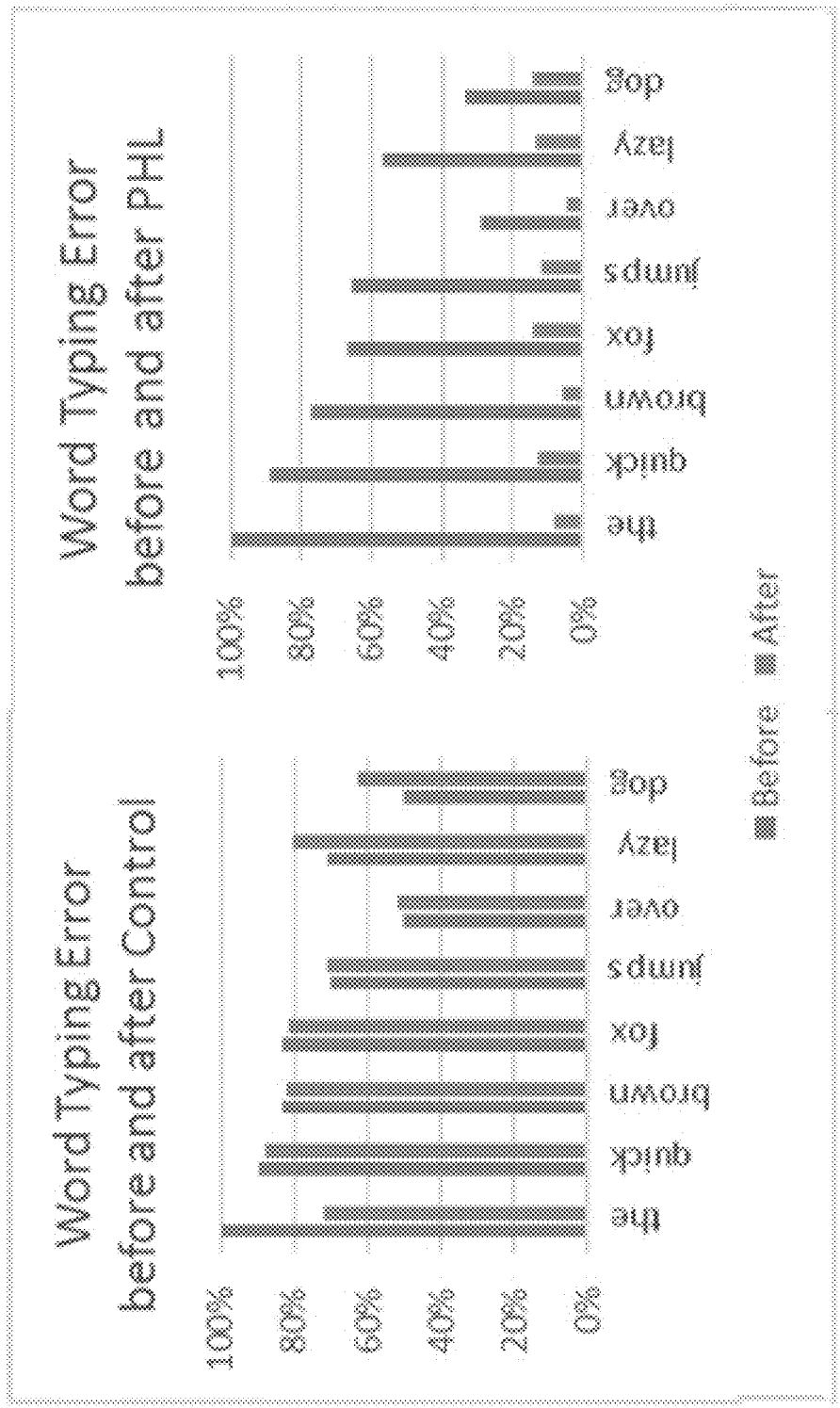
FIG. 31 depicts typing error rates on each word before and after intervention as described in Example 5.

The difference in typing errors on each word, before and after intervention, was also examined. Users were given one attempt at typing the session's (two) words during the pretest, after the distraction task (learning period) for that word users are given three attempts at typing the word during the test. This first trial was compared with the average of the three post-intervention attempts and found significant improvements after Passive Haptic Learning for all tests. As the left graph of FIG. 31 illustrates, there was no significant difference in control group performance before and after (no) intervention (t-test: $t(7)=0.226$, $p=0.414$).

Figure 32:
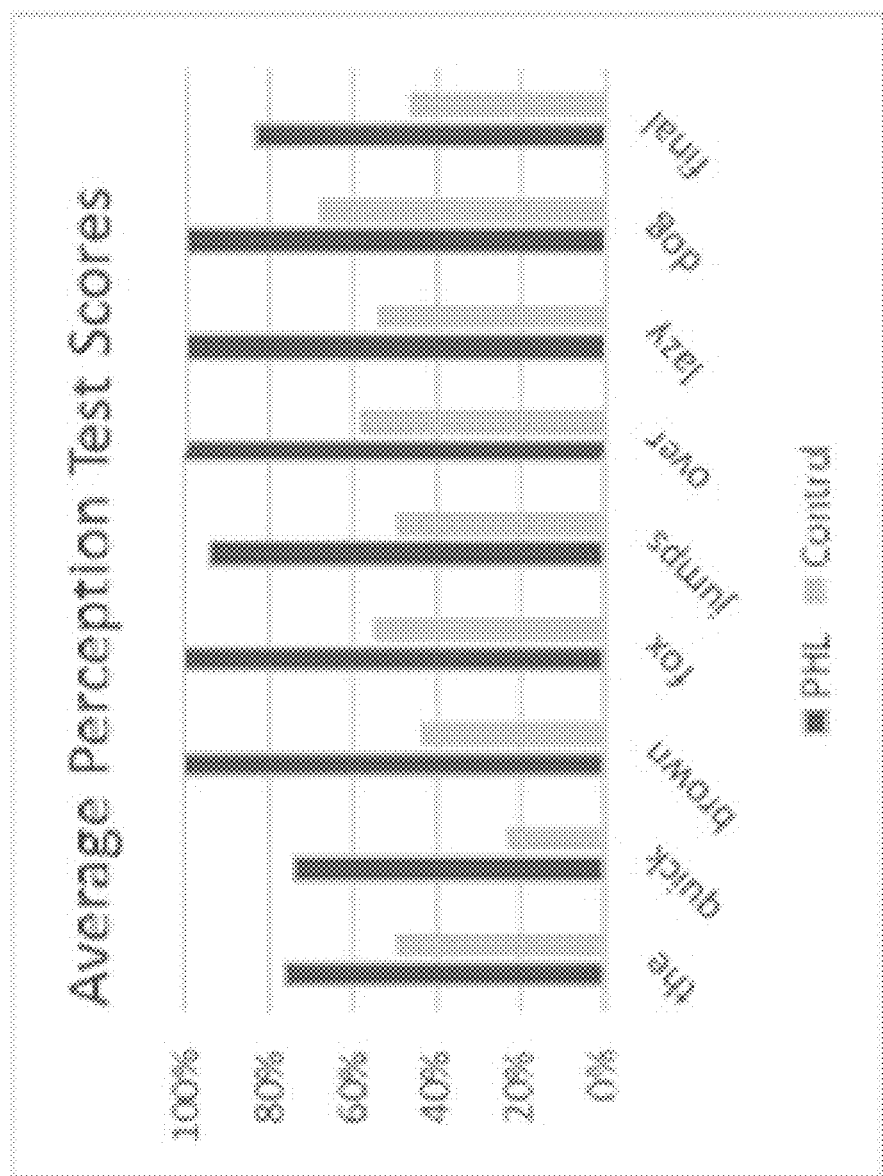
FIG. 32 depicts the average score by condition on each perception test as described in Example 5. "Final" refers to the test of the full alphabet at the end of session 4.

Perception Test: Users in the Passive Haptic Learning group also performed better on the perception tests. When the number of letters that subjects correctly recognized were analyzed (forming an error score like that of the written test), users in the Passive Haptic Learning group scored over 90% on six of the eight word tests. Users in the control group had mean scores all between 20%-68%. This was illustrated in FIG. 32, and t-tests show that there was a significant performance difference between the groups. On the final test (of the full alphabet), PHL users were able to correctly recognize 83.3% of all letters presented in Morse code (SE=0.041); while control group users could recognize 46.1% (SE=0.076). T-tests indicate significance (t(10)=4.31, p<0.0008).

Discussion: Results from each test illustrate several specific findings. Written test results show significantly better, nearly error-free performance by those who received Passive Haptic Learning, suggesting that the passive instruction helped increase user's knowledge of the entry system. Input tests indicate learning and reduction of entry errors over time, and results suggest that Passive Haptic Learning also helps users reduce errors more rapidly-without any additional active learning or practice. Some active practice occurred during the input tests as anticipated (when users are provided with visual feedback on the letters they type), and this results in some learning over time (indicated by the control group's performance change). This active practice is the typical method for learning a new text entry system, and results indicate that augmentation using Passive Haptic Learning provides significant benefits in this process. User performance on typing the second pangram again represents user's knowledge of the full alphabet, and performance differences between groups can also be seen in these results. Input performance results for each word show the effects of intervention, indicating that an intervention period of passive instruction leads to a large reduction in error.

Given a test of understanding haptic Morse code (the perception test), users who received PHL performed notably well—users could receive silent, haptic messages after passive training. Continued passive stimulation may lead to rapid, accurate reception of silent communication, too. Users were taught in Example 5 by having them "receive" Morse passively, yet when tested on both reception/perception and production they outperform on production. One explanation for this may be that the perception test is ephemeral (they are only given one chance to hear the stimulus), but this dual success may indicate that an exercise in reception rather than production results in better learning. Written tests indicate user knowledge, and similar performance on input tests suggests surprisingly good system usability (i.e., the input test results reflect user knowledge (indicated by comparable written test scores), thus users are not having great trouble inputting what they know—a secondary challenge posed by input tests). System changes can also be easily made to eliminate the system wait time and increase input speeds. Results show an interesting convergence of users' self-regulated, system-compliant dot and dash durations. Different system thresholds may change user entry speeds.

Figure 43:
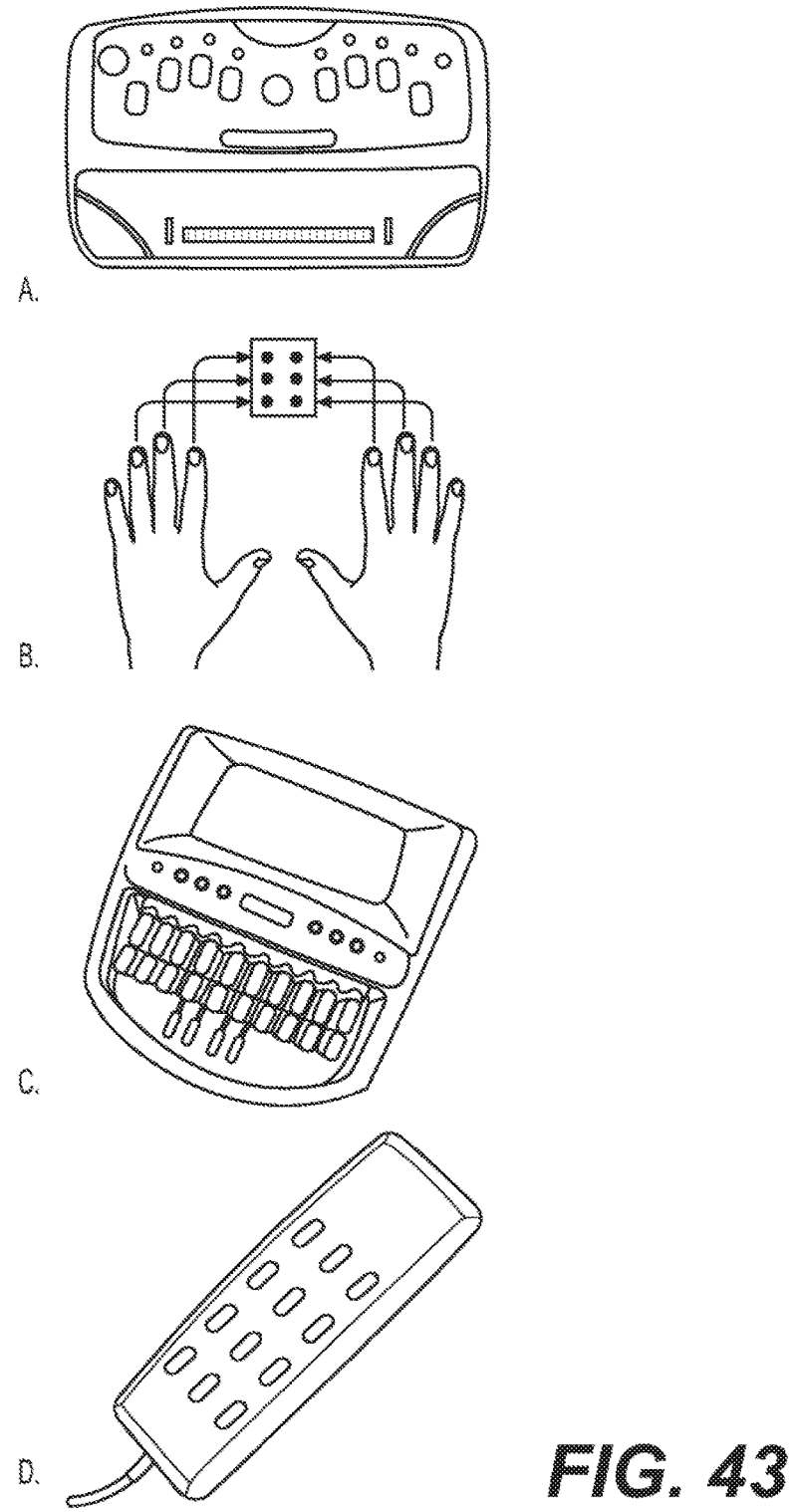
FIG. 43 depicts examples of complex text entry systems, including (a) a Braille Keyboard, (b) relationship to tactile Braille dots, (c) the stenograph keyboard, and (d) the TWIDDLER®.

Overall, users were successful at inputting what they knew on Google Glass. Successful use of this one-finger input method here indicates that eyes-free, silent input can be achieved using an input technique like Morse and requiring just a binary sensor. Anything with a one bit sensor can use such a technique—textiles, wearables, on-body sensors such as those depicted in FIG. 43—can both administer and benefit from passive learning. In addition, Example 5 demonstrates Passive Haptic Learning of another text entry system. This time motor skills are not taught passively, but rather users are going straight to learning a system of meaning through passive stimulation. This work also shows PHL and passive sensing of temporal patterns of rhythm. Each dot or dash stimuli is differentiated not by location on the body but solely by difference in duration. If teaching a system passively, even leveraging a device itself to do the instruction, users may be able to embrace a new method of text entry more easily.

Conclusion: Example 5 explored one-channel input for mobile devices by using Morse code on Google Glass, with the intent of exploring this input mechanism to address the user need for silent, discrete text entry. Example 5 also examines using passive instruction to overcome learning curve challenges that thwart many text entry systems. Example 5 also outlines how this passive stimulation was produced, including how to produce haptics generated using the device itself. Results show that Passive Haptic Learning produces significantly increased knowledge of the entry system without any additional active learning or practice. Users were also functional at inputting Morse code on Google Glass using just a finger, and could understand it silently through haptics. Passive stimuli did not inhibit performance on other tasks, a key component of the teaching system's potential for everyday use. Any device with a one bit sensor has the capability to use Morse code for input, including streamlined mobile and wearable systems that have no other feasible methods for silent, eyes-free text entry. Mobile devices may be used to both administer Passive Haptic Learning natively and potentially use it to help teach users beneficial interaction methods.

Example 5

Passive Haptic Learning of Stenography, and the Role of Sensor Placement on Hand In an effort to create a glove-based tactile interface for teaching chorded manual skills such as playing piano, typing Braille, and stenotype, participants' abilities to sense vibration on the hands were tested. First, the effect of stimulus location on recognition accuracy was examined. Ventral (palm) placement on the fingers was critical: accuracy increases with proximity to the palm, linearly, on all fingers. Second, studying perception of multiple simultaneous vibrations on the fingers ("chords") is done. Chord recognition degrades with increasing number of simultaneous stimuli. Small temporal offsets of the stimuli composing a chord were used to improve perception. A third study compared perception of Eccentric Rotating Mass (ERM) and Linear Resonant Actuator (LRA) vibration motors. Recognition accuracy was less using LRA motors, especially in placements on the palm side of the fingers (−20.3% versus −10.1%). Correct recognition of chords was also less or comparable using LRA motors—suggesting that the ERM motor is preferable.

As described previously herein, wearable tactile interfaces to teach manual skills such as playing piano, typing Braille, and typing stenotype are being explored while the user performs normal everyday tasks. Learning is passive in the sense that the wearer focuses on another primary task, like driving, and pays little attention to the training. For example, in our work on teaching Braille typing in previous Examples, users focus on playing a game while letters are announced in their earphones and the fingers corresponding to typing those letters are stimulated. A similar presentation of audio and tactile stimulation allows participants to learn piano melodies in previous examples while pursuing scavenger hunts, taking math or reading comprehension exams, or watching movies. For these applications, a pair of gloves were needed that obstruct the hands minimally during everyday activities (i.e., small tactors, placed strategically), can present stimuli that are easily detected, can convey chords to the wearer (musical instruments and many typing systems require simultaneous key presses by multiple fingers), and can indicate one of three different states for each finger (QWERTY, Twiddler, and stenotype keyboards require each finger to control at least three inputs). Three studies inform the design of the gloves created herein. Specifically, these studies can (1) demonstrate trends important for placement of tactors on the hands; (2) expose persistent error in human perception of simultaneous stimuli; and (3) compare perception performance using two common tactors.

Perception of haptic communication has been studied on many areas on the body, which have differing abilities to sense stimuli. Application domains that focus on tactile feedback on the hands include rehabilitation, accessibility, gaming, teleoperation, learning, and sensory augmentation for applications ranging from firefighting to movie viewing. These types of projects benefit from optimizing stimulator placement for discriminating between haptic signals. While many systems are mounted on or use the fingers, choosing ideal locations for haptic perception on the fingers is complex and requires study.

Simultaneous stimuli may be used to convey a composite of individual signals, create additional signals or enhance sensation effects. Applications include providing directions, conveying images, motor training, and Passive Haptic Learning. In particular, haptic conveyance of motor tasks such as playing an instrument or typing often require "chorded" (simultaneous) stimuli. For example, typing Braille requires that multiple keys be pressed at once. Thus, to teach Braille with these Passive Haptic Learning gloves, it was desirable to use simultaneous stimuli (if perception is possible). The same is true for haptic conveyance of other typing systems (like stenotype or capitals on a QWERTY keyboard) and instrument playing (such as piano and guitar). Previous application research using simultaneous stimuli was unable to convey correct meanings to users. In other work, the counting of simultaneous stimuli across the whole body was studied for subitizing (rapid, accurate numerosity judgments, normally by the visual system, of up to about four items). No subitizing effect was found, and error occurred in counting judgments of the number of tactile stimuli across the entire body. The examples herein expand on existing research to explore perception on the hands and of simultaneous stimuli. Also compared herein is the performance of popular tactors small enough to be integrated into mobile systems.

STUDY #1—PLACEMENT: Tactor placement points were tested on the fingers to see if there are optimal positions that allow participants to perceive three conditions distinctly: top stimulus, bottom stimulus, and both. Creating a tactile interface, with multiple stimulus points per finger, that still allows the user to recognize what location(s) were being stimulated, was desirable.

Figure 33:
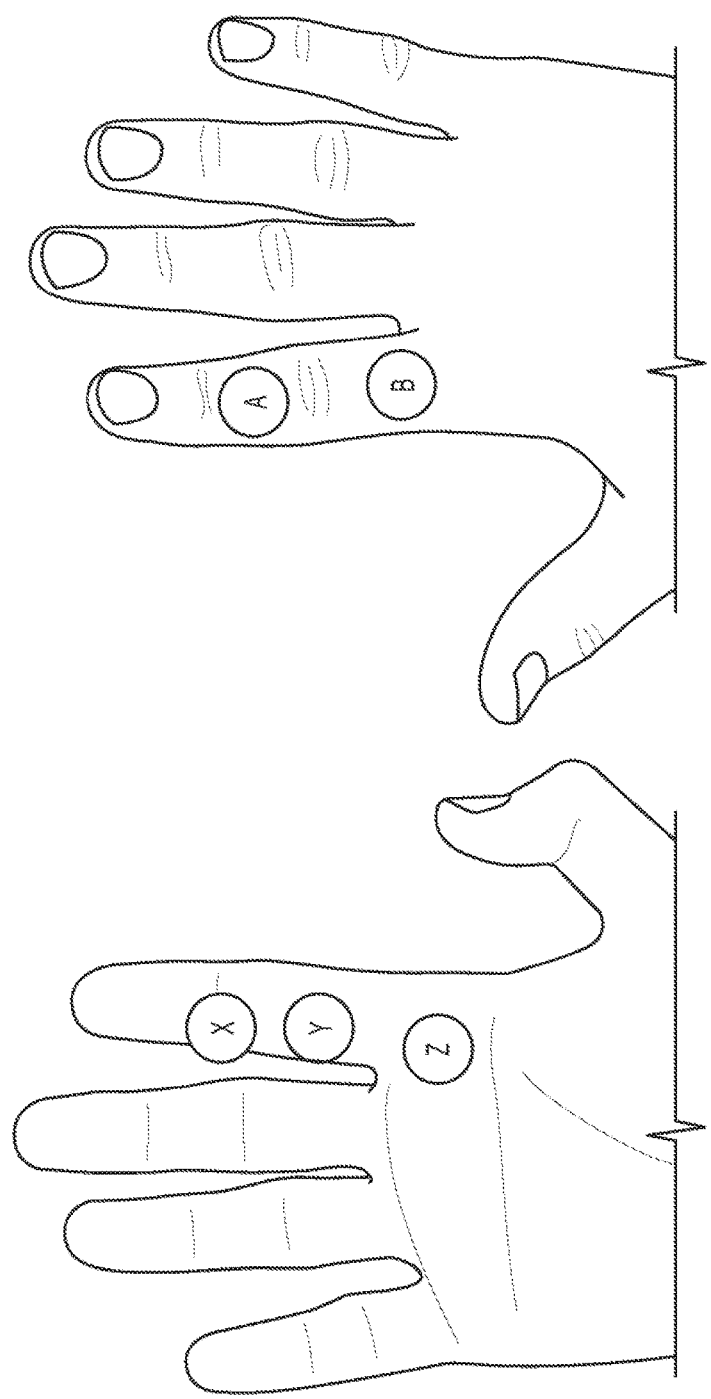
FIG. 33 depicts motor positions used in the first study described in Example 6. Alphabetic lettering is for reference herein for simplicity and was never presented to participants.

System: To produce the stimuli in this experiment, 8 mm Eccentric Rotating Mass (ERM) pancake vibration motors from precision Microdrives were activated using a TI Darlington array chip and a programmed Teensy++ 2.0. Driving details are identical as those used in other examples. For the finger being tested, five motors were held in position (shown for the index finger in FIG. 33) using their native adhesive inside a snug spandex finger sleeve. This test replicates the fit of vibration motors in a 4-way stretch glove; a material chosen to allow the motors to rest flush against the skin for differing hand sizes, while not suppressing vibration by rigid fabrics.

Study: This study tested whether users can more accurately identify tactile stimuli depending on the stimulus location on the finger. Each participant was randomly assigned to one of five conditions, which determined which finger was tested on that participant. Users wore the finger sleeve on their assigned finger as stimuli were presented. Participants responded to each stimulus with a key press, identifying whether a vibration was on the top ("dorsal") side of the hand, the bottom ("ventral") side of the hand, or a combination of both. During a trial, the system paused for one second, vibration motor(s) were activated for 400 ms, and the system then waited for the participants' key response (on a 3-key keyboard). When the motor on the dorsal side of the hand (position A or B) was activated, the correct response is "up" on the keypad. Similarly, when the motor on the ventral side of the hand (position X, Y, or Z) was activated the key associated with this stimulus was "down" on the keypad. When a tactor on the dorsal and ventral sides of the hand were activated, the correct answer was "both."

The six different permutations of vibration-motor location pairings (AX, AY, AZ, BX, BY, and BZ in FIG. 33) were tested for the assigned finger on both hands of the participant, to examine whether motor placement has an effect on the participants' accuracy in perceiving the stimuli. The study design was within-subjects for the six different permutations of tactor placement, and between-subjects for testing of these arrangements on each of the five fingers. Forty participants were used for this study (8 participants for each of the five fingers). The study was randomized and counterbalanced for location and condition. For each location pairing, the participant started with a practice period of six randomly ordered stimuli, two for each stimulus condition (top, bottom, both). After the practice period, the participant was told if the response was correct, and if it was incorrect, the correct response was given. The participants then performed 18 trials in which stimulus conditions (top, bottom, both) were randomly ordered, with each condition being tested six times per trial. Their responses were recorded, and they were not given any feedback regarding correctness. This process was repeated for each of the six pair permutations on the finger, for one hand then the other, resulting in 216 total trials per participant.

Results: Results from study #1 exposed significant and consistent effects on perception accuracy depending on where the haptic stimuli points were located on the fingers. Calculated herein were participants' percentage of correct responses as accuracy and performed herein were repeated measures ANOVA with Hyunh-Feldt correction to ignore sphericity. There was a significant effect of ventral (bottom) motor positioning on response accuracy (F=31.472, p<0.001). In contrast to the strong effect of the bottom stimuli location, dorsal (top) location was not found to have a significant effect on accuracy. To analyze the effect of ventral positioning further, pairwise comparisons were performed of the ventral position results, and found all three comparisons to be significant.

Figure 34:
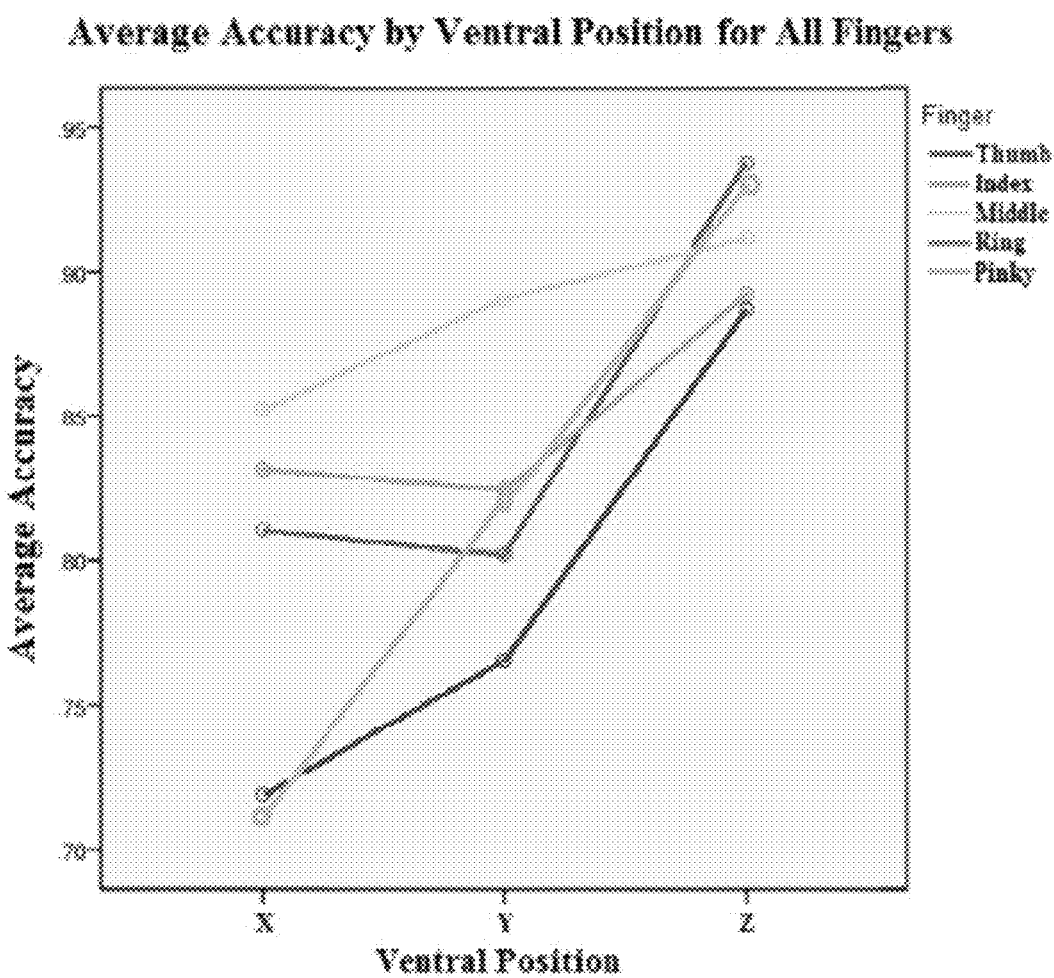
FIG. 34 depicts a plot of average accuracy by motor position on each finger, as described in Example 6.

There was a significant accuracy difference found between the three ventral (bottom) positions X, Y, and Z. Also analyzed were the contrasts between fingers for this interaction, and discovered that the data fits to a linear trend (F=2.775, p=0.042). As highlighted by FIG. 34, perception accuracy improves or shows no significant difference as the ventral motor position moves towards the center of the hand (away from the fingertip) in all five fingers.

Discussion: Given the vibration frequency of our motors, the Pacinian corpuscles in the hand should respond the most. Pacinian corpuscles are located primarily in the metacarpophalangeal ridge (the ventral region between the fingers and palm) and the tips of the fingers (preferentially in the thumb, index, and middle finger). Thus, the decline in perception accuracy as the motors are placed further from the palm on the ventral side could be because the Pacinian corpuscles in the metacarpophalangeal ridge are primarily detecting the sensation (especially for the ring and pinky fingers). For the other fingers and thumb, perhaps as the motors are placed closer to the tips of the fingers, the Pacinian corpuscles there start to respond some, avoiding the larger drop in accuracy seen in the ring and pinky fingers. The fingertip is a common choice for designers of tactile input systems, and as shown here, this choice may not be ideal for some applications. Fortunately, the results can be advantageously used for the glove herein. Both the ventral and dorsal motors can be placed close to the palm, which allows the creation of fingerless gloves that minimally interfere with the wearer's use of the fingers.

Figure 35:
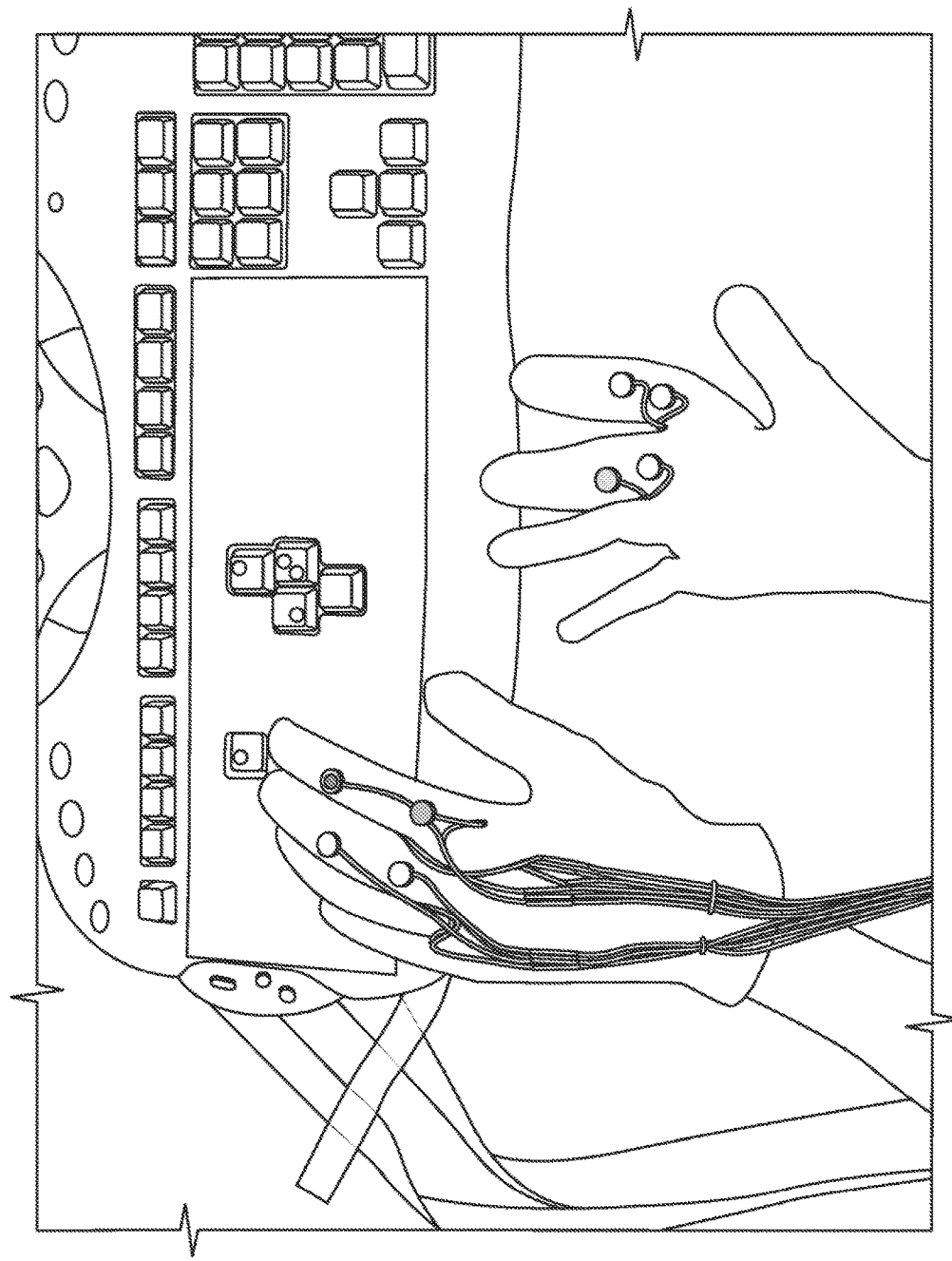
FIG. 35 depicts a glove pair and input interface for studies #2 and #3 described in Example 6.

APPARATUS FOR STUDIES #2 AND #3: The second and third studies focused on multi-finger chording and user perception of two types of vibration motors. For these studies, two pairs of gloves were created (see FIG. 35). One pair used Eccentric Rotating Mass (ERM) vibration motors while the other used Linear Resonant Actuator (LRA) motors. Both motors were the "coin" form factor.

ERM vibration motors: Eccentric Rotating Mass (ERM) vibration motors contain an asymmetric mass and are powered by DC current. For Precison Microdrives ERMs (part #310-113), 3.3V DC were used to provide the constant current required by this system for peak recommended vibration strength (1.38 G) and a 220 Hz vibration frequency (vibration frequency increases proportionally with applied voltage). These motors were driven by TI ULN2003 Darlington array chips to buffer the systems microcontroller and provide the necessary amplified current.

LRA vibration motors: Linear Resonant Actuator (LRA) vibration motors became available on the market relatively recently and were designed for a longer lifespan and a more precisely targeted vibration than the ERM motors. The mass inside an LRA motor vibrates along an axis (rather than eccentrically) and was most efficient (highest output amplitude) at its resonant frequency. The resonant frequency of the LRAs (Precision Microdrive part #C10-100) in our study is 175 Hz and is detected and maintained by 5VDC Texas Instruments DRV2603 surface mount driver chips which provide AC current at the required resonant frequency. For these studies, the LRA motors are driven at their peak amplitude of 1.4 G.

Motor Placement: The index and middle fingers were the focus for the remaining studies. Each of these fingers was outfitted with four motors two on the dorsal (top) side and two on the ventral (bottom) side (positions A, B, X, and Y in FIG. 33). Thus, the LRA and ERM gloves each contained 16 vibration motors, eight per hand. Position Z was no longer used, as the vibration motors interfered with gripping in this position, and the gloves are desired to be practical during everyday activities.

Figure 36:
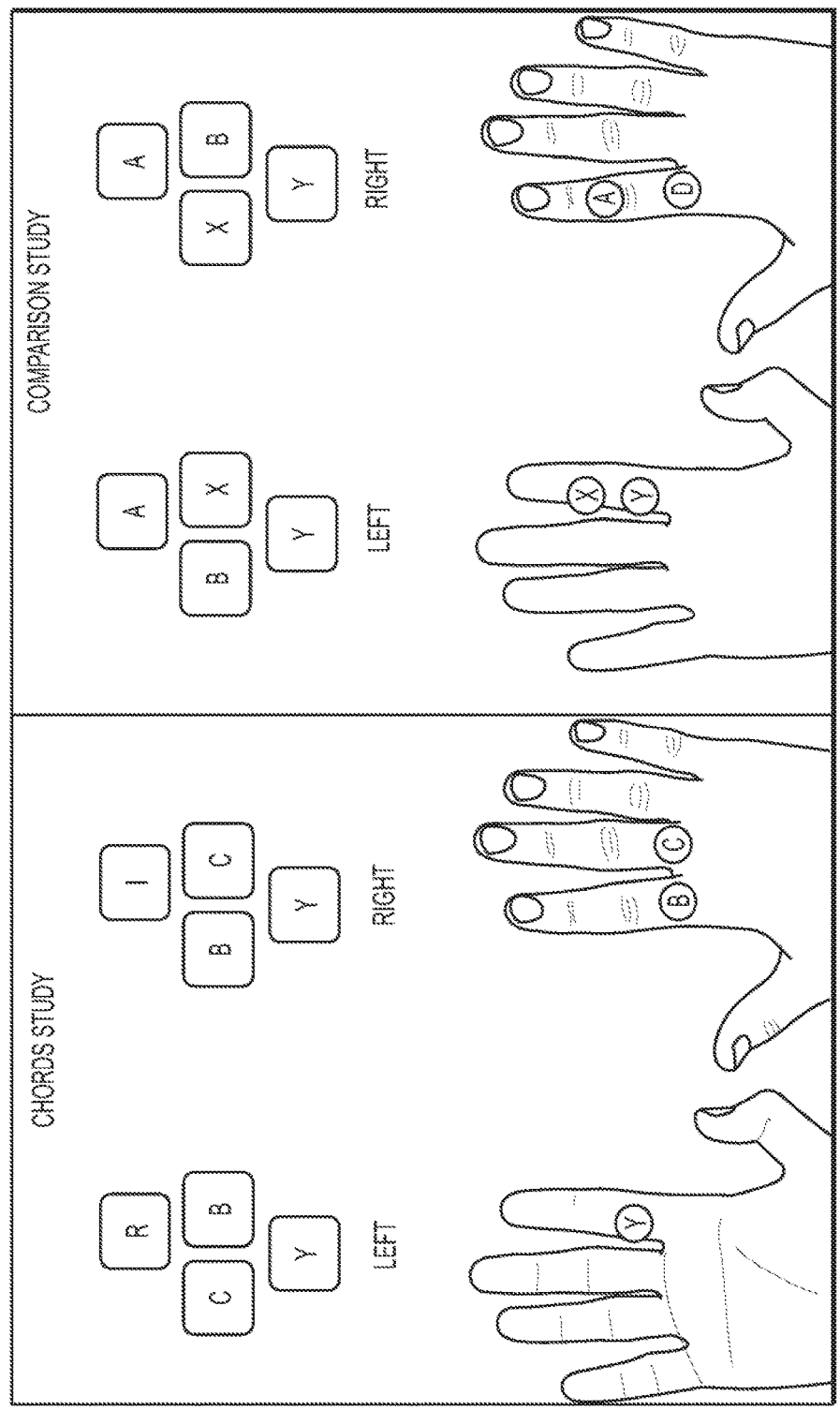
FIG. 36 depicts key mappings used for the chords and comparison studies, wherein each key's corresponding motor position is shown here on the right hand, as described in Example 6. Participants were told to use these mappings to input responses to stimuli. Participants were presented reference diagrams and color codings, not alphabetic codes.

Feedback Interface: A standard desktop keyboard was adapted for participants to indicate the perceived stimuli. Alphabet keys were removed, with the exception of keys used to collect responses. A laser-cut overlay exposed only the keys used for the studies. The overlay also provided a diagram that reminded participants of the mapping between stimuli and responses (FIG. 36).

Participants were told to use these mappings to input responses to stimuli. Users were presented reference diagrams and color codings, not alphabetic codes. For study #2, only three keys for each hand were used as inputs, corresponding to positions B, C, and Y as shown in FIG. 36. There was a one-to-one correspondence between vibrator motors and keys. For the right hand cluster of keys, the motor on the middle (right) finger on the right hand maps to the right key, the index (left) finger motor on the right hand maps to the left key, and the bottom (ventral) motor maps to the bottom key. A similar geometric mapping exists for the left hand. Resting the index and middle fingers above the input keys places the motors near their corresponding key. Participants use the stimulated finger to indicate their responses. These input mappings were chosen for their intuitiveness after testing on team members. Participants pressed the keys of the motors they identified as having vibrated in the last stimulus and may enter keys sequentially or simultaneously. For the motor comparison study (#3), users received stimuli on only the index fingers, but all four positions (A, B, X, and Y) and corresponding keys are used.

Software: Studies were automated by a program that controlled the delivery of stimuli. The system software delivered the studys stimuli in a random order for each participant. Users attempt to identify the stimuli and input their response via the keyboard before telling the administrator/proctor that they are finished with their input(s). The study then continued. The program logs delivered stimuli and user responses throughout each testing period.

STUDY #2: CHORDS: It was also desired to create a wearable interface that presented chorded signals in a recognizable format. Thus, a study was conducted to examine whether participants can perceive and recognize multiple simultaneous tactile stimuli on the hands. Sixteen users participated in this "chords" study. Users were told to expect one or more simultaneous stimuli and to try and correctly identify all points of vibration and enter their answer on the keypad. Participants then put on their assigned first pair of gloves (ERM or LRA), and the software began delivering stimuli and logging response data. When all stimuli were presented and users were done with their final input response, administrators helped the user switch gloves, and the study repeated for the new pair. Glove orders were randomized and counterbalanced. The dominant two fingers of each hand were chosen to compare adjacent-finger and two-hand simultaneous stimuli of up to four points in this "chords" study. The study could be expanded to include chords on all fingers. However, the study first wanted to establish that chorded perception was possible. All permutations of one, two, three, and four-motor combinations of motors in positions B, C, and Y on both hands were examined. This technique allowed examination of chords on adjacent fingers on the same hand, chords across both hands, and chords containing stimuli on the top and bottom of the hands. It also tested the motors individually to examine whether users can identify multiple "chorded" stimuli versus single stimuli. Position X was not used as study #1 showed that position had less perception accuracy, and it was desired to test the strongest practical motor locations first.

Activation duration was consistent throughout the chords study. Simultaneous motor groups (or individual motors) were activated together for 300 ms during each stimulus. This duration was used in previous examples, and allows time for our ERM motors to reach full-speed. Each stimulus was delivered twice for each possible set of chords (four times total—twice for each glove type).

Figure 37:
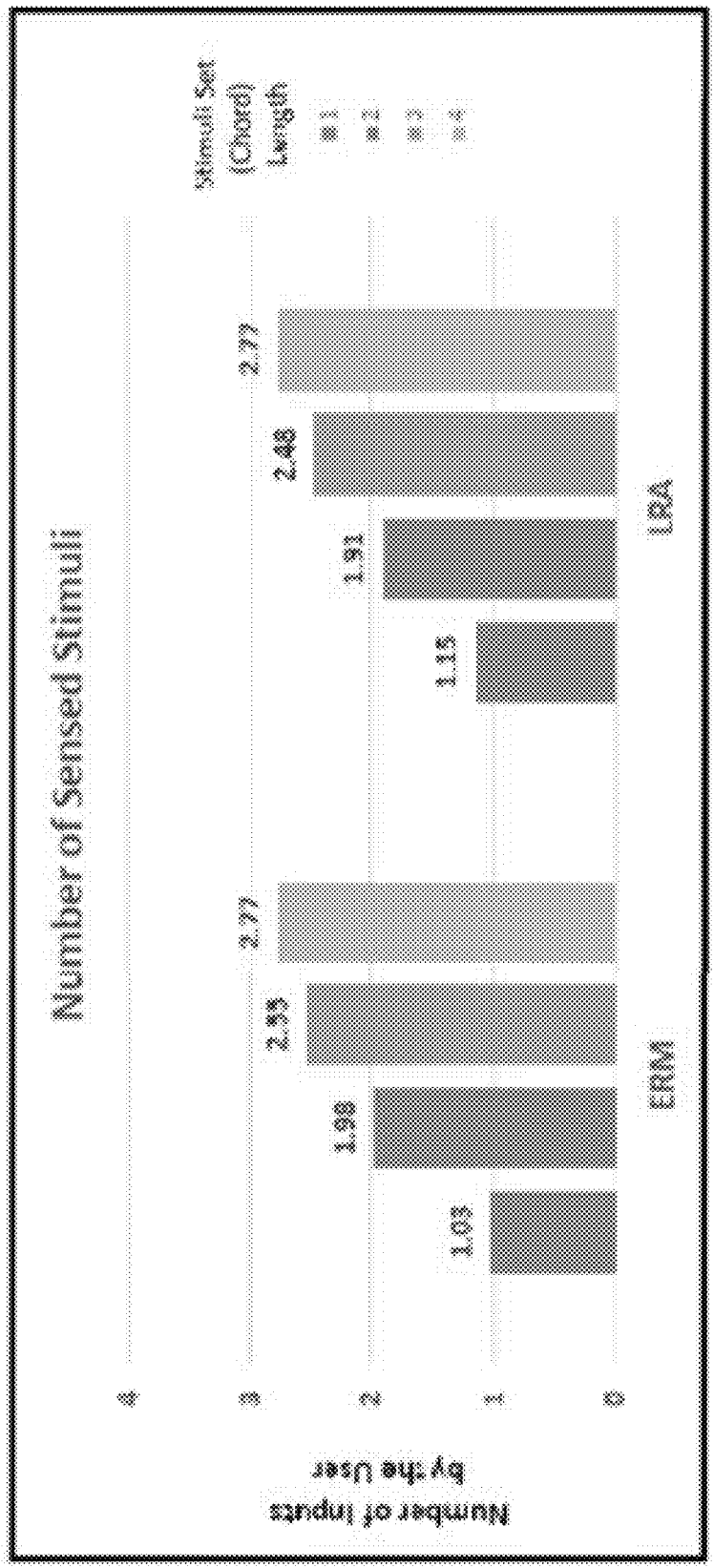
FIG. 37 depicts the average number of stimuli entered (sensed) grouped by actual number of stimuli and by motor type (which pair of gloves) as described in Example 6.

Results: (1) Numerosity Judgments: The number of vibration points that a user sensed and recorded (numerosity judgment) was calculated using the number of inputs they entered for each presented stimuli set. This data was averaged and grouped by the actual number of stimuli delivered in that set. As illustrated in FIG. 37, users average 1.09 and 1.94 points sensed respectively for single stimuli and chords of two stimuli. T-tests suggest that for numerosity judgments of one and two stimuli there is not a statistically significant deviation from ground truth, for either motor type (ERM and LRA) or on the average. Users under-sense stimuli sets of three or four, with average points sensed of just 2.51 and 2.77. T-tests show a significant difference in user judgments compared to ground truth (presented stimuli number) for stimuli sets of three (ERM: $t(15)=-5.23$, $p<6E-05$; LRA: $t(15)=-4.79$, $p<0.0002$; Avg.: $t(15)=-5.40$, $p<4E-05$) and four (ERM: $t(15)=-8.60$, $p<2E-07$; LRA: $t(15)=-6.80$, $p<3E-06$; Avg.: $t(15)=-8.31$, $p<3E-07$).

Figure 38:
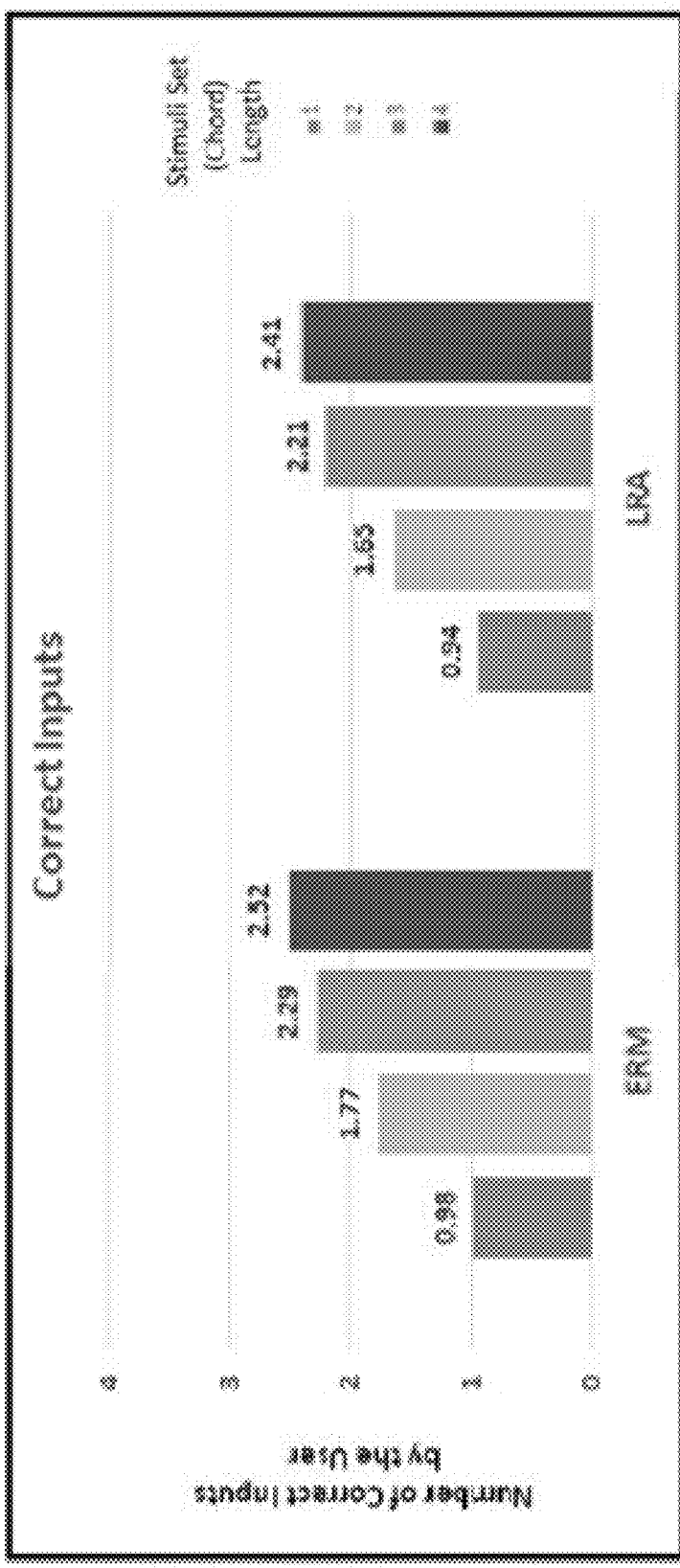
FIG. 38 depicts the correct content (average number of correctly identified stimulus points) by number of stimuli in the chord as described in Example 6. The graph represents the correct/usable data perceived, regardless of other incorrect or missing user responses to that chord.

(2) Points Correct (Content): For each set size, the average number of points in each user response were calculated that were actually correct. This metric gave a sense of the content that users correctly perceive. Results show that content is lost or incorrectly sensed by participants for all chord lengths. T-tests confirm significant deviation from expected ground truth content scores, for all stimuli set lengths (one through four), for both motor types used. In addition to incorrect counting judgments (FIG. 37). FIG. 38 illustrates that the stimuli are often incorrectly identified. Thus, the usability of simultaneous tactile stimuli on the fingers is dubious due to the average 20%-40% loss of data in every chord, regardless of which of the two vibrators were used.

(3) Chords Correct: User answers that exactly match the stimuli just presented were counted as completely correct. The calculated percentage of completely correct answers for each chord (stimuli set) size is presented as data in FIG. 39. While chords of one and two stimuli maintain average accuracies of over 65%, correct recognition of all (three or four) points in chords of three and four was less than 40% and less than 20% respectively.

Figure 40:
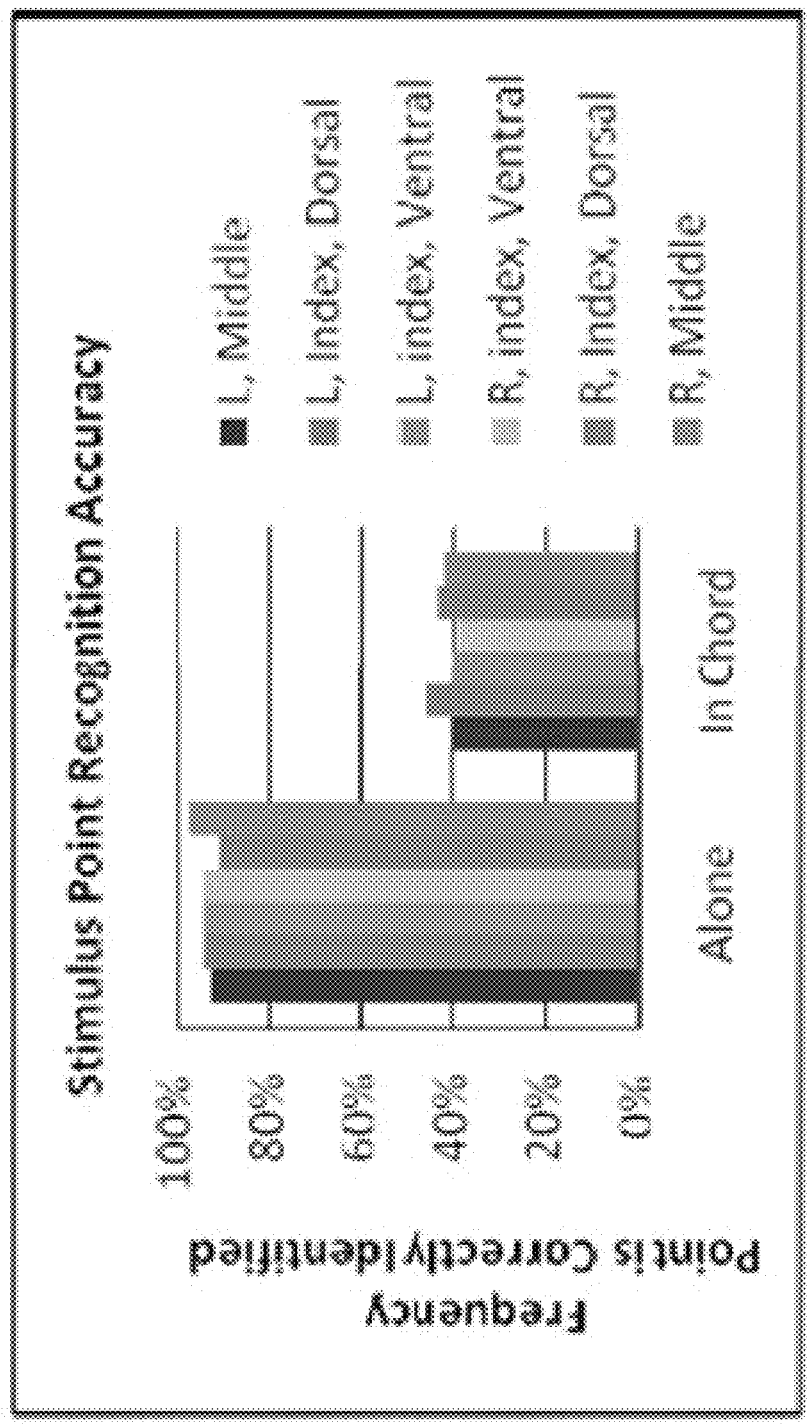
FIG. 40 depicts the recognition accuracy by stimulus location—when stimulus is alone versus when it comes simultaneously with other stimuli—as described in Example 6.

Examination of whether there were better-sensed locations for chorded stimuli points indicated no significant differences. FIG. 40 depicts these findings. As illustrated, identification accuracy for each point drops by an average of 50% when in conjunction with other simultaneous stimuli, independent of motor location (alone M=93%, SE=0.0085 vs. in chord M=42%, SE=0.0093). T-tests suggest that this difference is significant ($t(15)=39.21$, $p<1E-06$).

(4) Motor Comparison Findings in the Chords Experiment. Results produced using the ERM and the LRA gloves in the chords experiment were contrasted to draw further conclusions about how vibration motors compared with each other for usability. The gloves with embedded LRA motors provided no significant benefit to numerosity judgments of chord size presented or localization/identification of stimulus points. Users exhibited similar performance for both motor types in counting judgments for all stimulus set sizes, and t-tests indicate that any performance differences were not significant. LRA motors again provided no significant performance difference with ERM motors when comparing correct points (chord content) in chords of three or four, and actually provided significantly fewer correct stimuli identified when users received one or two simultaneous stimuli (paired t-test: single stimulus $t(15)=2.07$, $p<0.0281$, two-stimuli sets $t(15)=2.41$, $p<0.0148$). Comparing total chord recognition performance differences across the two glove pairs was again not significant for chorded stimuli, and the ERM gloves again outpaced the LRA gloves for recognition of single stimuli. T-tests reveal performance differences between the two motor types to be significant ($t(15)=2.52$, $p<0.0118$).

Figure 39:
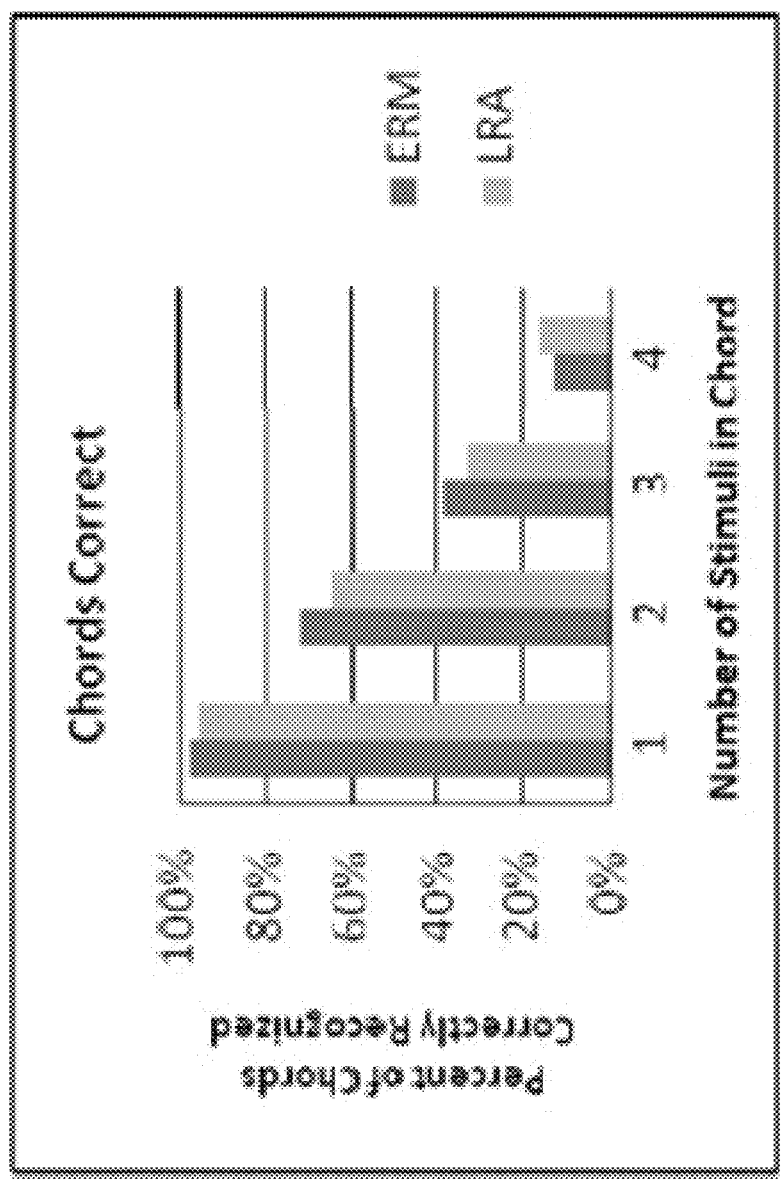
FIG. 39 depicts the percentage of chords recognized without any error (100% of stimuli presented were recognized and identified), for chords of different numbers of stimuli, as described in Example 6.

Discussion: Study #2's results elucidate many details in chorded perception on the hands, most importantly they indicate that chorded stimuli cannot be delivered simultaneously if discrete perception is desired. Results are summarized in FIG. 39 representing user performances on chords of different numbers of stimuli. As indicated by this data, human perception of multiple simultaneous tactile stimuli points is poor, particularly for sets of three or more stimuli. Due to content loss found in each chord set (missed or mis-identified stimuli), effective chorded stimuli delivery is not possible in either glove pair studied. Whether the interface's application values stimuli counting or localization, neither appears achievable via simultaneous tactile stimuli. In regards to counting judgments, the significant error present in sets of more than two stimuli suggests against subitizing—in contrast to human visual perception of simultaneous points and notably consistent with findings of no subitizing in counting judgments of tactile stimuli across the full body.

Users typically failed to report one stimuli point in the three and four-stimuli chords, as opposed to misidentification of a point's location. This result may be because of sensory funneling on the hands due to the density of stimuli points. Human perception of multiple simultaneous tactile stimuli on the hands is poor. Simultaneous stimuli present a challenge to developers, designers and users, even when the user is focused on correct perception. Analysis of motor type performances indicates LRA motors provided no significant benefit, despite purported improved localization and added cost. These results, using simultaneous stimuli, will be combined with those of study #3, regarding single stimuli, to examine if these haptics elements provide any current benefit for our range of applications STUDY #3: MOTOR TYPES COMPARISON: The third study directly examined perception differences in using ERM or LRA vibration motors. In this study, 20 participants attempt to pinpoint the origin of a single vibration of varying duration on their index fingers. Users were asked to put on their first assigned pair of the systems gloves (ERM or LRA) and were then presented with a stimulus and asked to input what they felt on the keypad, as described above. Once they complete their response, they were presented with the next stimulus, and this pattern repeats until all stimuli were presented. Upon completion, this procedure was repeated for the participant's second assigned pair of gloves (ERM or LRA). Condition orders were randomized and counterbalanced. The study concludes with a survey of user preferences and experience. Since it is desirable to examine performance differences by motor type, not differences between fingers, only the index fingers were used. The stimuli presented were all single stimuli (not chords). Two points on the dorsal side and two points on the ventral side of each index finger were tested (A, B, X and Y in FIG. 4, on both hands). These eight points were each activated for various durations during this experiment, activation durations of 150 ms, 300 ms, 450 ms, and 600 ms. Stimuli were randomized.

Varying activation durations allowed us to examine differences and ideals for each motor type. For example, ERM motors are known to required 120 ms to reach full amplitude and a similar amount of time to spin down, whereas the LRA motors have much faster onset and offset times (<90 ms).

Figure 41:
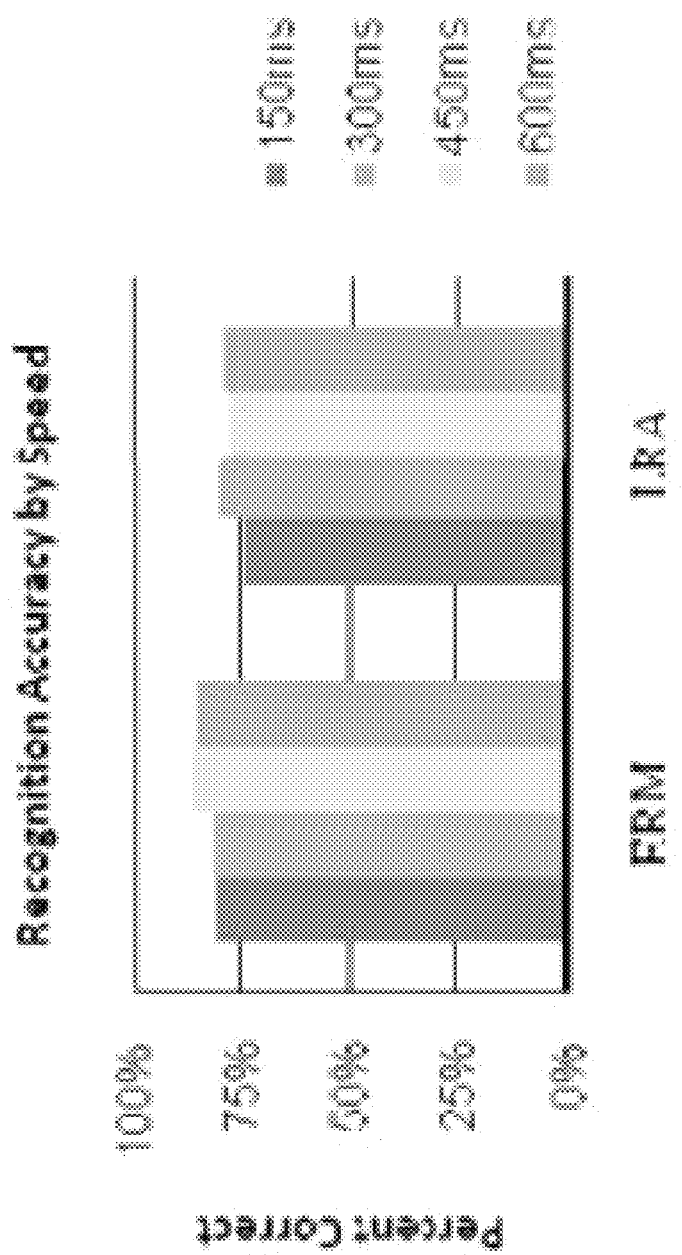
FIG. 41 depicts the recognition accuracy of single stimuli by motor activation duration as described in Example 6.

Results: (1) Activation Duration: Response accuracies were examined by activation duration for each motor type. FIG. 41 shows the percent of stimuli of each duration that were correctly identified for each motor type. Overall differences in user performance for each time were not significant, for both motor types, as indicated by a single-factor ANOVA comparing the effect on performance by time (F=0.373, p>0.772).

Figure 42:
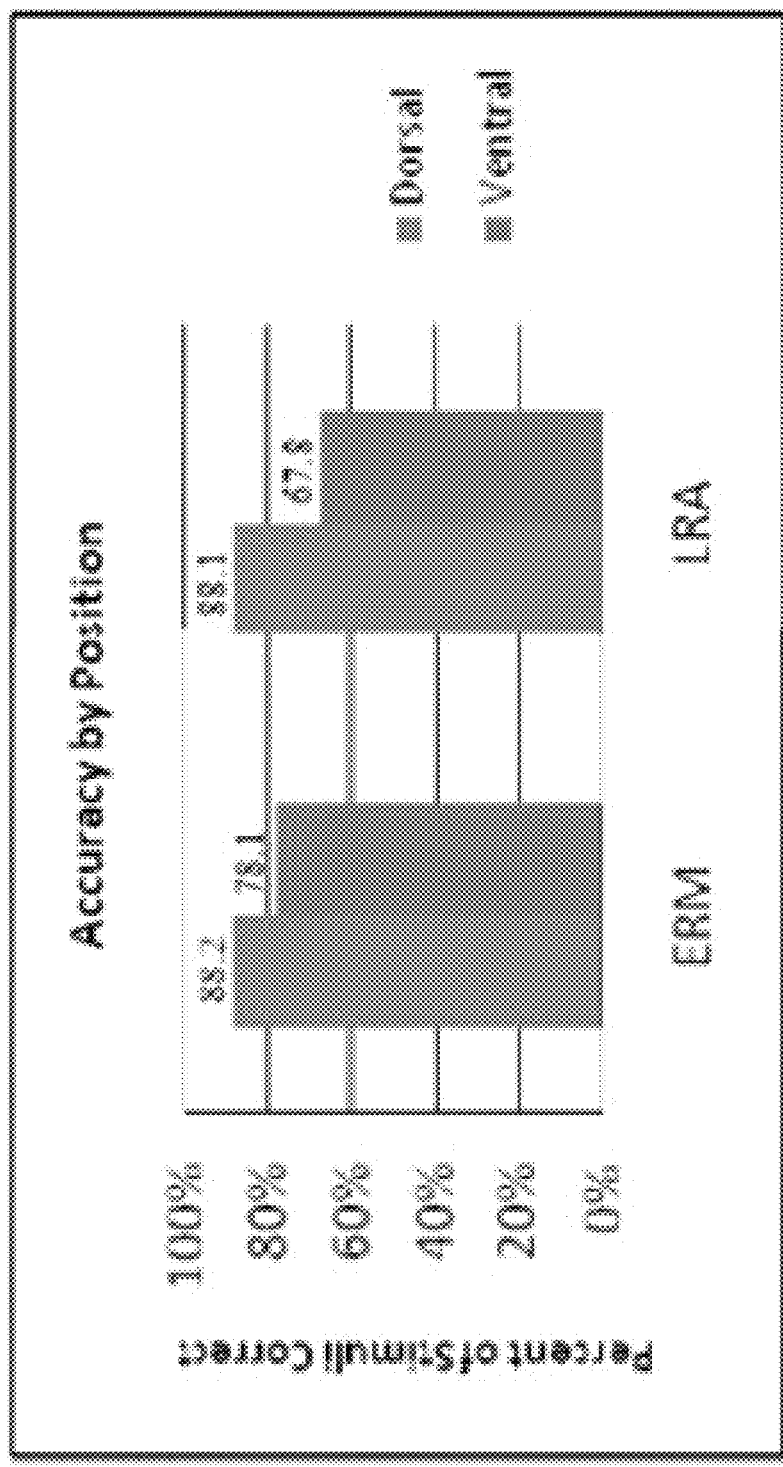
FIG. 42 depicts the identification accuracy by motor position and motor type as described in Example 6.

(2) Top and Bottom Differences: Identification of stimulus location for points on the dorsal (top) side of the fingers was significantly better than for points on the ventral (bottom) side of the hand. As presented in FIG. 42, points on the dorsal side of the fingers were identified correctly 88.2% of the time on average, in contrast to 73.0% of the time for points on the ventral side. A gap in performance between LRA and ERM vibration motors becomes apparent in these results. Both motor types have comparable accuracies in dorsal-side stimulus points (M=88.2% and M=88.1%), but accuracy falls by 20.3% (down to M=67.8%, SE=0.044) for ventral locations in the LRA interface and only 10.1% (to M=78.1%, SE=0.055) for the ERM motors. These findings and study #1 suggest that the ventral side of the fingers is an area with reduced perception recognition, and accuracy varies with placement location. The difference in accuracy for dorsal and ventral stimuli points showed significance for both motor types (t(19)=5.51, p<1E-05).

(3) Overall Motor Comparison: T-tests indicated that a significant difference in comparison of performance between motor types considering all stimuli presented (t(19) =2.10, p<0.0247); post-hoc tests suggest that differences in recognition accuracy of ventral-side stimuli between LRA and ERM interfaces are significant (t(19)=2.48, p<0.0114).

(4) Questionnaire: Study #3 sessions were followed by a survey. Seven-point Likert scales indicated a preference for the ERM vibration motors, with responses to "it was easy to sense what motor was vibrating" most often being "agree (6)" as compared to most often "somewhat disagree (3)" for LRAs. Comments to "what differences did you notice between gloves" often contained the following observations: the ERMs vibrated "stronger" (seen as a positive) but sometimes caused "the entire finger to vibrate" making localization difficult for users.

Discussion: The LRA and ERM vibration motors presented here are some of the few commonly available tactors with a form factor usable for incorporation into wearable interfaces such as our glove system for teaching manual skills passively. It was expected that the LRA motors would perform better than the ERMs; however, they performed significantly worse on the ventral side of the hand and had comparable or worse performance in general. Perhaps, as LRA motors become more mature and more models become available, new packaging will change this result. Comparable accuracies were found for each activation duration. While it is surprising that a 150 ms stimulus is perceived about as well as a 600 ms stimulus, the results are fortuitous in that it enables a variety of systems with either fast-paced or time-variant vibration signals.

The ERM gloves' decreased performance with larger numbers of stimuli (in the chords study) may be due to their "strong" vibration. Responses to the questionnaire mention this, as some users observed that the vibration caused by the ERM motors is sometimes "too much" and causes the entire glove to vibrate. Because of this vibration "strength" and the nature of the Eccentric Rotating Mass motors, this motor type may not be best for use in simultaneous stimuli, or placement in multiples in close proximity. Though multipoint count identification was comparable using LRA motors in these circumstances, localization of the stimuli source was comparable or worse than using ERMs. Instead, for chorded and close-proximity implementations, a mixture of motor types (LRA and ERM) may be ideal with each type producing a different sensation resulting in better differentiation. Staggering onset or varying activation durations for chorded stimuli is another solution to aid to perception, and there has been success with this approach in recent work.

The results of three studies regarding perception of haptic stimuli using small Eccentric Rotating Mass (ERM) and Linear Resonant Actuator (LRA) vibration motors suitable for embedding into a wearable, tactile interface are provided herein in Example 5. The ERM motors in this study proved easier to perceive than the LRA motors in general. The ventral side of the hand presents challenges to perception and trends related to stimulus location—positions closer to the palm (as opposed to the finger tip) proved significantly, linearly, more distinguishable. Simultaneous chorded stimulation is difficult to perceive; offseting the activation of the motors slightly may prove a better solution. These results can be used to design tactile interfaces for Passive Haptic Learning and applications such as microinteractions, augmented reality, and rehabilitation.

What is claimed is:

1. A method of conveying a first and a second chorded input, the first chorded input comprising a first set of multiple actions to be undertaken simultaneously and the second chorded input comprising a second set of multiple actions to be undertaken simultaneously, the method comprising:

generating, by a processor in electrical communication with a plurality of actuators and an output device, a first stimulation sequence, the first stimulation sequence comprising instructions for sequentially activating, with a predetermined temporal offset between sequential activations, a first plurality of the plurality of actuators in a first sequential order, the predetermined temporal offset being selected by the processor;

according to the instructions of the first stimulation sequence, generating, by the processor, a first plurality of stimulation sequence signals configured to cause a first plurality of activations in which each of the first plurality of the plurality of actuators is activated in the first sequential order, wherein each of the first plurality of activations is a discrete stimulation event representing an action of the first set of multiple actions, the first plurality of activations conveying the first chorded input by sequentially representing each action of the first set of multiple actions to be undertaken simultaneously;

responsive to the first plurality of the plurality of actuators activating in the first sequential order, generating, by the processor, an output signal to cause a perceptible indication by the output device;

generating, by the processor, a second stimulation sequence, the second stimulation sequence comprising instructions for activating a second plurality of the plurality of actuators in a second sequential order; and according to the instructions of the second stimulation sequence, generating, by the processor, a second plurality of stimulation sequence signals configured to cause a second plurality of activations in which each of a second plurality of the plurality of actuators is activated in the second sequential order, wherein each of the second plurality of activations is a discrete stimulation event representing an action of the second set of multiple actions, the second plurality of activations conveying the second chorded input by sequentially representing each action of the second set of multiple actions to be undertaken simultaneously.

2. The method of claim 1, wherein a first activation and a second activation of the first plurality of activations are separated by a first predetermined offset such that the first activation begins at a first time and the second activation begins at a second time that is equal to the first time plus a duration of time equal to the first predetermined offset.

3. The method of claim 1, wherein a first activation and a second activation of the second plurality of activations are separated by a second predetermined offset such that the first activation begins at a first time and the second activation begins at a second time that is equal to the first time plus a duration of time equal to the second predetermined offset.

4. The method of claim 1, wherein the first and/or the second chorded input is conveyed via passive haptic learning such that each stimulation event comprises a haptic event to be experienced by a user.

5. The method of claim 1, wherein each stimulation event is a vibrational stimulation, an audio stimulation, a tactile stimulation, or a combination thereof.

6. The method of claim 1, wherein execution of the second stimulation sequence begins from 100 milliseconds to 1 second after the first plurality of activations ends.

7. The method of claim 1, wherein the first and/or the second chorded input represents a word, a letter, a syllable, a code, a number, a symbol, a musical note, a musical chord, or a combination thereof.

8. The method of claim 1, wherein each of the plurality of actuators is positioned on or within a wearable device configured to stimulate a portion of a device-wearer's body.

9. The method of claim 8, wherein the wearable device comprises a glove, wherein the portion of the device-wearer's body comprises a left hand or a right hand, and wherein each of the actuators is configured to stimulate via vibrating a portion of the left hand or the right hand.

10. The method of claim 1 further comprising: before executing the first stimulation sequence, generating, by a processor, a signal to cause a parsing device to generate a parsing indication to a user.

11. The method of claim 10, wherein the parsing indication represents a letter of the alphabet.

12. The method of claim 10, wherein the parsing indication comprises a visual cue, an audible sound, a pause, a vibration, or a combination thereof.

13. The method of claim 12, wherein the parsing indication comprises a visual cue, and wherein the device comprises a screen of a wearable headset configured for display of the visual cue.

14. The method of claim 2, wherein the first predetermined time offset is from 5 milliseconds to 50 milliseconds.

15. The method of claim 1, wherein each of the plurality of actuators comprise a vibration motor, a speaker, a bone-conduction device, or a combination thereof.

16. The method of claim 1, wherein the perceptible indication comprises a visual cue, an audible sound, a pause, a vibration, or a combination thereof.

17. The method of claim 16, wherein the perceptible indication comprises an audible sound, and wherein the output device comprises an audio output device configured to generate the audible sound.

18. A non-transitory computer-readable medium that stores instructions that, when executed by at least one processor, causes the at least one processor to perform a method of conveying a first and a second chorded input, the first chorded input comprising a first set of multiple actions to be undertaken simultaneously and the second chorded input comprising a second set of multiple actions to be undertaken simultaneously, the method comprising:

generating, by a processor in electrical communication with a plurality of actuators and an output device, a first stimulation sequence, the first stimulation sequence comprising instructions for sequentially activating, with a predetermined temporal offset between sequential activations, a first plurality of the plurality of actuators in a first sequential order, the predetermined temporal offset being selected by the processor;

according to the instructions of the first stimulation sequence, generating, by the processor, a first plurality of stimulation sequence signals configured to cause a first plurality of activations in which each of the first plurality of the plurality of actuators is activated in the first sequential order, wherein each of the first plurality of activations is a discrete stimulation event representing an action of the first set of multiple actions, the first plurality of activations conveying a first chorded input by sequentially representing each action of the first set of multiple actions to be undertaken simultaneously;

responsive to the plurality of actuators activating in the first sequential order, generating, by the processor, an output signal to cause a perceptible indication by the output device;

generating, by the processor, a second stimulation sequence, the second stimulation sequence comprising instructions for activating a second plurality of the plurality of actuators in a second sequential order; and according to the instructions of the second stimulation sequence, generating, by the processor, a second plurality of stimulation sequence signals configured to cause a second plurality of activations in which each of a second plurality of the plurality of actuators is activated in the second sequential order, wherein each of the second plurality of activations is a discrete stimulation event representing an action of the second set of multiple actions, the second plurality of activations conveying the second chorded input by sequentially representing each action of the second set of multiple actions to be undertaken simultaneously.

19. A system for conveying a first and a second chorded input, the first chorded input comprising a first set of multiple actions to be undertaken simultaneously and the second chorded input comprising a second set of multiple actions to be undertaken simultaneously, the system comprising:

at least one memory operatively coupled to at least one processor and configured for storing data and instructions that, when executed by the at least one processor, cause the system to:

generate, by a processor in electrical communication with a plurality of actuators and an output device, a first stimulation sequence, the first stimulation sequence comprising instructions for sequentially activating, with a predetermined temporal offset between sequential activations, a first plurality of the plurality of actuators in a first sequential order, the predetermined temporal offset being selected by the processor;

according to the instructions of the first stimulation sequence, generate, by the processor, a first plurality of stimulation sequence signals configured to cause a first plurality of activations in which each of the first plurality of the plurality of actuators is activated in the first sequential order, wherein each of the first plurality of activations is a discrete stimulation event representing an action of the first set of multiple actions, the first plurality of activations conveying the first chorded input by sequentially representing each action of the first set of multiple actions to be undertaken simultaneously;

responsive to the plurality of actuators activating in the first sequential order, generate, by the processor, an output signal to cause a perceptible indication by the output device;

generate, by the processor, a second stimulation sequence, the second stimulation sequence comprising instructions for activating a second plurality of the plurality of actuators in a second sequential order; and according to the instructions of the second stimulation sequence, generate, by the processor, a second plurality of stimulation sequence signals configured to cause a second plurality of activations in which each of a second plurality of the plurality of actuators is activated in the second sequential order, wherein each of the second plurality of activations is a discrete stimulation event representing an action of the second set of multiple actions, the second plurality of activations conveying the second chorded input by sequentially representing each action of the second set of multiple actions to be undertaken simultaneously.

* * * * *